(12) United States Patent
Wang et al.

(10) Patent No.: US 11,982,875 B2
(45) Date of Patent: May 14, 2024

(54) IMAGE CAPTURING LENS ASSEMBLY, IMAGING APPARATUS AND ELECTRONIC DEVICE

(71) Applicant: LARGAN PRECISION CO., LTD., Taichung (TW)

(72) Inventors: Kuo-Jui Wang, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 745 days.

(21) Appl. No.: 17/144,244

(22) Filed: Jan. 8, 2021

(65) Prior Publication Data

US 2021/0373284 A1 Dec. 2, 2021

(30) Foreign Application Priority Data

May 29, 2020 (TW) .................................. 109118204

(51) Int. Cl.
*G02B 9/64* (2006.01)
*G02B 13/00* (2006.01)
*H04N 5/225* (2006.01)
*H04N 23/54* (2023.01)
*H04N 23/55* (2023.01)

(52) U.S. Cl.
CPC ........... *G02B 9/64* (2013.01); *G02B 13/0045* (2013.01); *H04N 23/54* (2023.01); *H04N 23/55* (2023.01)

(58) Field of Classification Search
CPC ...... G02B 13/0045; G02B 9/94; H04N 23/54; H04N 23/55

USPC ......................................................... 359/708
See application file for complete search history.

(56) References Cited

U.S. PATENT DOCUMENTS

| | | | |
|---|---|---|---|
| 5,257,129 A | 10/1993 | Morooka et al. | |
| 5,371,628 A | 12/1994 | Shimoda et al. | |
| 5,410,430 A | 4/1995 | Ito | |
| 5,448,411 A | 9/1995 | Morooka | |
| 5,864,435 A | 1/1999 | Toyama | |
| 7,701,650 B2 | 4/2010 | Lin | |
| 9,961,244 B2 | 5/2018 | Liao et al. | |
| 10,151,901 B1 | 12/2018 | Oinuma et al. | |
| 10,151,902 B1 | 12/2018 | Sato et al. | |
| 10,222,589 B1 | 3/2019 | Oinuma et al. | |
| 10,247,922 B1 | 4/2019 | Oinuma et al. | |

(Continued)

FOREIGN PATENT DOCUMENTS

| | | |
|---|---|---|
| CN | 101408664 A | 4/2009 |
| CN | 110031956 A | 7/2019 |

(Continued)

*Primary Examiner* — Stephone B Allen
*Assistant Examiner* — Leonidas Boutsikaris
(74) *Attorney, Agent, or Firm* — McClure, Qualey & Rodack, LLP

(57) ABSTRACT

An image capturing lens assembly includes seven lens elements, which are, in order from an object side to an image side along an optical path, a first lens element, a second lens element, a third lens element, a fourth lens element, a fifth lens element, a sixth lens element and a seventh lens element, each of the seven lens elements has an object-side surface towards the object side and an image-side surface towards the image side. The first lens element has negative refractive power. The third lens element has positive refractive power. The seventh lens element has negative refractive power.

27 Claims, 30 Drawing Sheets

(56) References Cited

U.S. PATENT DOCUMENTS

| | | | |
|---|---|---|---|
| 10,254,515 | B1 | 4/2019 | Oinuma et al. |
| 10,274,705 | B2 | 4/2019 | Ichikawa et al. |
| 11,125,971 | B2 | 9/2021 | Chen et al. |
| 2019/0121067 | A1 | 4/2019 | Oinuma et al. |
| 2019/0121068 | A1 | 4/2019 | Oinuma et al. |
| 2019/0121069 | A1 | 4/2019 | Oinuma et al. |
| 2019/0121073 | A1* | 4/2019 | Oinuma ............ G02B 13/0015 |
| 2019/0121075 | A1 | 4/2019 | Sato et al. |
| 2019/0121079 | A1 | 4/2019 | Oinuma et al. |
| 2019/0121080 | A1 | 4/2019 | Oinuma et al. |
| 2019/0129139 | A1* | 5/2019 | Oinuma ............ G02B 27/0025 |
| 2019/0129140 | A1 | 5/2019 | Oinuma et al. |
| 2019/0129141 | A1 | 5/2019 | Oinuma et al. |
| 2019/0129142 | A1 | 5/2019 | Oinuma et al. |
| 2019/0154984 | A1 | 5/2019 | Oinuma et al. |
| 2019/0196151 | A1 | 6/2019 | Chen et al. |
| 2019/0204551 | A1 | 7/2019 | Oinuma et al. |
| 2019/0271831 | A1* | 9/2019 | Hsu .................... G02B 13/0045 |
| 2019/0369363 | A1 | 12/2019 | Chen et al. |
| 2020/0355889 | A1 | 11/2020 | Hayashi et al. |
| 2020/0371314 | A1 | 11/2020 | Geng et al. |
| 2020/0379219 | A1 | 12/2020 | Geng et al. |
| 2021/0088755 | A1* | 3/2021 | Nitta .................. G02B 27/0025 |
| 2021/0255425 | A1* | 8/2021 | Jiang ................ G02B 27/0025 |
| 2022/0003962 | A1* | 1/2022 | Sun ........................ G02B 13/18 |
| 2022/0011547 | A1* | 1/2022 | Sun .................... G02B 13/0045 |
| 2022/0159156 | A1* | 5/2022 | Zhang .................... G02B 13/04 |
| 2022/0214528 | A1 | 7/2022 | Matsumura et al. |
| 2022/0221694 | A1 | 7/2022 | Shobayashi et al. |
| 2022/0365316 | A1* | 11/2022 | Jia ............................ G02B 9/64 |

FOREIGN PATENT DOCUMENTS

| | | |
|---|---|---|
| CN | 110221402 A | 9/2019 |
| CN | 110333594 A | 10/2019 |
| CN | 110376710 A | 10/2019 |
| CN | 110412747 A | 11/2019 |
| CN | 110687658 A | 1/2020 |
| CN | 109445068 B | 2/2020 |
| CN | 110824676 A | 2/2020 |
| CN | 110927933 A | 3/2020 |
| CN | 110927936 A | 3/2020 |
| CN | 110941078 A | 3/2020 |
| CN | 110941079 A | 3/2020 |
| CN | 110955026 A | 4/2020 |
| CN | 110955027 A | 4/2020 |
| CN | 111007639 A | 4/2020 |
| CN | 111007642 A | 4/2020 |
| CN | 111007645 A | 4/2020 |
| CN | 111007646 A | 4/2020 |
| CN | 111025562 A | 4/2020 |
| CN | 111025563 A | 4/2020 |
| CN | 111025564 A | 4/2020 |
| CN | 111025567 A | 4/2020 |
| CN | 111025571 A | 4/2020 |
| CN | 111025573 A | 4/2020 |
| CN | 111025575 A | 4/2020 |
| CN | 111025577 A | 4/2020 |
| CN | 111025578 A | 4/2020 |
| CN | 111367047 A | 7/2020 |
| CN | 111367048 A | 7/2020 |
| CN | 111665612 A | 9/2020 |
| CN | 211857034 U | 11/2020 |
| CN | 113126248 A | 7/2021 |
| JP | 2013130820 A | 7/2013 |
| WO | 2016194111 A1 | 12/2016 |
| WO | 2020007068 A1 | 1/2020 |
| WO | 2020007080 A1 | 1/2020 |
| WO | 2021078641 A1 | 4/2021 |
| WO | 2021128064 A1 | 7/2021 |
| WO | 2021128121 A1 | 7/2021 |
| WO | 2021128122 A1 | 7/2021 |
| WO | 2021128123 A1 | 7/2021 |
| WO | 2021128124 A1 | 7/2021 |
| WO | 2021128133 A1 | 7/2021 |
| WO | 2021128136 A1 | 7/2021 |
| WO | 2021128137 A1 | 7/2021 |
| WO | 2021128138 A1 | 7/2021 |
| WO | 2021128139 A1 | 7/2021 |
| WO | 2021128140 A1 | 7/2021 |
| WO | 2021128144 A1 | 7/2021 |
| WO | 2021128183 A1 | 7/2021 |
| WO | 2021128185 A1 | 7/2021 |
| WO | 2021128187 A1 | 7/2021 |
| WO | 2021128190 A1 | 7/2021 |
| WO | 2021128195 A1 | 7/2021 |
| WO | 2021159406 A1 | 8/2021 |

* cited by examiner

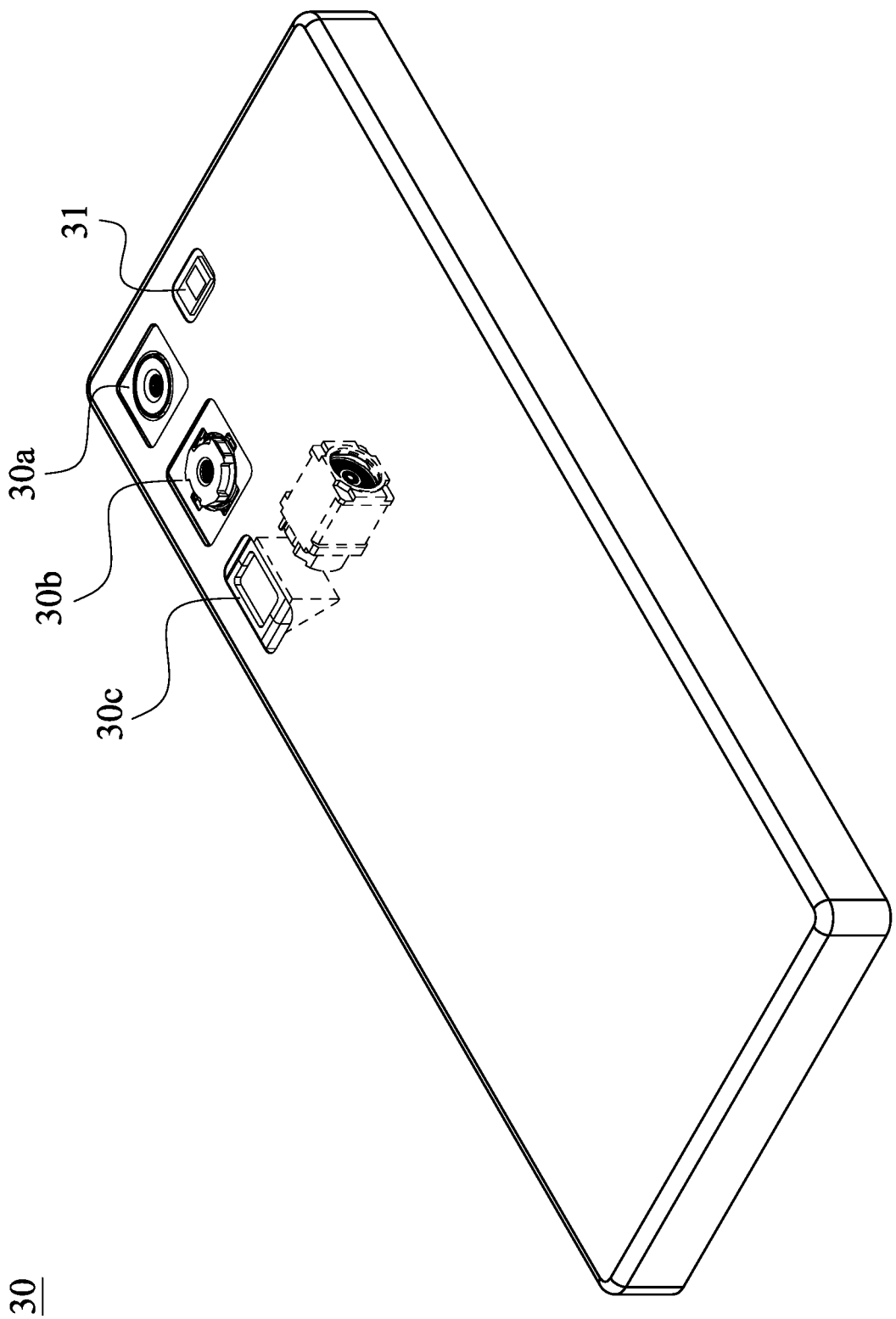

IMAGE CAPTURING LENS ASSEMBLY, IMAGING APPARATUS AND ELECTRONIC DEVICE

RELATED APPLICATIONS

This application claims priority to Taiwan Application Serial Number 109118204, filed May 29, 2020, which is herein incorporated by reference.

BACKGROUND

Technical Field

The present disclosure relates to an image capturing lens assembly and an imaging apparatus. More particularly, the present disclosure relates to an image capturing lens assembly and an imaging apparatus with compact size applicable to electronic devices.

Description of Related Art

With recent technology of semiconductor process advances, performances of image sensors are enhanced, so that the smaller pixel size can be achieved. Therefore, optical lens assemblies with high image quality have become an indispensable part of many modern electronics. With rapid developments of technology, applications of electronic devices equipped with optical lens assemblies increase and there is a wide variety of requirements for optical lens assemblies. However, in a conventional optical lens assembly, it is hard to balance among image quality, sensitivity, aperture size, volume or field of view. Thus, there is a demand for an optical lens assembly that meets the aforementioned needs.

SUMMARY

According to one aspect of the present disclosure, an image capturing lens assembly includes seven lens elements, the seven lens elements being, in order from an object side to an image side along an optical path, a first lens element, a second lens element, a third lens element, a fourth lens element, a fifth lens element, a sixth lens element and a seventh lens element. Each of the seven lens elements has an object-side surface towards the object side and an image-side surface towards the image side. The first lens element has negative refractive power. The third lens element has positive refractive power. The fourth lens element has the image-side surface being concave in a paraxial region thereof. The fifth lens element has positive refractive power. The seventh lens element with negative refractive power has the object-side surface being convex in a paraxial region thereof and the image-side surface being concave in a paraxial region thereof. At least one of the object-side surface and the image-side surface of at least one of the seven lens elements is aspheric and includes at least one inflection point. When a half of a maximum field of view of the image capturing lens assembly is HFOV, a focal length of the third lens element is f3, a focal length of the sixth lens element is f6, a central thickness of the third lens element is CT3, and a central thickness of the seventh lens element is CT7, the following conditions are satisfied: 42.5 degrees<HFOV; 2.30<|f6/f3|; and 1.25<CT3/CT7.

According to one aspect of the present disclosure, an imaging apparatus includes the image capturing lens assembly of the aforementioned aspect and an image sensor, wherein the image sensor is disposed on an image surface of the image capturing lens assembly.

According to one aspect of the present disclosure, an electronic device includes the imaging apparatus of the aforementioned aspect.

According to one aspect of the present disclosure, an image capturing lens assembly includes seven lens elements, the seven lens elements being, in order from an object side to an image side along an optical path, a first lens element, a second lens element, a third lens element, a fourth lens element, a fifth lens element, a sixth lens element and a seventh lens element. Each of the seven lens elements has an object-side surface towards the object side and an image-side surface towards the image side. The first lens element has negative refractive power. The third lens element with positive refractive power has the object-side surface being convex in a paraxial region thereof. The fourth lens element has the image-side surface being concave in a paraxial region thereof. The fifth lens element with positive refractive power has the image-side surface being convex in a paraxial region thereof. The seventh lens element with negative refractive power has the object-side surface being convex in a paraxial region thereof and the image-side surface being concave in a paraxial region thereof. At least one of the object-side surface and the image-side surface of at least one of the seven lens elements is aspheric and includes at least one inflection point. When a half of a maximum field of view of the image capturing lens assembly is HFOV, a central thickness of the first lens element is CT1, a central thickness of the third lens element is CT3, a central thickness of the fifth lens element is CT5, and a central thickness of the seventh lens element is CT7, the following conditions are satisfied: 42.5 degrees<HFOV; and 5.0<(CT1+CT3+CT5)/CT7.

According to one aspect of the present disclosure, an image capturing lens assembly includes seven lens elements, the seven lens elements being, in order from an object side to an image side along an optical path, a first lens element, a second lens element, a third lens element, a fourth lens element, a fifth lens element, a sixth lens element and a seventh lens element. Each of the seven lens elements has an object-side surface towards the object side and an image-side surface towards the image side. The first lens element with negative refractive power has the object-side surface being concave in a paraxial region thereof. The object-side surface of the first lens element is aspheric and includes at least one inflection point. The third lens element has positive refractive power. The seventh lens element has negative refractive power. When an Abbe number of the sixth lens element is V6, and an Abbe number of the seventh lens element is V7, the following condition is satisfied: 15.0<V6+V7<70.0.

According to one aspect of the present disclosure, an imaging apparatus includes the image capturing lens assembly of the aforementioned aspect and an image sensor, wherein the image sensor is disposed on an image surface of the image capturing lens assembly.

According to one aspect of the present disclosure, an electronic device includes the imaging apparatus of the aforementioned aspect.

BRIEF DESCRIPTION OF THE DRAWINGS

The present disclosure can be more fully understood by reading the following detailed description of the embodiment, with reference made to the accompanying drawings as follows:

FIG. 24 is a schematic view of one side of an electronic device according to the 13th embodiment of the present disclosure.

DETAILED DESCRIPTION

Figure 1:
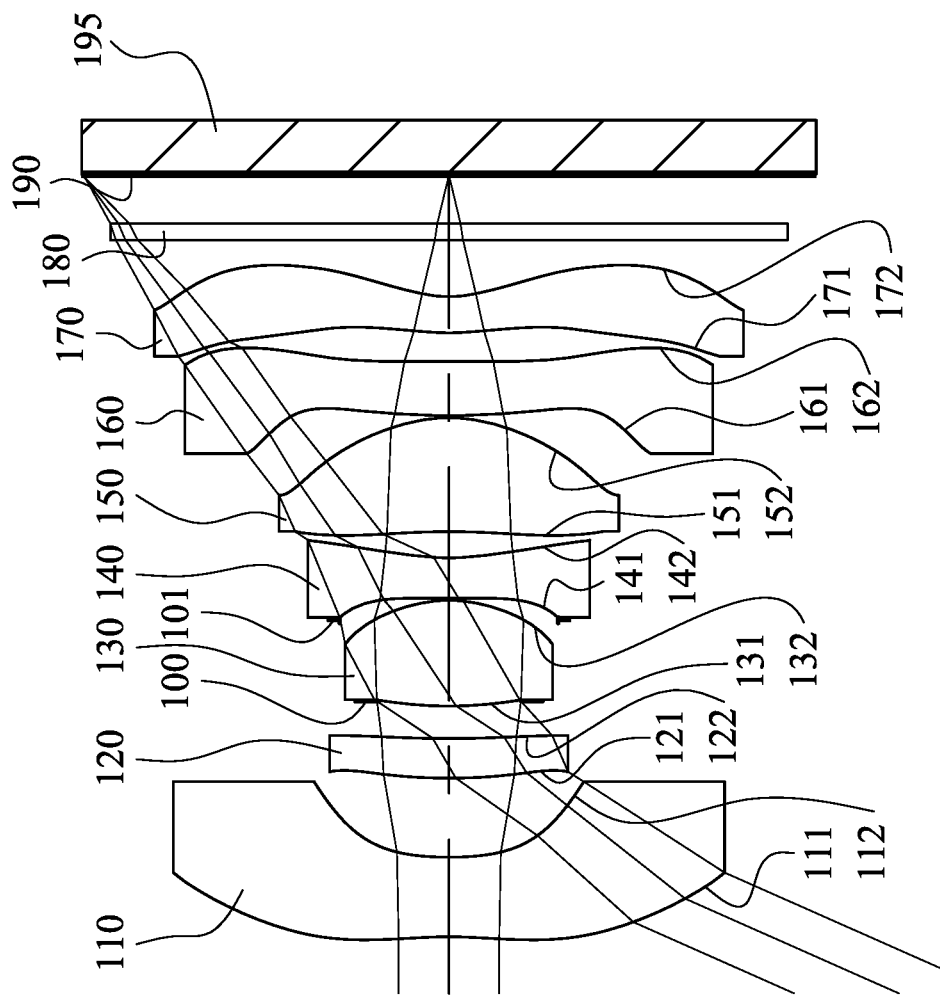
FIG. 1 is a schematic view of an imaging apparatus according to the 1st embodiment of the present disclosure.

An image capturing lens assembly includes seven lens elements, the seven lens elements being, in order from an object side to an image side along an optical path, a first lens element, a second lens element, a third lens element, a fourth lens element, a fifth lens element, a sixth lens element and a seventh lens element. Each of the seven lens elements has an object-side surface towards the object side and an image-side surface towards the image side.

The first lens element has negative refractive power, so that it is favorable for enlarging the field of view so as to form the arrangement of the image capturing lens assembly with wide field of view and balancing aberrations generated by compressing the volume of the image capturing lens assembly. The first lens element can have the object-side surface being concave in a paraxial region thereof, so that it is favorable for maintaining the size with the arrangement of wide field of view by adjusting the refractive power of the first lens element. The first lens element can have the image-side surface being concave in a paraxial region thereof, so that it is favorable for compressing the size of the image capturing lens assembly by adjusting the angle of the incident light entering into the second lens element.

The third lens element has positive refractive power, so that the total track length of the image capturing lens assembly can be compressed. The third lens element can have the object-side surface being convex in a paraxial region thereof, so that it is favorable for enlarging the field of view by adjusting the traveling direction of the light on the object side of the image capturing lens assembly. The third lens element can have the image-side surface being convex in a paraxial region thereof, so that it is favorable for enlarging the area of the image surface and correcting off-axis aberrations by adjusting the traveling direction of the light on the image side of the image capturing lens assembly.

The fourth lens element can have the image-side surface being concave in a paraxial region thereof, which is favorable for correcting aberrations, such as astigmatism.

The fifth lens element can have positive refractive power, so that it is favorable for compressing the size and reducing the sensitivity by balancing the arrangement of the positive refractive power of the image capturing lens assembly. The fifth lens element can have the image-side surface being convex in a paraxial region thereof, so that it is favorable for enlarging the area of the image surface and correcting off-axis aberrations by adjusting the light traveling direction.

The seventh lens element has negative refractive power, so that it is favorable for adjusting the back focal length and balancing the arrangement of the refractive power on the image side of the image capturing lens assembly so as to reduce aberrations, such as spherical aberration etc. The seventh lens element can have the object-side surface being convex in a paraxial region thereof, so that it is favorable for correcting off-axis image distortion by adjusting the surface shape of the seventh lens element. The seventh lens element has the image-side surface being concave in a paraxial region thereof, so that it is favorable for adjusting the back focal length by adjusting the surface shape and the refractive power of the seventh lens element.

At least one of the object-side surface and the image-side surface of at least one of the seven lens elements can be aspheric and can comprise at least one inflection point, so that the variation of the surface of the lens elements can be enhanced, which is favorable for compressing the size and enhancing the image quality. Further, at least one of the object-side surface and the image-side surface of each of at least two of the seven lens elements can be aspheric and can comprise at least one inflection point. Moreover, at least one of the object-side surface and the image-side surface of each of at least three of the seven lens elements can be aspheric and can comprise at least one inflection point. Furthermore, the object-side surface of the first lens element can be aspheric and can comprise at least one inflection point, so that it is favorable for increasing the illumination and enhancing the image quality of the light from wide field of view on the image surface by adjusting the direction of the incident light entering into the image capturing lens assembly.

At least one of the object-side surface and the image-side surface of at least one of the seven lens elements can comprise at least one critical point in an off-axis region thereof. Therefore, it is favorable for compressing the size, correcting off-axis aberrations and enlarging the field of view and image surface by increasing the variation of the surface of the lens elements. Further, at least one of the object-side surface and the image-side surface of each of at least two of the seven lens elements can comprise at least one critical point in an off-axis region thereof.

The object-side surface of the first lens element can comprise at least one critical point in an off-axis region thereof, so that it is favorable for increasing the illumination and enhancing the image quality on the peripheral region of the image surface by adjusting the angle of incident light from wide field of view entering into the image capturing lens assembly. Further, when a distance between the at least one critical point of the object-side surface of the first lens element and an optical axis is Yc11, and a maximum distance between an optical effective region of the object-side surface of the first lens element and the optical axis is Y11, the following condition is satisfied: 0.20<Yc11/Y11<0.55. Therefore, it is favorable for enhancing the image quality on the peripheral region of the image surface by further adjusting the surface shape of the first lens element.

The object-side surface of the seventh lens element can comprise at least one critical point in an off-axis region thereof, so that off-axis aberrations can be corrected by adjusting the surface shape of the seventh lens element. The image-side surface of the seventh lens element can comprise at least one critical point in an off-axis region thereof, so that the incident angle of the light on the image surface can be adjusted so as to enhance the response efficiency of the image sensor. Further, when a distance between the at least one critical point of the image-side surface of the seventh lens element and the optical axis is Yc72, and a maximum distance between an optical effective region of the image-side surface of the seventh lens element and the optical axis is Y72, the following condition is satisfied: 0.40<Yc72/Y72<0.70. Therefore, it is favorable for enhancing the image quality on the peripheral region of the image surface by further adjusting the surface shape of the seventh lens element.

When a half of a maximum field of view of the image capturing lens assembly is HFOV, the following condition is satisfied: 42.5 degrees<HFOV. Therefore, the image capturing lens assembly can obtain the characteristic of wide field of view. Further, the following condition can be satisfied: 52.5 degrees<HFOV; or 60.0 degrees<HFOV. Moreover, the following condition can be satisfied: HFOV<90.0 degrees, so that aberrations, such as distortion etc. due to the excessive field of view can be reduced. Furthermore, the following condition can be satisfied: HFOV<80.0 degrees; or HFOV<70.0 degrees. Moreover, the following condition can be satisfied: 52.5 degrees<HFOV<80.0 degrees.

When a focal length of the third lens element is f3, and a focal length of the sixth lens element is f6, the following condition is satisfied: 2.30<|f6/f3|. Therefore, it is favorable for compressing the size and correcting aberrations by adjusting the arrangement of the refractive power of the image capturing lens assembly. Further, the following condition can be satisfied: 3.40<|f6/f3|. Moreover, the following condition can be satisfied: 4.50<|f6/f3|.

When a central thickness of the third lens element is CT3, and a central thickness of the seventh lens element is CT7, the following condition is satisfied: 1.25<CT3/CT7. Therefore, it is favorable for compressing the volume and enlarging the field of view by adjusting the arrangement of the lens elements. Further, the following condition can be satisfied: 1.50<CT3/CT7<5.00. Furthermore, the following condition can be satisfied: 1.75<CT3/CT7<4.00. Moreover, the following condition can be satisfied: 2.00<CT3/CT7<3.20.

When a central thickness of the first lens element is CT1, the central thickness of the third lens element is CT3, a central thickness of the fifth lens element is CT5, and the central thickness of the seventh lens element is CT7, the following condition is satisfied: 5.0<(CT1+CT3+CT5)/CT7. Therefore, it is favorable for obtaining the balance among the field of view, size and image quality by adjusting the arrangement of the lens elements. Further, the following condition can be satisfied: 5.6<(CT1+CT3+CT5)/CT7<20.0. Furthermore, the following condition can be satisfied: 6.0<(CT1+CT3+CT5)/CT7<12.0.

When an Abbe number of the sixth lens element is V6, and an Abbe number of the seventh lens element is V7, the following condition is satisfied: 15.0<V6+V7<70.0. Therefore, it is favorable for correcting chromatic aberrations by cooperating the material of the sixth lens element and the seventh lens element. Further, the following condition can be satisfied: 20.0<V6+V7<60.0. Furthermore, the following condition can be satisfied: 25.0<V6+V7<50.0.

When an Abbe number of the first lens element is V1, an Abbe number of the second lens element is V2, an Abbe number of the third lens element is V3, an Abbe number of the fourth lens element is V4, an Abbe number of the fifth lens element is V5, the Abbe number of the sixth lens element is V6, and the Abbe number of the seventh lens element is V7, the following condition is satisfied: 1.40<(V1+V3+V5)/(V2+V4+V6+V7)<3.00. Therefore, it is favorable for correcting aberrations, such as chromatic aberrations etc. by adjusting the arrangement of the material of the image capturing lens assembly. Further, the following condition can be satisfied: 1.60<(V1+V3+V5)/(V2+V4+V6+V7)<2.50.

When the maximum distance between the optical effective region of the object-side surface of the first lens element and the optical axis is Y11, and the maximum distance between the optical effective region of the image-side surface of the seventh lens element and the optical axis is Y72, the following condition is satisfied: $0.50<Y11/Y72<1.35$. Therefore, it is favorable for obtaining the balance between the size and the field of view by adjusting the outer diameter of the lens element.

When the central thickness of the first lens element is CT1, a central thickness of the second lens element is CT2, and an axial distance between the first lens element and the second lens element is T12, the following condition is satisfied: $1.2<(CT1+CT2)/T12<2.7$. Therefore, it is favorable for enlarging the field of view and aperture by cooperating the first lens element and the second lens element.

When a focal length of the image capturing lens assembly is f, and a curvature radius of the object-side surface of the first lens element is R1, the following condition is satisfied: $-1.2<f/R1<-0.30$. Therefore, it is favorable for enlarging the field of view and compressing the size by adjusting the surface shape and the refractive power of the first lens element.

When a curvature radius of the object-side surface of the third lens element is R5, and a curvature radius of the image-side surface of the third lens element is R6, the following condition is satisfied: $1.65<(R5-R6)/(R5+R6)<5.20$. Therefore, the volume can be compressed by adjusting the surface shape of the third lens element.

When the focal length of the image capturing lens assembly is f, and a composite focal length of the sixth lens element and the seventh lens element is f67, the following condition is satisfied: $-0.90<f/67<-0.23$. Therefore, it is favorable for adjusting the back focal length and correcting aberrations by cooperating the sixth lens element and the seventh lens element.

When an axial distance between the object-side surface of the first lens element and the image-side surface of the seventh lens element is TD, and an entrance pupil diameter of the image capturing lens assembly is EPD, the following condition is satisfied: $3.0<TD/EPD<9.0$. Therefore, it is favorable for obtaining the balance between the volume of the lens elements and the size of the aperture. Further, the following condition can be satisfied: $4.5<TD/EPD<7.0$.

When a sum of central thicknesses of all lens elements of the image capturing lens assembly is ΣCT, and a sum of all axial distances between adjacent lens elements of the image capturing lens assembly is ΣAT, the following condition is satisfied: $2.2<\Sigma CT/\Sigma AT<3.6$. Therefore, the volume can be compressed by adjusting the arrangement of the lens elements.

When the Abbe number of the sixth lens element is V6, the following condition is satisfied: $10.0<V6<33.0$. Therefore, it is favorable for correcting chromatic aberrations by adjusting the material of the sixth lens element. Further, the following condition can be satisfied: $13.0<V6<28.0$.

When a curvature radius of the object-side surface of the seventh lens element is R13, and a curvature radius of the image-side surface of the seventh lens element is R14, the following condition is satisfied: $1.90<R13/R14<2.60$. Therefore, it is favorable for correcting aberrations by adjusting the surface shape of the seventh lens element.

When a focal length of the first lens element is f1, and a focal length of the seventh lens element is f7, the following condition is satisfied: $0.80<f1/F7<1.7$. Therefore, it is favorable for enlarging the field of view and compressing the volume of the image capturing lens assembly by adjusting the arrangement of the refractive power.

When an f-number of the image capturing lens assembly is Fno, the following condition is satisfied: $1.4<Fno<2.8$. Therefore, it is favorable for obtaining the balance between the field of view and the illumination of the image surface.

When the Abbe number of the first lens element is V1, and the Abbe number of the second lens element is V2, the following condition is satisfied: $1.2<V1/V2<4.0$. Therefore, it is favorable for correcting aberrations by cooperating the material of the first lens element and the second lens element.

When the central thickness of the first lens element is CT1, a central thickness of the sixth lens element is CT6, and the central thickness of the seventh lens element is CT7, the following condition is satisfied: $0.85<(CT6+CT7)/CT1<2.0$. Therefore, it is favorable for enlarging the field of view and compressing the volume by adjusting the arrangement of the lens elements.

When an axial distance between the object-side surface of the first lens element and the image surface is TL, and the focal length of the image capturing lens assembly is f, the following condition is satisfied: $1.7<TL/f<4.5$. Therefore, it is favorable for obtaining the balance between the total track length and the field of view. Further, the following condition can be satisfied: $2.2<TL/f<4.0$.

When the axial distance between the object-side surface of the first lens element and the image surface is TL, and an maximum image height of the image capturing lens assembly is ImgH, the following condition is satisfied: $1.0<TL/ImgH<4.0$. Therefore, it is favorable for obtaining the balance between the total track length and the size of the image surface. Further, the following condition can be satisfied: $1.5<TL/ImgH<3.0$.

When a focal length of the image capturing lens assembly is f, the focal length of the first lens element is f1, a focal length of the second lens element is f2, the focal length of the third lens element is f3, a focal length of the fourth lens element is f4, a focal length of the fifth lens element is f5, the focal length of the sixth lens element is f6, and the focal length of the seventh lens element is f7, at least one of the following conditions is satisfied: $-0.75<f/f1<-0.30$; $|f/f2|<0.80$; $0.65<f/f3<1.3$; $|f/f4|<1.0$; $0.40<f/f5<0.90$; $|f/f6|<0.60$; and $-1.0<f/f7<-0.20$. Therefore, it is favorable for enlarging the field of view, compressing the volume and enhancing the image quality by adjusting the refractive power of the lens elements. Further, at least one of the following conditions can be satisfied: $|f/f2|<0.50$; and $|f/f4|<0.80$.

When the focal length of the third lens element is f3, and the focal length of the fifth lens element is f5, the following condition is satisfied: $0.50<f3/f5<1.2$. Therefore, it is favorable for compressing the volume by adjusting the arrangement of the refractive power.

When the focal length of the image capturing lens assembly is f, and the curvature radius of the image-side surface of the seventh lens element is R14, the following condition is satisfied: $1.4<f/R14<2.4$. Therefore, it is favorable for adjusting the back focal length and correcting aberrations by adjusting the surface shape and the refractive power of the seventh lens element.

Each of the aforementioned features of the image capturing lens assembly can be utilized in various combinations for achieving the corresponding effects.

According to the image capturing lens assembly of the present disclosure, the lens elements thereof can be made of glass or plastic materials. When the lens elements are made of glass materials, the distribution of the refractive power of the image capturing lens assembly may be more flexible to design. The glass lens element can either be made by grinding or molding. When the lens elements are made of plastic materials, manufacturing costs can be effectively reduced. Furthermore, surfaces of each lens element can be arranged to be aspheric (ASP), since the aspheric surface of the lens element is easy to form a shape other than a spherical surface so as to have more controllable variables for eliminating aberrations thereof, and to further decrease the required amount of lens elements in the image capturing lens assembly. Therefore, the total track length of the image capturing lens assembly can also be reduced. The aspheric surfaces may be formed by a plastic injection molding method, a glass molding method or other manufacturing methods.

According to the image capturing lens assembly of the present disclosure, additives can be selectively added into any one (or more) material of the lens elements so as to change the transmittance of the lens element in a particular wavelength range. Therefore, the stray light and chromatic aberration can be reduced. For example, the additives can have the absorption ability for lights in a wavelength range of 600 nm-800 nm in the image capturing lens assembly so as to reduce extra red light or infrared lights, or the additives can have the absorption ability for lights in a wavelength range of 350 nm-450 nm in the image capturing lens assembly so as to reduce blue light or ultraviolet lights. Therefore, additives can prevent the image from interfering by lights in a particular wavelength range. Furthermore, the additives can be homogeneously mixed with the plastic material, and the lens elements can be made by the injection molding method.

According to the image capturing lens assembly of the present disclosure, when a surface of the lens element is aspheric, it indicates that entire optical effective region of the surface of the lens element or a part thereof is aspheric.

According to the image capturing lens assembly of the present disclosure, when the lens elements have surfaces being convex and the convex surface position is not defined, it indicates that the aforementioned surfaces of the lens elements can be convex in the paraxial region thereof. When the lens elements have surfaces being concave and the concave surface position is not been defined, it indicates that the aforementioned surfaces of the lens elements can be concave in the paraxial region thereof. In the image capturing lens assembly of the present disclosure, if the lens element has positive refractive power or negative refractive power, or the focal length of the lens element, all can be referred to the refractive power, or the focal length, in the paraxial region of the lens element.

According to the image capturing lens assembly of the present disclosure, a critical point is a non-axial point of the lens surface where its tangent is perpendicular to the optical axis; an inflection point is a point on a lens surface with a curvature changing from positive to negative or from negative to positive.

According to the image capturing lens assembly of the present disclosure, the image surface thereof, based on the corresponding image sensor, can be flat or curved. In particular, the image surface can be a concave curved surface facing towards the object side. Furthermore, the image capturing lens assembly of the present disclosure can selectively include at least one image correcting element (such as a field flattener) inserted between the lens element closest to the image surface and the image surface, thus the effect of correcting image aberrations (such as field curvature) can be achieved. The optical properties of the aforementioned image correcting element, such as curvature, thickness, refractive index, position, surface shape (convex or concave, spherical or aspheric, diffraction surface and Fresnel surface, etc.) can be adjusted corresponding to the demands of the imaging apparatus. Generally, a preferred configuration of the image correcting element is to dispose a thin plano-concave element having a concave surface toward the object side on the position closed to the image surface.

Figure 26A:
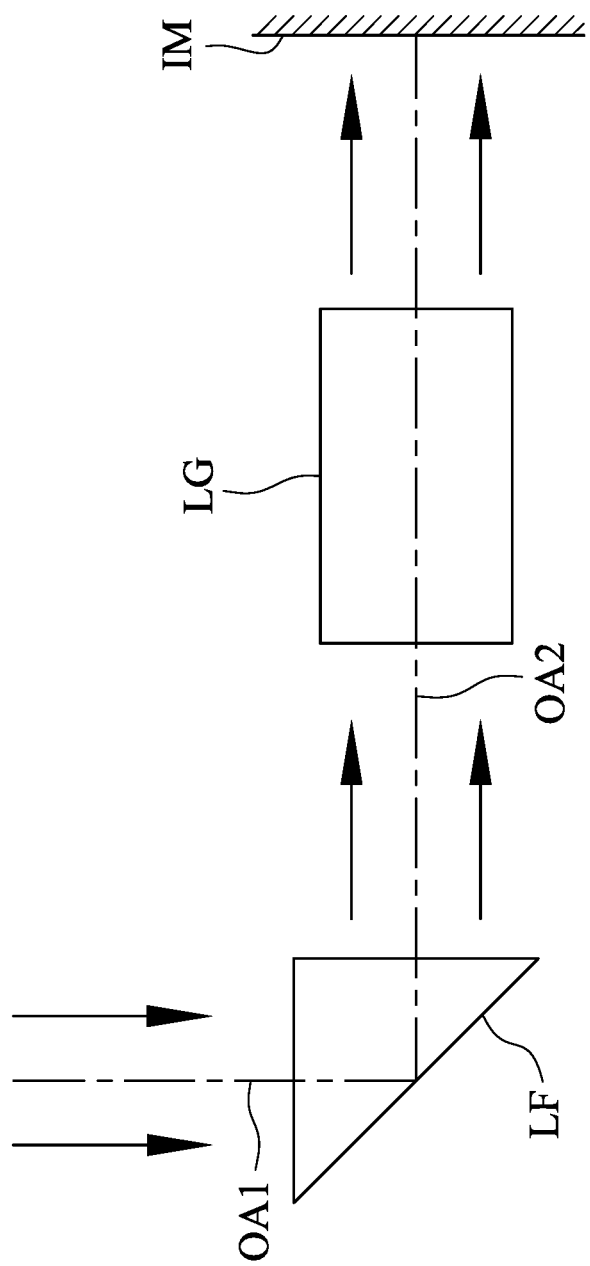
FIG. 26A is a schematic view of an arrangement of a light path folding element in the image capturing lens assembly of the present disclosure.
Figure 26B:
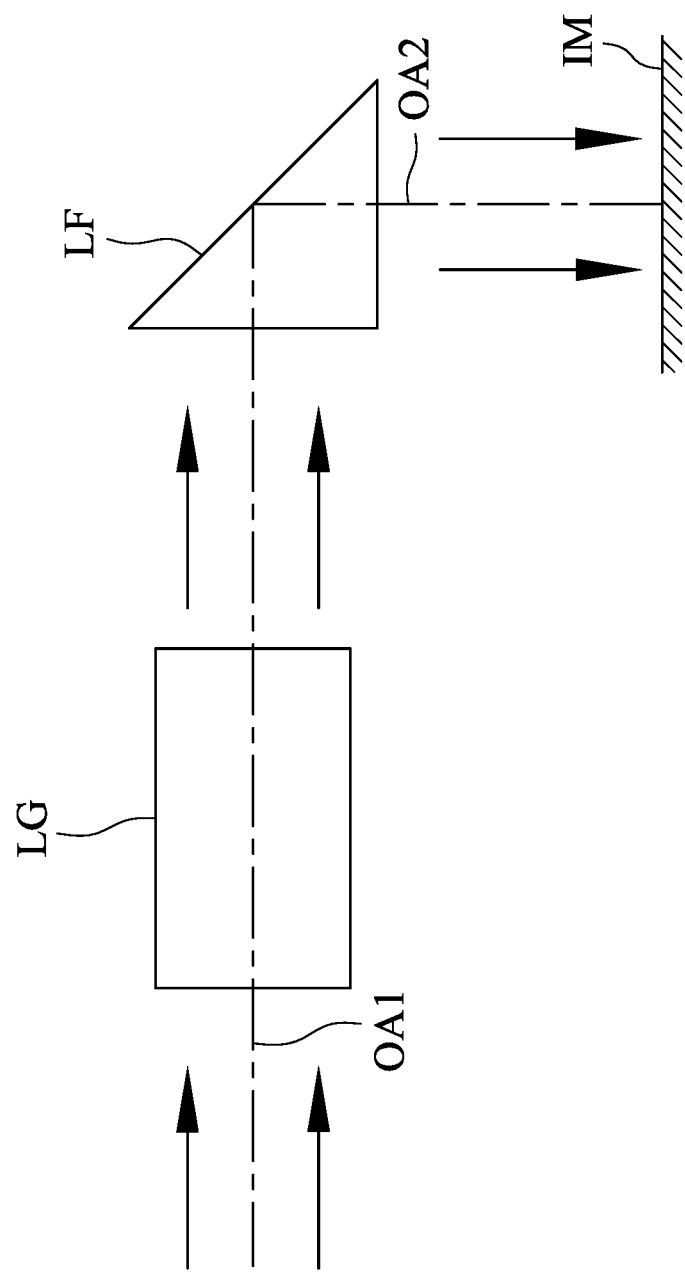
FIG. 26B is a schematic view of another arrangement of the light path folding element in the image capturing lens assembly of the present disclosure.
Figure 26C:
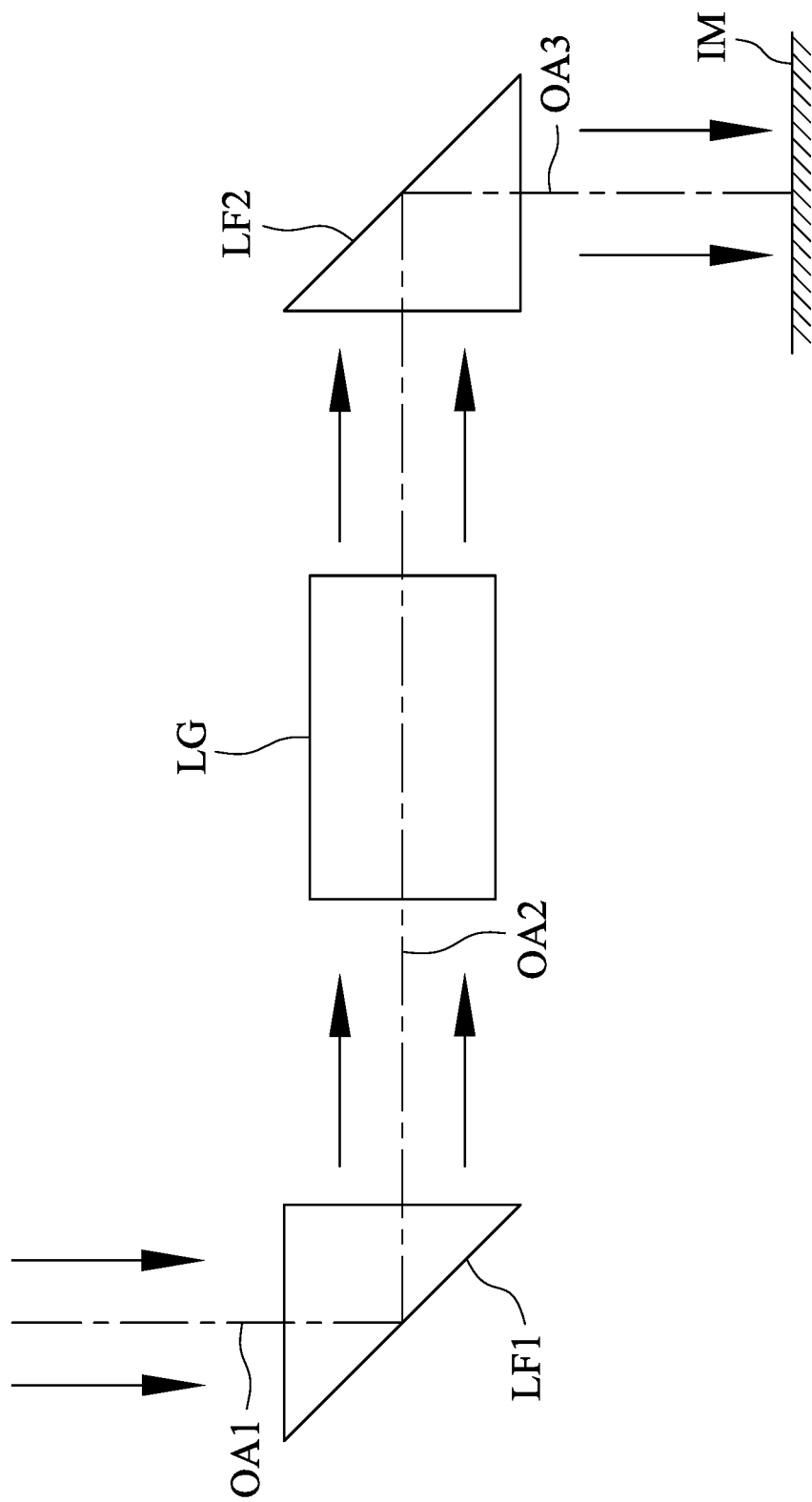
FIG. 26C is a schematic view of an arrangement of two light path folding elements in the image capturing lens assembly of the present disclosure.

According to the image capturing lens assembly of the present disclosure, at least one element with light path folding function can be selectively disposed between the imaged object and the image surface, such as a prism or a mirror, etc. Therefore it is favorable for providing high flexible space arrangement of the image capturing lens assembly, so that the compactness of the electronic device would not be restricted by the optical total track length of the image capturing lens assembly. FIG. 26A is a schematic view of an arrangement of a light path folding element LF in the image capturing lens assembly of the present disclosure. FIG. 26B is a schematic view of another arrangement of the light path folding element LF in the image capturing lens assembly of the present disclosure. As shown in FIGS. 26A and 26B, the image capturing lens assembly includes, in order from an imaged object (not shown in drawings) to an image surface IM, a first optical axis OA1, the light path folding element LF and a second optical axis OA2, wherein the light path folding element LF can be disposed between the imaged object and a lens group LG of the image capturing lens assembly as shown in FIG. 26A, or can be disposed between the lens group LG of the image capturing lens assembly and the image surface IM as shown in FIG. 26B. Moreover, FIG. 26C is a schematic view of an arrangement of two light path folding elements LF1, LF2 in the image capturing lens assembly of the present disclosure. As shown in FIG. 26C, the image capturing lens assembly includes, in order from an imaged object (not shown in drawings) to an image surface IM, a first optical axis OA1, the light path folding element LF1, a second optical axis OA2, the light path folding element LF2 and a third optical axis OA3, wherein the light path folding element LF1 is disposed between the imaged object and a lens group LG of the image capturing lens assembly, and the light path folding element LF2 is disposed between the lens group LG of the image capturing lens assembly and the image surface IM. The image capturing lens assembly can also be selectively disposed with three or more light path folding element, the type, amount and location of the light path folding element will not be limited to the present disclosure.

Furthermore, according to the image capturing lens assembly of the present disclosure, the image capturing lens assembly can include at least one stop, such as an aperture stop, a glare stop or a field stop, for eliminating stray light and thereby improving image resolution thereof.

According to the image capturing lens assembly of the present disclosure, the aperture stop can be configured as a front stop or a middle stop, wherein the front stop indicates that the aperture stop is disposed between an object and the first lens element, and the middle stop indicates that the aperture stop is disposed between the first lens element and the image surface. When the aperture stop is a front stop, a longer distance between an exit pupil of the image capturing lens assembly and the image surface can be obtained, and thereby obtains a telecentric effect and improves the image-sensing efficiency of the image sensor, such as CCD or CMOS. The middle stop is favorable for enlarging the field of view of the image capturing lens assembly and thereby provides a wider field of view for the same.

According to the image capturing lens assembly of the present disclosure, an aperture control unit can be properly configured. The aperture control unit can be a mechanical element or a light controlling element, and the dimension and the shape of the aperture control unit can be electrically controlled. The mechanical element can include a moveable component such a blade group or a shielding plate. The light controlling element can include a screen component such as a light filter, an electrochromic material, a liquid crystal layer or the like. The amount of incoming light or the exposure time of the image can be controlled by the aperture control unit to enhance the image moderation ability. In addition, the aperture control unit can be the aperture stop of the image capturing lens assembly according to the present disclosure, so as to moderate the image quality by changing f-number such as changing the depth of field or the exposure speed.

According to the image capturing lens assembly of the present disclosure, the image capturing lens assembly of the present disclosure can be applied to 3D (three-dimensional) image capturing applications, in products such as digital cameras, mobile devices, digital tablets, smart TVs, surveillance systems, motion sensing input devices, driving recording systems, rearview camera systems, wearable devices, unmanned aerial vehicles, and other electronic imaging products.

According to the present disclosure, an imaging apparatus including the aforementioned image capturing lens assembly and an image sensor is provided, wherein the image sensor is disposed on the image surface of the image capturing lens assembly. By the arrangement of the refractive power of the first lens element, the third lens element and the seventh lens element, it is favorable for forming the arrangement of wide field of view, compressing the volume of the image capturing lens assembly and reducing aberrations. Moreover, the imaging apparatus can further include a barrel member, a holder member or a combination thereof.

According to the present disclosure, an electronic device including the aforementioned imaging apparatus is provided. Therefore, the image quality can be increased. Moreover, the electronic device can further include a control unit, a display, a storage unit, a random-access memory unit (RAM) or a combination thereof.

According to the above description of the present disclosure, the following specific 1st-14th embodiments are provided for further explanation.

1st Embodiment

Figure 2:
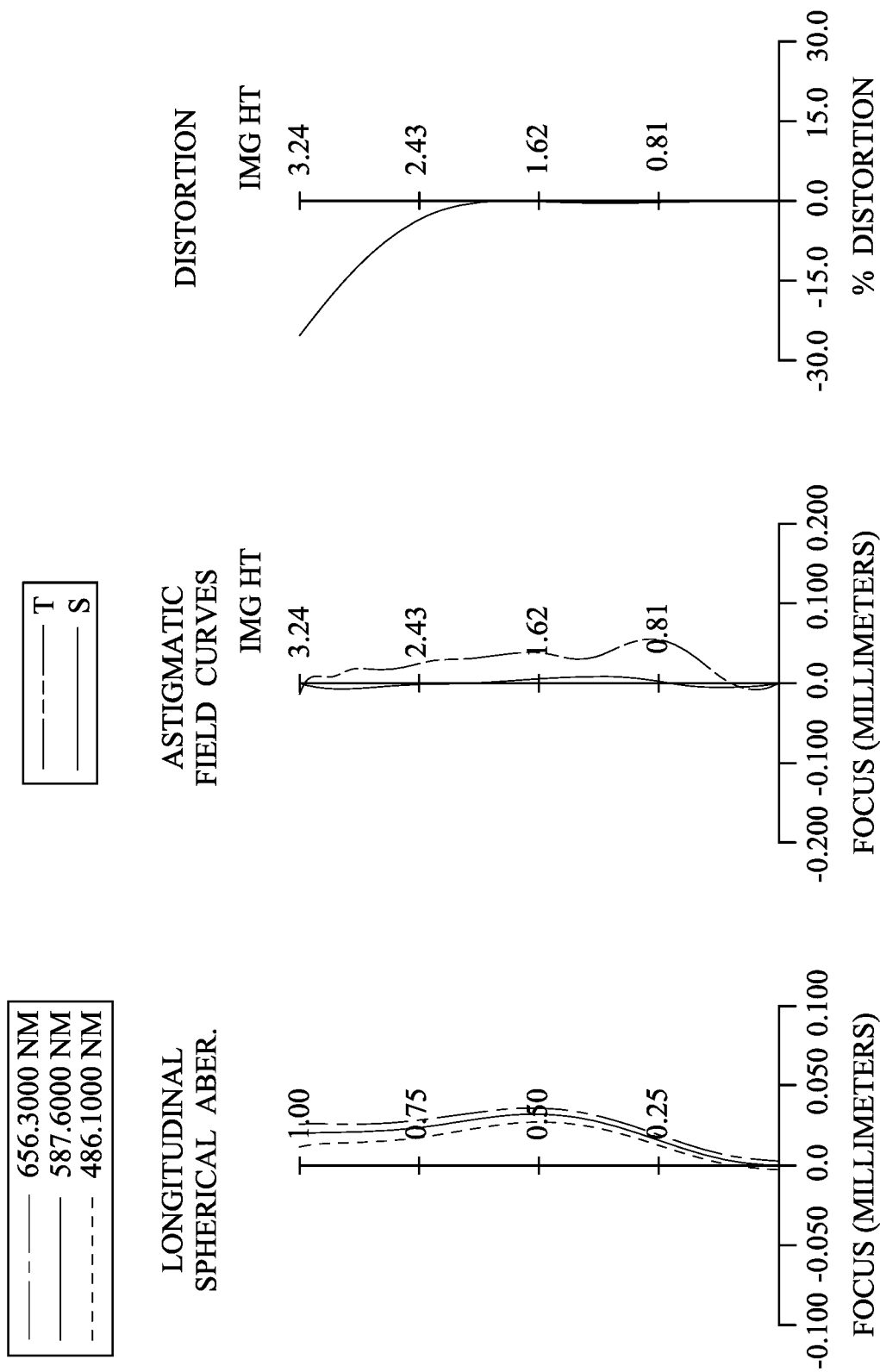
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows spherical aberration curves, astigmatic field curves and a distortion curve of the imaging apparatus according to the 1st embodiment. In FIG. 1, the imaging apparatus includes an image capturing lens assembly (its reference numeral is omitted) and an image sensor 195. The image capturing lens assembly includes, in order from an object side to an image side along an optical path, a first lens element 110, a second lens element 120, an aperture stop 100, a third lens element 130, a stop 101, a fourth lens element 140, a fifth lens element 150, a sixth lens element 160, a seventh lens element 170, a filter 180 and an image surface 190, wherein the image sensor 195 is disposed on the image surface 190 of the image capturing lens assembly. The image capturing lens assembly includes seven lens elements (110, 120, 130, 140, 150, 160, 170) without additional one or more lens elements inserted between the first lens element 110 and the seventh lens element 170.

Figure 21:
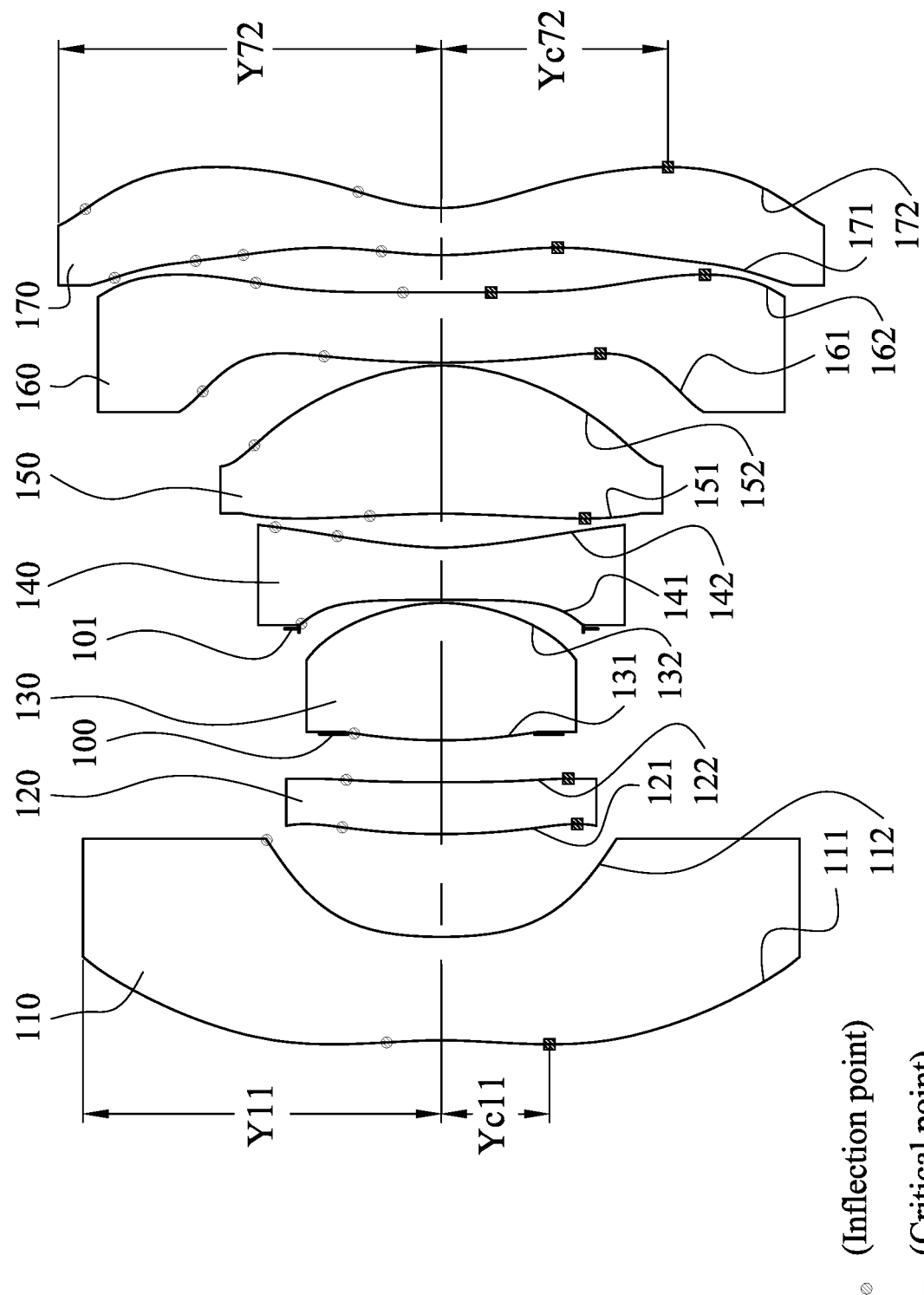
FIG. 21 is a schematic view of partial parameters, inflection points and critical points according to the 1st embodiment of FIG. 1.

The first lens element 110 with negative refractive power has an object-side surface 111 being concave in a paraxial region thereof and an image-side surface 112 being concave in a paraxial region thereof. The first lens element 110 is made of a plastic material, and has the object-side surface 111 and the image-side surface 112 being both aspheric. Furthermore, FIG. 21 is a schematic view of partial parameters, inflection points and critical points according to the 1st embodiment of FIG. 1, wherein the symbol "●" represents the inflection point, the symbol "■" represents the critical point. In FIG. 21, the object-side surface 111 of the first lens element 110 includes one inflection point and one critical point in an off-axis region thereof, and the image-side surface 112 of the first lens element 110 includes one inflection point in an off-axis region thereof.

The second lens element 120 with positive refractive power has an object-side surface 121 being convex in a paraxial region thereof and an image-side surface 122 being concave in a paraxial region thereof. The second lens element 120 is made of a plastic material, and has the object-side surface 121 and the image-side surface 122 being both aspheric. Furthermore, the object-side surface 121 of the second lens element 120 includes one inflection point and one critical point in an off-axis region thereof, and the image-side surface 122 of the second lens element 120 includes one inflection point and one critical point in an off-axis region thereof.

The third lens element 130 with positive refractive power has an object-side surface 131 being convex in a paraxial region thereof and an image-side surface 132 being convex in a paraxial region thereof. The third lens element 130 is made of a plastic material, and has the object-side surface 131 and the image-side surface 132 being both aspheric. Furthermore, the object-side surface 131 of the third lens element 130 includes one inflection point in an off-axis region thereof.

The fourth lens element 140 with negative refractive power has an object-side surface 141 being concave in a paraxial region thereof and an image-side surface 142 being concave in a paraxial region thereof. The fourth lens element 140 is made of a plastic material, and has the object-side surface 141 and the image-side surface 142 being both aspheric. Furthermore, the object-side surface 141 of the fourth lens element 140 includes one inflection point in an off-axis region thereof, and the image-side surface 142 of the fourth lens element 140 includes two inflection points in an off-axis region thereof.

The fifth lens element 150 with positive refractive power has an object-side surface 151 being concave in a paraxial region thereof and an image-side surface 152 being convex in a paraxial region thereof. The fifth lens element 150 is made of a plastic material, and has the object-side surface 151 and the image-side surface 152 being both aspheric. Furthermore, the object-side surface 151 of the fifth lens element 150 includes one inflection point and one critical point in an off-axis region thereof, and the image-side surface 152 of the fifth lens element 150 includes one inflection point in an off-axis region thereof.

The sixth lens element 160 with positive refractive power has an object-side surface 161 being convex in a paraxial region thereof and an image-side surface 162 being planar in a paraxial region thereof. The sixth lens element 160 is made of a plastic material, and has the object-side surface 161 and the image-side surface 162 being both aspheric. Furthermore, the object-side surface 161 of the sixth lens element 160 includes two inflection points and one critical point in an off-axis region thereof, and the image-side surface 162 of the sixth lens element 160 includes two inflection points and two critical points in an off-axis region thereof.

The seventh lens element 170 with negative refractive power has an object-side surface 171 being convex in a paraxial region thereof and an image-side surface 172 being concave in a paraxial region thereof. The seventh lens element 170 is made of a plastic material, and has the object-side surface 171 and the image-side surface 172 being both aspheric. Furthermore, the object-side surface 171 of the seventh lens element 170 includes four inflection points and one critical point in an off-axis region thereof, and the image-side surface 172 of the seventh lens element 170 includes two inflection points and one critical point in an off-axis region thereof.

The filter 180 is made of a glass material, which is located between the seventh lens element 170 and the image surface 190 in order, and will not affect the focal length of the image capturing lens assembly.

The equation of the aspheric surface profiles of the aforementioned lens elements of the 1st embodiment is expressed as follows:

$$X(Y) = (Y^2/R)/(1 + sqrt(1-(1+k)\times(Y/R)^2)) + \sum_i (Ai)\times(Y^i),$$

where,
X is the displacement in parallel with an optical axis from the intersection point of the aspheric surface and the optical axis to a point at a distance of Y from the optical axis on the aspheric surface;
Y is the vertical distance from the point on the aspheric surface to the optical axis;
R is the curvature radius;
k is the conic coefficient; and
Ai is the i-th aspheric coefficient.

In the image capturing lens assembly according to the 1st embodiment, when a focal length of the image capturing lens assembly is f, an f-number of the image capturing lens assembly is Fno, and a half of a maximum field of view of the image capturing lens assembly is HFOV, these parameters have the following values: f=1.91 mm; Fno=2.15: and HFOV=66.1 degrees.

In the image capturing lens assembly according to the 1st embodiment, when an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, an Abbe number of the sixth lens element 160 is V6, and an Abbe number of the seventh lens element 170 is V, the following conditions are satisfied: (V1+V3+V5)/(V2+V4+V6+V7)= 1.88; V1/V2=2.49; V6=26.0; and V6+V7=44.4.

In the image capturing lens assembly according to the 1st embodiment, when a central thickness of the first lens element 110 is CT1, a central thickness of the second lens element 120 is CT2, a central thickness of the third lens element 130 is CT3, a central thickness of the fourth lens element 140 is CT4, a central thickness of the fifth lens element 150 is CT5, a central thickness of the sixth lens element 160 is CT6, a central thickness of the seventh lens element 170 is CT7, a sum of central thicknesses of all lens elements of the image capturing lens assembly is ΣCT, an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, an axial distance between the sixth lens element 160 and the seventh lens element 170 is T67, and a sum of all axial distances between adjacent lens elements of the image capturing lens assembly is ΣAT, the following condition are satisfied: ΣCT/ΣAT=2.75; (CT1+CT2)/T12=1.51; (CT1+CT3+CT5)/CT7=8.26; CT3/CT7=2.92; and (CT6+CT7)/CT1=1.14; according to the 1st embodiment, the axial distance between adjacent lens elements is the distance along the optical axis between two adjacent lens surfaces of the two adjacent lens elements; ΣCT=CT1+CT2+CT3+CT4+CT5+CT6+CT7; ΣAT=T12+T23+T34+T45+T56+T67.

In the image capturing lens assembly according to the 1st embodiment, when an axial distance between the object-side surface 111 of the first lens element 110 and the image-side surface 172 of the seventh lens element 170 is TD, and an entrance pupil diameter of the image capturing lens assembly is EPD, the following condition is satisfied: TD/EPD=6.37.

In the image capturing lens assembly according to the 1st embodiment, when an axial distance between the object-side surface 111 of the first lens element 110 and the image surface 190 is TL, the focal length of the image capturing lens assembly is f, and a maximum image height of the image capturing lens assembly is ImgH, the following conditions are satisfied: TL/f=3.53; and TL/ImgH=2.08.

In the image capturing lens assembly according to the 1st embodiment, when a curvature radius of the object-side surface 131 of the third lens element 130 is R5, a curvature radius of the image-side surface 132 of the third lens element 130 is R6, a curvature radius of the object-side surface 171 of the seventh lens element 170 is R13, and a curvature radius of the image-side surface 172 of the seventh lens element 170 is R14, the following conditions are satisfied: (R5-R6)/(R5+R6)=1.85; and R13/R14=2.31.

In the image capturing lens assembly according to the 1st embodiment, when the focal length of the image capturing lens assembly is f, a focal length of the first lens element 110 is f1, a focal length of the second lens element 120 is f2, a focal length of the third lens element 130 is f3, a focal length of the fourth lens element 140 is f4, a focal length of the fifth lens element 150 is f5, a focal length of the sixth lens element 160 is f6, a focal length of the seventh lens element 170 is f7, a composite focal length of the sixth lens element 160 and the seventh lens element 170 is f67, a curvature radius of the object-side surface 111 of the first lens element 110 is R1, and the curvature radius of the image-side surface 172 of the seventh lens element 170 is R14, the following conditions are satisfied: f/f1=−0.59; |f/f2|=0.18; f/f3=1.08; |f/f4|=0.59; f/f5=0.59; |f/f6|=0.20; f/f7=−0.59; f/f67=−0.34; f/R1=−0.50; f/R14=1.68; f1/f7=1.00; f3/f5=0.55; and |f6/f3|=5.42.

In the image capturing lens assembly according to the 1st embodiment, when a maximum distance between an optical effective region of the object-side surface 111 of the first lens element 110 and the optical axis is Y11 (labelled in FIG. 21), a maximum distance between an optical effective region of the image-side surface 172 of the seventh lens element 170 and the optical axis is Y72 (labelled in FIG. 21), a distance between the critical point of the object-side surface 111 of the first lens element 110 and the optical axis is Yc11 (labelled in FIG. 21), a distance between the critical point of the image-side surface 172 of the seventh lens element 170 and the optical axis is Yc72 (labelled in FIG. 21), the following conditions are satisfied: Y11/Y72=0.94; Yc11/Y11=0.30; and Yc72/Y72=0.59.

The detailed optical data of the 1 st embodiment are shown in Table 1 and the aspheric surface data are shown in Table 2 below.

In Table 1, the curvature radius, the thickness and the focal length are shown in millimeters (mm). Surface numbers 0-21 represent the surfaces sequentially arranged from the object side to the image side along the optical axis. In Table 2, k represents the conic coefficient of the equation of

TABLE 1

1st Embodiment
f = 1.91 mm, Fno = 2.15, HFOV = 66.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.849 | ASP | 0.703 | Plastic | 1.545 | 56.1 | −3.21 |
| 2 | | 3.409 | ASP | 0.698 | | | | |
| 3 | Lens 2 | 5.368 | ASP | 0.352 | Plastic | 1.642 | 22.5 | 10.36 |
| 4 | | 27.197 | ASP | 0.327 | | | | |
| 5 | Ape. Stop | Plano | | −0.042 | | | | |
| 6 | Lens 3 | 3.929 | ASP | 0.934 | Plastic | 1.544 | 56.0 | 1.77 |
| 7 | | −1.172 | ASP | −0.176 | | | | |
| 8 | Stop | Plano | | 0.196 | | | | |
| 9 | Lens 4 | −89.286 | ASP | 0.355 | Plastic | 1.642 | 22.5 | −3.23 |
| 10 | | 2.126 | ASP | 0.231 | | | | |
| 11 | Lens 5 | −6.031 | ASP | 1.006 | Plastic | 1.544 | 56.0 | 3.24 |
| 12 | | −1.445 | ASP | 0.020 | | | | |
| 13 | Lens 6 | 5.900 | ASP | 0.478 | Plastic | 1.614 | 26.0 | 9.61 |
| 14 | | ∞ | ASP | 0.253 | | | | |
| 15 | Lens 7 | 2.621 | ASP | 0.320 | Plastic | 1.679 | 18.4 | −3.22 |
| 16 | | 1.133 | ASP | 0.500 | | | | |
| 19 | Filter | Plano | | 0.145 | Glass | 1.517 | 64.2 | — |
| 20 | | Plano | | 0.435 | | | | |
| 21 | Image | Plano | | — | | | | |

Reference wavelength is 587.6 nm (d-line).
Effective radius of Surface 8 (stop 101) is 0.965 mm.

TABLE 2

Aspheric Coefficients

| Surface # | 1 | 2 | 3 | 4 | 6 | 7 |
|---|---|---|---|---|---|---|
| k = | −6.3553E+01 | 0.0000E+00 | 0.0000E+00 | 0.0000E+00 | 0.0000E+00 | −2.3363E+00 |
| A4 = | 9.2544E−02 | 3.4185E−01 | 5.0213E−02 | 8.4609E−02 | 4.0673E−02 | 1.6749E−01 |
| A6 = | −4.1581E−02 | −2.3447E−01 | −8.3245E−02 | −1.1478E−01 | 6.2219E−02 | −7.9319E−01 |
| A8 = | 1.5228E−02 | 2.6028E−01 | 6.7235E−02 | 1.4915E−01 | −6.0251E−01 | 1.6318E+00 |
| A10 = | −4.0045E−03 | −1.4498E−01 | −1.1337E−01 | −2.6261E−01 | 1.2461E+00 | −2.4640E+00 |
| A12 = | 6.6214E−04 | 2.8730E−02 | 4.9784E−02 | 1.4835E−01 | −1.4718E+00 | 1.9183E+00 |
| A14 = | −6.0681E−05 | −1.8488E−03 | | | 3.4763E−01 | −6.4308E−01 |
| A16 = | 2.3715E−06 | | | | | |

| Surface # | 9 | 10 | 11 | 12 | 13 | 14 |
|---|---|---|---|---|---|---|
| k = | 0.0000E+00 | 0.0000E+00 | 0.0000E+00 | −1.0000E+00 | −1.0000E+00 | 0.0000E+00 |
| A4 = | −9.8266E−02 | −3.2336E−01 | 7.4190E−02 | −1.9496E−01 | −9.7129E−02 | −1.4333E−02 |
| A6 = | −7.6174E−02 | 6.2150E−01 | −1.7556E−02 | 2.2109E−01 | 2.6618E−01 | 9.3845E−02 |
| A8 = | 1.1576E−01 | −1.1454E+00 | −1.2574E−02 | −3.7919E−01 | −3.7081E−01 | −7.5937E−02 |
| A10 = | −4.6177E−01 | 1.5465E+00 | −4.6107E−02 | 2.7389E−01 | 2.7216E−01 | 2.7969E−02 |
| A12 = | 9.2027E−01 | −1.4122E+00 | 1.2222E−01 | −6.8144E−02 | −1.2073E−01 | −5.2716E−03 |
| A14 = | −1.2034E+00 | 8.1482E−01 | −1.0186E−01 | −2.6477E−02 | 3.0503E−02 | 3.8829E−04 |
| A16 = | 6.1052E−01 | −2.6746E−01 | 3.7477E−02 | 1.9908E−02 | −3.7004E−03 | 2.6352E−05 |
| A18 = | | 3.8183E−02 | −5.2210E−03 | −3.3202E−03 | 1.0620E−04 | −6.5456E−06 |
| A20 = | | | | | 8.8493E−06 | 3.3128E−07 |

| Surface # | 15 | 16 |
|---|---|---|
| k = | 0.0000E+00 | −1.0000E+00 |
| A4 = | −2.2455E−01 | −3.7102E−01 |
| A6 = | 5.0407E−02 | 2.3067E−01 |
| A8 = | 4.9520E−02 | −1.0834E−01 |
| A10 = | −4.7381E−02 | 3.7651E−02 |
| A12 = | 1.9375E−02 | −9.6392E−03 |
| A14 = | −4.5331E−03 | 1.7436E−03 |
| A16 = | 6.2071E−04 | −2.0738E−04 |
| A18 = | −4.6046E−05 | 1.4355E−05 |
| A20 = | 1.4229E−06 | −4.3347E−07 | the aspheric surface profiles. A4-A20 represent the aspheric coefficients ranging from the 4th order to the 20th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

2nd Embodiment

Figure 3:
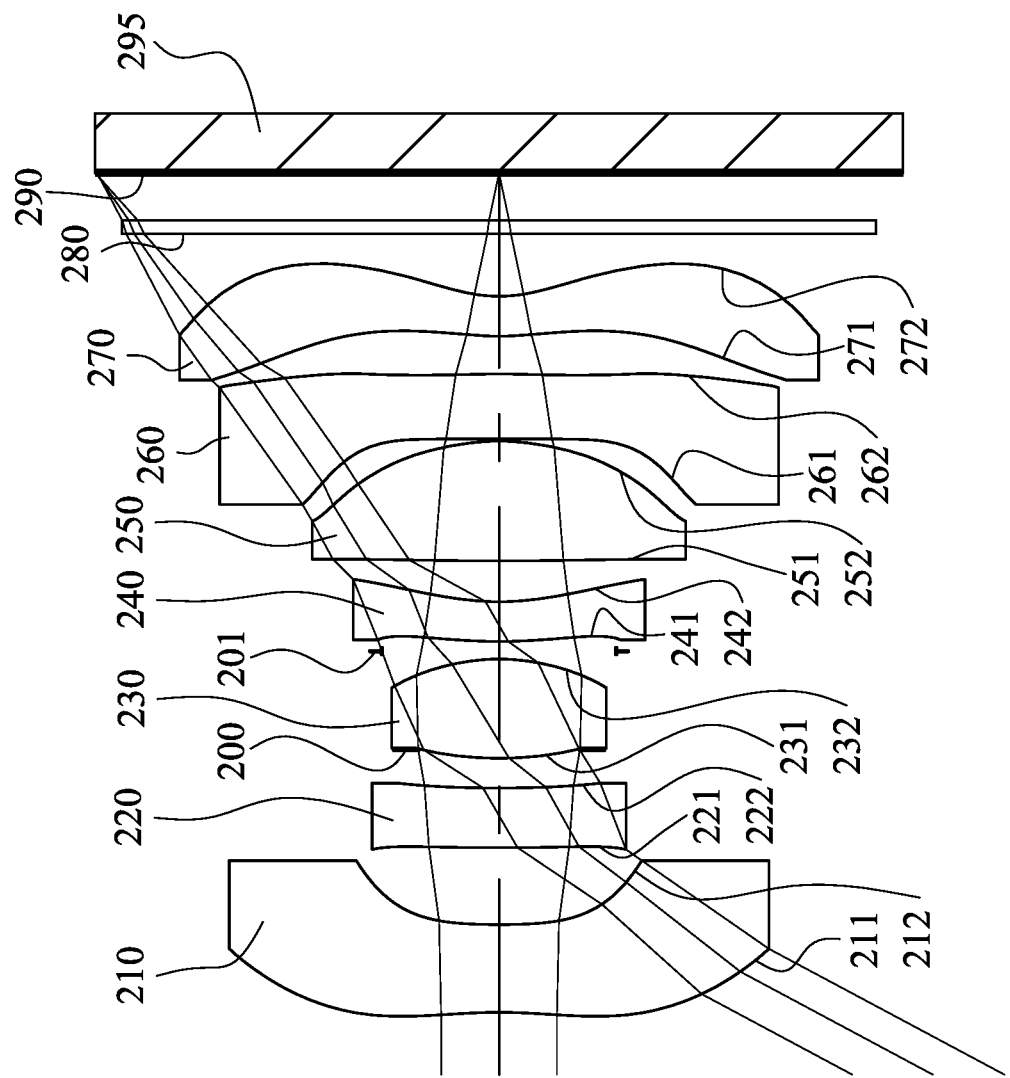
FIG. 3 is a schematic view of an imaging apparatus according to the 2nd embodiment of the present disclosure.
Figure 4:
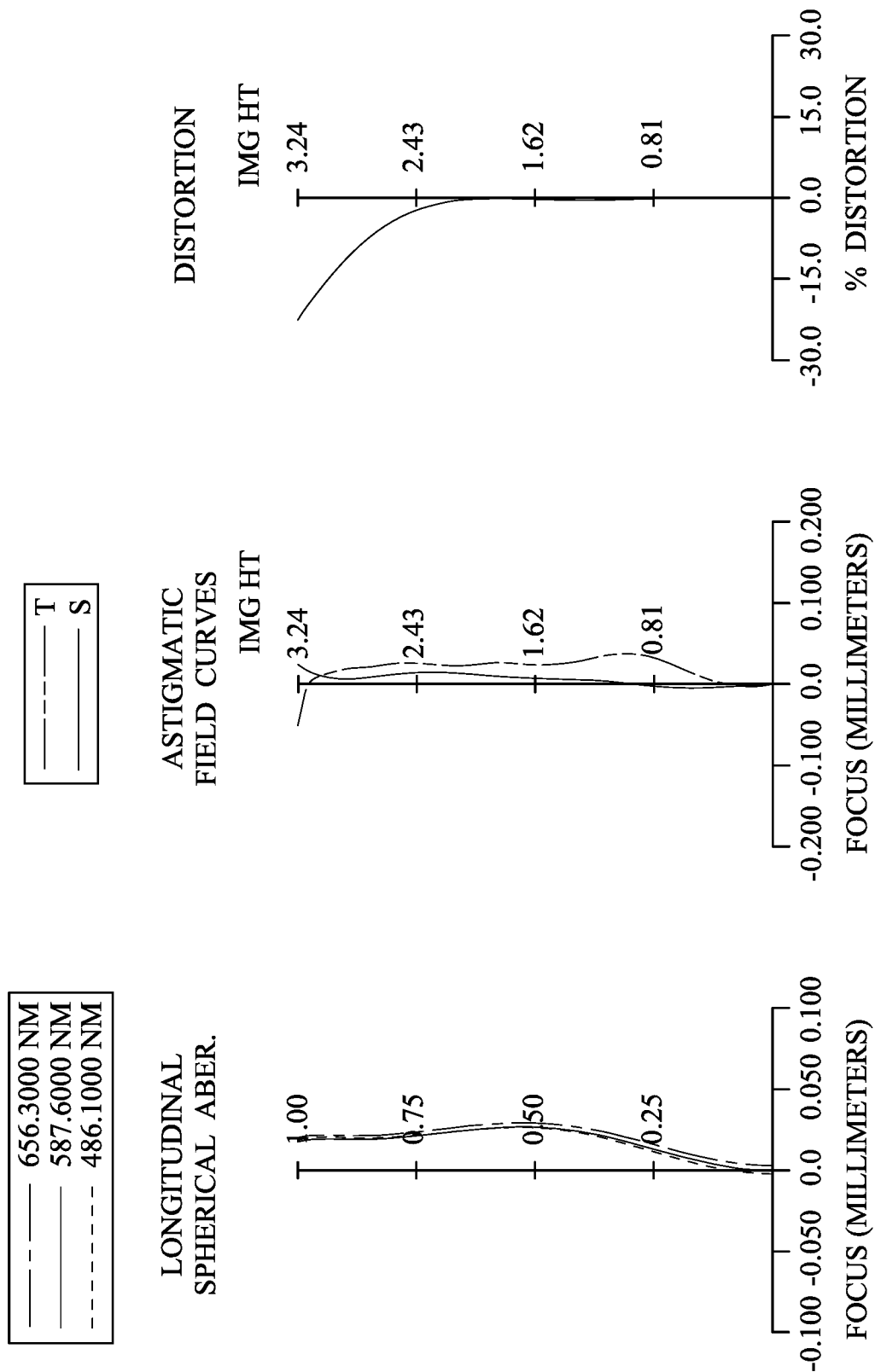
FIG. 4 shows spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows spherical aberration curves, astigmatic field curves and a distortion curve of the imaging apparatus according to the 2nd embodiment. In FIG. 3, the imaging apparatus includes an image capturing lens assembly (its reference numeral is omitted) and an image sensor 295. The image capturing lens assembly includes, in order from an object side to an image side along an optical path, a first lens element 210, a second lens element 220, an aperture stop 200, a third lens element 230, a stop 201, a fourth lens element 240, a fifth lens element 250, a sixth lens element 260, a seventh lens element 270, a filter 280 and an image surface 290, wherein the image sensor 295 is disposed on the image surface 290 of the image capturing lens assembly. The image capturing lens assembly includes seven lens elements (210, 220, 230, 240, 250, 260, 270) without additional one or more lens elements inserted between the first lens element 210 and the seventh lens element 270.

The first lens element 210 with negative refractive power has an object-side surface 211 being concave in a paraxial region thereof and an image-side surface 212 being concave in a paraxial region thereof. The first lens element 210 is made of a plastic material, and has the object-side surface 211 and the image-side surface 212 being both aspheric. Furthermore, the object-side surface 211 of the first lens element 210 includes one inflection point and one critical point in an off-axis region thereof.

The second lens element 220 with negative refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric. Furthermore, the object-side surface 221 of the second lens element 220 includes one inflection point and one critical point in an off-axis region thereof.

The third lens element 230 with positive refractive power has an object-side surface 231 being convex in a paraxial region thereof and an image-side surface 232 being convex in a paraxial region thereof. The third lens element 230 is made of a plastic material, and has the object-side surface 231 and the image-side surface 232 being both aspheric.

The fourth lens element 240 with negative refractive power has an object-side surface 241 being convex in a paraxial region thereof and an image-side surface 242 being concave in a paraxial region thereof. The fourth lens element 240 is made of a plastic material, and has the object-side surface 241 and the image-side surface 242 being both aspheric. Furthermore, the object-side surface 241 of the fourth lens element 240 includes one inflection point and one critical point in an off-axis region thereof, and the image-side surface 242 of the fourth lens element 240 includes one inflection point in an off-axis region thereof.

The fifth lens element 250 with positive refractive power has an object-side surface 251 being convex in a paraxial region thereof and an image-side surface 252 being convex in a paraxial region thereof. The fifth lens element 250 is made of a plastic material, and has the object-side surface 251 and the image-side surface 252 being both aspheric. Furthermore, the object-side surface 251 of the fifth lens element 250 includes three inflection points and one critical point in an off-axis region thereof, and the image-side surface 252 of the fifth lens element 250 includes one inflection point in an off-axis region thereof.

The sixth lens element 260 with positive refractive power has an object-side surface 261 being concave in a paraxial region thereof and an image-side surface 262 being convex in a paraxial region thereof. The sixth lens element 260 is made of a plastic material, and has the object-side surface 261 and the image-side surface 262 being both aspheric. Furthermore, the object-side surface 261 of the sixth lens element 260 includes three inflection points in an off-axis region thereof, and the image-side surface 262 of the sixth lens element 260 includes four inflection points and two critical points in an off-axis region thereof.

The seventh lens element 270 with negative refractive power has an object-side surface 271 being convex in a paraxial region thereof and an image-side surface 272 being concave in a paraxial region thereof. The seventh lens element 270 is made of a plastic material, and has the object-side surface 271 and the image-side surface 272 being both aspheric. Furthermore, the object-side surface 271 of the seventh lens element 270 includes three inflection points and one critical point in an off-axis region thereof, and the image-side surface 272 of the seventh lens element 270 includes two inflection points and one critical point in an off-axis region thereof.

The filter 280 is made of a glass material, which is located between the seventh lens element 270 and the image surface 290 in order, and will not affect the focal length of the image capturing lens assembly.

The detailed optical data of the 2nd embodiment are shown in Table 3 and the aspheric surface data are shown in Table 4 below.

TABLE 3

2nd Embodiment
f = 2.23 mm, Fno = 2.40, HFOV = 61.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.852 | ASP | 0.704 | Plastic | 1.545 | 56.1 | −4.37 |
| 2 | | 6.629 | ASP | 0.618 | | | | |
| 3 | Lens 2 | 31.088 | ASP | 0.480 | Plastic | 1.669 | 19.5 | −77.46 |
| 4 | | 19.311 | ASP | 0.304 | | | | |
| 5 | Ape. Stop | Plano | | −0.065 | | | | |
| 6 | Lens 3 | 3.240 | ASP | 0.796 | Plastic | 1.544 | 56.0 | 2.14 |
| 7 | | −1.664 | ASP | 0.064 | | | | |

TABLE 3-continued

2nd Embodiment
f = 2.23 mm, Fno = 2.40, HFOV = 61.9 deg.

| Surface # | | Curvature Radius | | Thickness | Material | Index | Abbe # | Focal Length |
|---|---|---|---|---|---|---|---|---|
| 8 | Stop | Plano | | 0.077 | | | | |
| 9 | Lens 4 | 3.915 | ASP | 0.320 | Plastic | 1.669 | 19.5 | −7.79 |
| 10 | | 2.162 | ASP | 0.329 | | | | |
| 11 | Lens 5 | 147.275 | ASP | 0.960 | Plastic | 1.544 | 56.0 | 3.36 |
| 12 | | −1.844 | ASP | 0.020 | | | | |
| 13 | Lens 6 | −18.623 | ASP | 0.520 | Plastic | 1.639 | 23.5 | 29.48 |
| 14 | | −9.465 | ASP | 0.304 | | | | |
| 15 | Lens 7 | 2.619 | ASP | 0.320 | Plastic | 1.669 | 19.5 | −3.16 |
| 16 | | 1.113 | ASP | 0.500 | | | | |
| 19 | Filter | Plano | | 0.110 | Glass | 1.517 | 64.2 | — |
| 20 | | Plano | | 0.382 | | | | |
| 21 | Image | Plano | | — | | | | |

Reference wavelength is 587.6 nm (d-line).
Effective radius of Surface 8 (stop 201) is 0.940 mm.

TABLE 4

Aspheric Coefficients

| Surface # | 1 | 2 | 3 | 4 | 6 | 7 |
|---|---|---|---|---|---|---|
| k = | −4.1602E+01 | 0.0000E+00 | 0.0000E+00 | 0.0000E+00 | 0.0000E+00 | −2.3364E+00 |
| A4 = | 9.1714E−02 | 2.7847E−01 | 3.3553E−02 | 1.0130E−01 | 8.8034E−02 | −8.1433E−04 |
| A6 = | −3.6591E−02 | −1.2746E−01 | −5.1279E−02 | −1.1308E−01 | −2.0684E−02 | −8.1166E−02 |
| A8 = | 1.3530E−02 | 1.5577E−01 | −1.2119E−02 | 9.8945E−02 | −2.1534E−01 | 1.6749E−01 |
| A10 = | −3.5917E−03 | −1.1191E−01 | −3.1839E−03 | −1.4254E−01 | 5.6908E−01 | −3.2841E−01 |
| A12 = | 6.1965E−04 | 7.2796E−02 | 6.3611E−03 | 1.0209E−01 | −9.1222E−01 | 3.0853E−01 |
| A14 = | −6.4047E−05 | −2.6404E−02 | | | 5.6936E−01 | −1.6783E−01 |
| A16 = | 3.1276E−06 | | | | | |

| Surface # | 9 | 10 | 11 | 12 | 13 | 14 |
|---|---|---|---|---|---|---|
| k = | 0.0000E+00 | 0.0000E+00 | 0.0000E+00 | −1.0000E+00 | −1.0000E+00 | 0.0000E+00 |
| A4 = | −1.2045E−01 | −1.5869E−01 | 2.8736E−02 | 1.8269E−01 | 1.3144E−01 | 5.3950E−02 |
| A6 = | 1.4277E−01 | 1.4451E−01 | −4.1899E−02 | −4.6379E−01 | −3.5245E−01 | 7.1191E−02 |
| A8 = | −3.7535E−01 | −1.2474E−01 | 4.3560E−02 | 6.1344E−01 | 4.5626E−01 | −1.3757E−01 |
| A10 = | 6.9006E−01 | 2.5493E−02 | −2.3615E−02 | −5.5563E−01 | −5.0566E−01 | 8.9515E−02 |
| A12 = | −9.1032E−01 | 8.6597E−02 | −2.1204E−02 | 3.5131E−01 | 3.8645E−01 | −3.0768E−02 |
| A14 = | 6.7653E−01 | −1.0800E−01 | 3.5833E−02 | −1.4912E−01 | −1.8977E−01 | 6.0422E−03 |
| A16 = | −2.3469E−01 | 5.1005E−02 | −1.6528E−02 | 3.7307E−02 | 5.6648E−02 | −6.5964E−04 |
| A18 = | | −8.8127E−03 | 2.4948E−03 | −3.9998E−03 | −9.1290E−03 | 3.4824E−05 |
| A20 = | | | | | 5.9164E−04 | −5.6161E−07 |

| Surface # | 15 | 16 |
|---|---|---|
| k = | 0.0000E+00 | −1.0000E+00 |
| A4 = | −2.7888E−01 | −4.1194E−01 |
| A6 = | 1.1411E−01 | 2.8531E−01 |
| A8 = | 5.5414E−02 | −1.4615E−01 |
| A10 = | −9.9669E−02 | 5.2224E−02 |
| A12 = | 5.5829E−02 | −1.2980E−02 |
| A14 = | −1.6554E−02 | 2.1958E−03 |
| A16 = | 2.7735E−03 | −2.3991E−04 |
| A18 = | −2.4809E−04 | 1.5145E−05 |
| A20 = | 9.2201E−06 | −4.1585E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.23 | f/f1 | −0.51 |
| Fno | 2.40 | |f/f2| | 0.03 |
| HFOV [deg.] | 61.9 | f/f3 | 1.04 |
| (V1 + V3 + V5)/(V2 + V4 + V6 + V7) | 2.05 | |f/f4| | 0.29 |
| V1/V2 | 2.88 | f/f5 | 0.66 |
| V6 | 23.5 | |f/f6| | 0.08 |
| V6 + V7 | 42.9 | f/f7 | −0.70 |
| ΣCT/ΣAT | 2.48 | f/f67 | −0.62 |
| (CT1 + CT2)/T12 | 1.92 | f/R1 | −0.58 |

-continued

| 2nd Embodiment | | | |
|---|---|---|---|
| (CT1 + CT3 + CT5)/CT7 | 7.69 | f/R14 | 2.00 |
| CT3/CT7 | 2.49 | f1/f7 | 1.38 |
| (CT6 + CT7)/CT1 | 1.19 | f3/f5 | 0.64 |
| TD/EPD | 6.19 | |f6/f3| | 13.76 |
| TL/f | 3.03 | Y11/Y72 | 0.84 |
| TL/ImgH | 2.08 | Yc11/Y11 | 0.36 |
| (R5 − R6)/(R5 + R6) | 3.11 | Yc72/Y72 | 0.56 |
| R13/R14 | 2.35 | | |

3rd Embodiment

Figure 5:
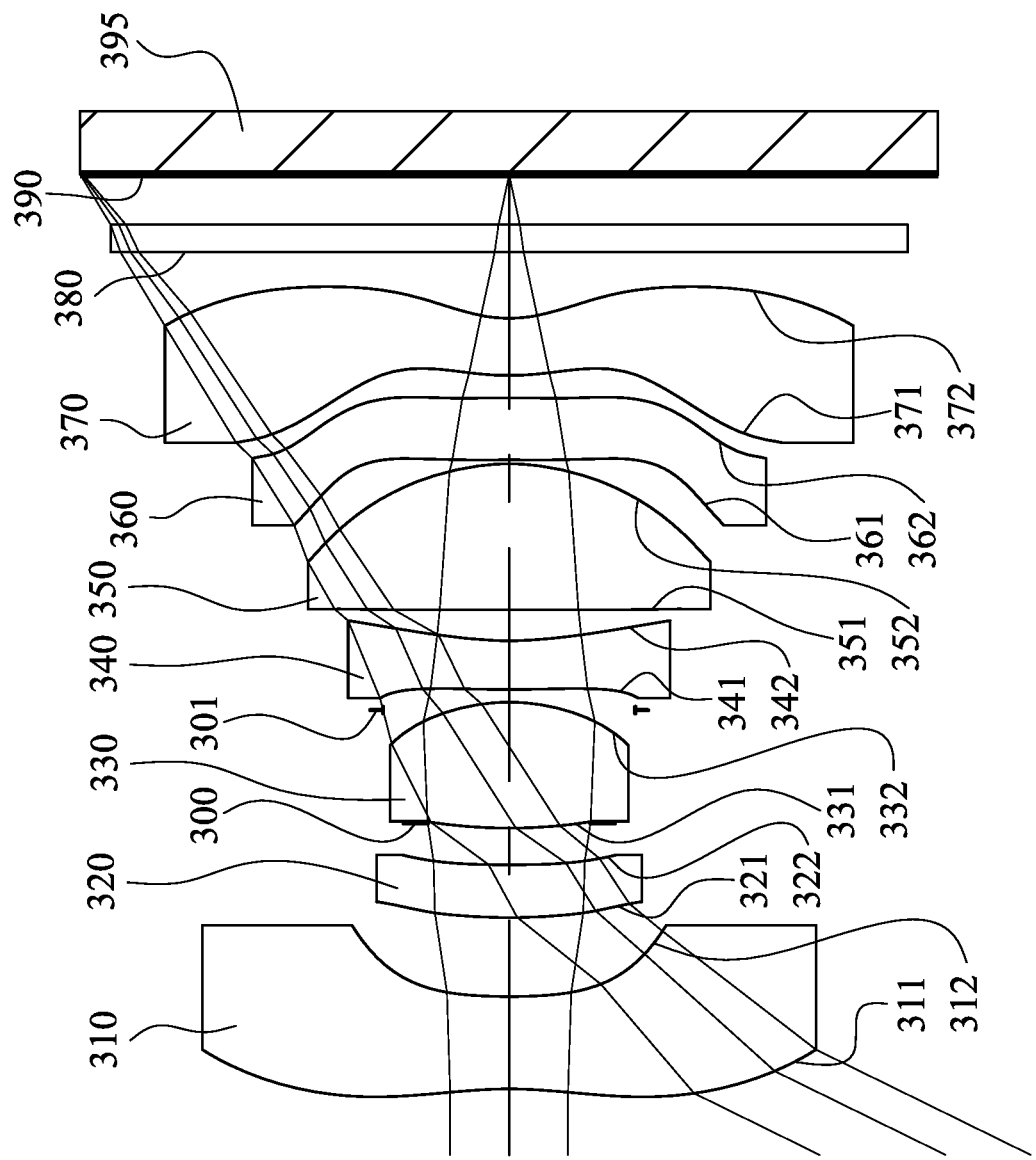
FIG. 5 is a schematic view of an imaging apparatus according to the 3rd embodiment of the present disclosure.
Figure 6:
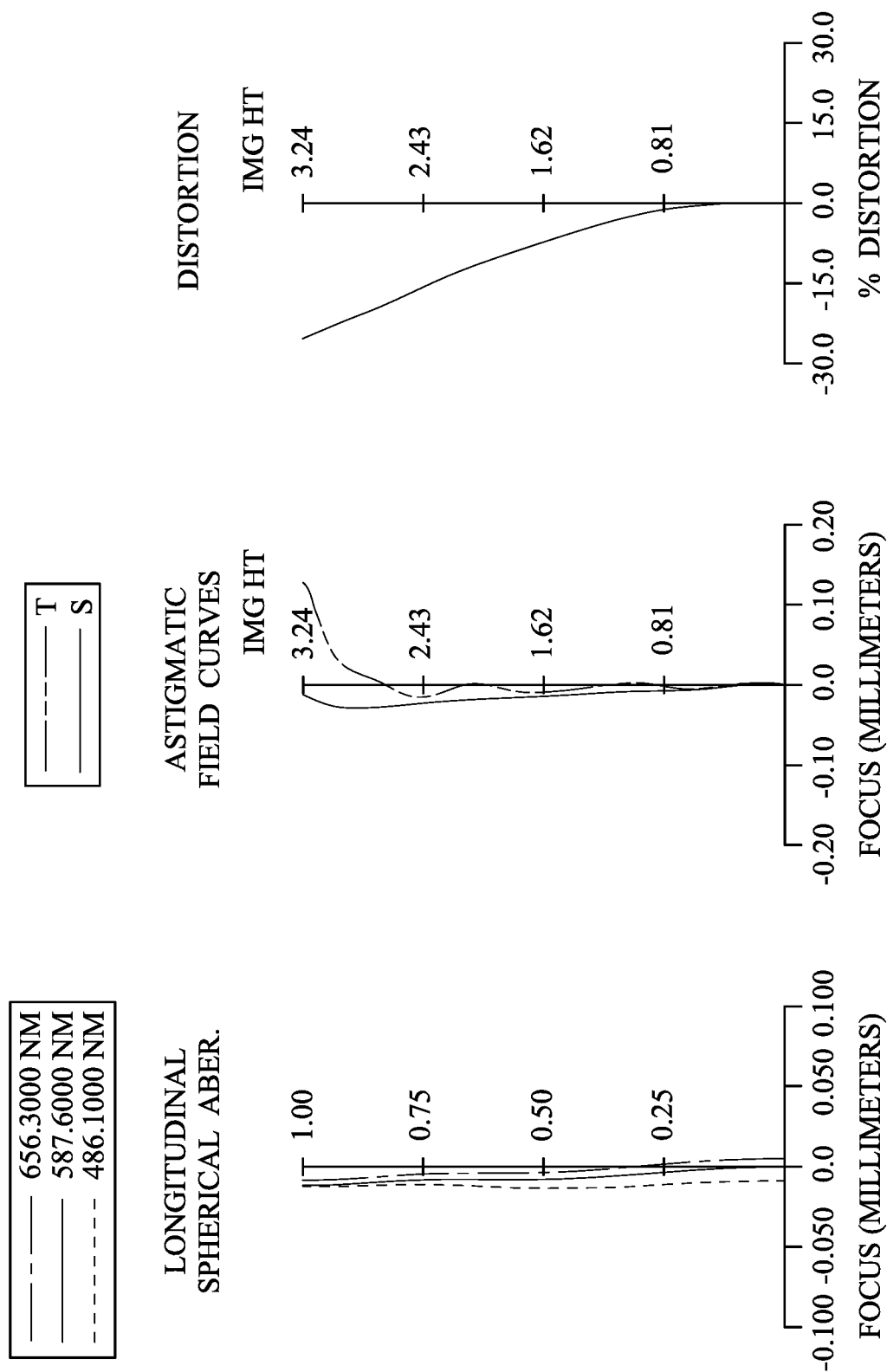
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows spherical aberration curves, astigmatic field curves and a distortion curve of the imaging apparatus according to the 3rd embodiment. In FIG. 5, the imaging apparatus includes an image capturing lens assembly (its reference numeral is omitted) and an image sensor 395. The image capturing lens assembly includes, in order from an object side to an image side along an optical path, a first lens element 310, a second lens element 320, an aperture stop 300, a third lens element 330, a stop 301, a fourth lens element 340, a fifth lens element 350, a sixth lens element 360, a seventh lens element 370, a filter 380 and an image surface 390, wherein the image sensor 395 is disposed on the image surface 390 of the image capturing lens assembly. The image capturing lens assembly includes seven lens elements (310, 320, 330, 340, 350, 360, 370) without additional one or more lens elements inserted between the first lens element 310 and the seventh lens element 370.

The first lens element 310 with negative refractive power has an object-side surface 311 being concave in a paraxial region thereof and an image-side surface 312 being concave in a paraxial region thereof. The first lens element 310 is made of a plastic material, and has the object-side surface 311 and the image-side surface 312 being both aspheric. Furthermore, the object-side surface 311 of the first lens element 310 includes one inflection point and one critical point in an off-axis region thereof.

The second lens element 320 with positive refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric. Furthermore, the object-side surface 321 of the second lens element 320 includes one inflection point in an off-axis region thereof, and the image-side surface 322 of the second lens element 320 includes one inflection point in an off-axis region thereof.

The third lens element 330 with positive refractive power has an object-side surface 331 being convex in a paraxial region thereof and an image-side surface 332 being convex in a paraxial region thereof. The third lens element 330 is made of a plastic material, and has the object-side surface 331 and the image-side surface 332 being both aspheric. Furthermore, the object-side surface 331 of the third lens element 330 includes one inflection point in an off-axis region thereof.

The fourth lens element 340 with negative refractive power has an object-side surface 341 being convex in a paraxial region thereof and an image-side surface 342 being concave in a paraxial region thereof. The fourth lens element 340 is made of a plastic material, and has the object-side surface 341 and the image-side surface 342 being both aspheric. Furthermore, the object-side surface 341 of the fourth lens element 340 includes one inflection point and one critical point in an off-axis region thereof, and the image-side surface 342 of the fourth lens element 340 includes one inflection point in an off-axis region thereof.

The fifth lens element 350 with positive refractive power has an object-side surface 351 being concave in a paraxial region thereof and an image-side surface 352 being convex in a paraxial region thereof. The fifth lens element 350 is made of a plastic material, and has the object-side surface 351 and the image-side surface 352 being both aspheric. Furthermore, the object-side surface 351 of the fifth lens element 350 includes four inflection points and two critical points in an off-axis region thereof, and the image-side surface 352 of the fifth lens element 350 includes one inflection point in an off-axis region thereof.

The sixth lens element 360 with positive refractive power has an object-side surface 361 being concave in a paraxial region thereof and an image-side surface 362 being convex in a paraxial region thereof. The sixth lens element 360 is made of a plastic material, and has the object-side surface 361 and the image-side surface 362 being both aspheric. Furthermore, the object-side surface 361 of the sixth lens element 360 includes four inflection points and two critical points in an off-axis region thereof, and the image-side surface 362 of the sixth lens element 360 includes four inflection points and two critical points in an off-axis region thereof.

The seventh lens element 370 with negative refractive power has an object-side surface 371 being convex in a paraxial region thereof and an image-side surface 372 being concave in a paraxial region thereof. The seventh lens element 370 is made of a plastic material, and has the object-side surface 371 and the image-side surface 372 being both aspheric. Furthermore, the object-side surface 371 of the seventh lens element 370 includes three inflection points and one critical point in an off-axis region thereof, and the image-side surface 372 of the seventh lens element 370 includes one inflection point and one critical point in an off-axis region thereof.

The filter 380 is made of a glass material, which is located between the seventh lens element 370 and the image surface 390 in order, and will not affect the focal length of the image capturing lens assembly.

The detailed optical data of the 3rd embodiment are shown in Table 5 and the aspheric surface data are shown in Table 6 below.

TABLE 5

3rd Embodiment
f = 2.13 mm, Fno = 2.39, HFOV = 63.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.199 | ASP | 0.700 | Plastic | 1.545 | 56.1 | −3.51 |

TABLE 5-continued

3rd Embodiment
f = 2.13 mm, Fno = 2.39, HFOV = 63.8 deg.

| Surface # | | Curvature Radius | | Thickness | Material | Index | Abbe # | Focal Length |
|---|---|---|---|---|---|---|---|---|
| 2 | | 5.132 | ASP | 0.599 | | | | |
| 3 | Lens 2 | 5.350 | ASP | 0.400 | Plastic | 1.669 | 19.5 | 15.35 |
| 4 | | 10.835 | ASP | 0.314 | | | | |
| 5 | Ape. Stop | Plano | | −0.036 | | | | |
| 6 | Lens 3 | 4.375 | ASP | 0.954 | Plastic | 1.544 | 56.0 | 2.23 |
| 7 | | −1.548 | ASP | −0.060 | | | | |
| 8 | Stop | Plano | | 0.156 | | | | |
| 9 | Lens 4 | 7.762 | ASP | 0.370 | Plastic | 1.669 | 19.5 | −6.51 |
| 10 | | 2.736 | ASP | 0.234 | | | | |
| 11 | Lens 5 | −200.000 | ASP | 1.107 | Plastic | 1.544 | 56.0 | 3.11 |
| 12 | | −1.679 | ASP | 0.030 | | | | |
| 13 | Lens 6 | −20.030 | ASP | 0.470 | Plastic | 1.669 | 19.5 | 28.17 |
| 14 | | −9.801 | ASP | 0.171 | | | | |
| 15 | Lens 7 | 2.218 | ASP | 0.432 | Plastic | 1.669 | 19.5 | −3.12 |
| 16 | | 0.991 | ASP | 0.500 | | | | |
| 19 | Filter | Plano | | 0.210 | Glass | 1.517 | 64.2 | — |
| 20 | | Plano | | 0.381 | | | | |
| 21 | Image | Plano | | — | | | | |

Reference wavelength is 587.6 nm (d-line).
Effective radius of Surface 1 is 2.324 mm.
Effective radius of Surface 8 (stop 301) is 0.955 mm.

TABLE 6

| Aspheric Coefficients | | | | | | |
|---|---|---|---|---|---|---|
| Surface # | 1 | 2 | 3 | 4 | 6 | 7 |
| k = | −2.8667E+01 | 0.0000E+00 | 0.0000E+00 | 0.0000E+00 | 0.0000E+00 | 0.0000E+00 |
| A4 = | 6.5082E−02 | 2.3362E−01 | 6.6454E−02 | 1.1890E−01 | 6.5382E−02 | −4.1096E−02 |
| A6 = | −2.4175E−02 | −1.2301E−01 | −3.5925E−02 | 5.5634E−02 | −8.3503E−02 | 1.8240E−01 |
| A8 = | 7.3579E−03 | 1.7296E−01 | 9.1762E−02 | −1.1915E−01 | 1.0928E−01 | −4.7292E−01 |
| A10 = | −1.6001E−03 | −1.6324E−01 | −1.4879E−01 | −6.1588E−03 | −3.2733E−01 | 5.0662E−01 |
| A12 = | 2.2933E−04 | 1.0580E−01 | 5.0520E−02 | | 5.7945E−02 | −2.8609E−01 |
| A14 = | −1.9133E−05 | −2.9693E−02 | | | | |
| A16 = | 7.1129E−07 | | | | | |

| Surface # | 9 | 10 | 11 | 12 | 13 | 14 |
|---|---|---|---|---|---|---|
| k = | 0.0000E+00 | 0.0000E+00 | 0.0000E+00 | −1.0000E+00 | −1.0000E+00 | −1.0000E+00 |
| A4 = | −1.8546E−01 | −1.6043E−01 | −1.2861E−02 | 1.1966E−01 | 2.3725E−01 | 3.3036E−01 |
| A6 = | 3.1129E−01 | 2.2180E−01 | 7.1571E−02 | −2.8715E−01 | −4.3863E−01 | −6.3175E−01 |
| A8 = | −6.6582E−01 | −3.0970E−01 | −9.3093E−02 | 3.5805E−01 | 3.5397E−01 | 5.6443E−01 |
| A10 = | 9.7126E−01 | 3.1681E−01 | 4.0747E−02 | −2.7138E−01 | −1.6255E−01 | −3.2609E−01 |
| A12 = | −1.0194E+00 | −2.0786E−01 | 6.2128E−03 | 1.2016E−01 | 1.9769E−02 | 1.2091E−01 |
| A14 = | 6.5270E−01 | 8.3713E−02 | −9.1738E−03 | −2.9039E−02 | 1.1139E−02 | −2.7361E−02 |
| A16 = | −2.1138E−01 | −1.9993E−02 | 1.7461E−03 | 3.0079E−03 | −3.7045E−03 | 3.5717E−03 |
| A18 = | | 2.2767E−03 | | | 2.7820E−04 | −2.4225E−04 |
| A20 = | | | | | | 6.4442E−06 |

| Surface # | 15 | 16 |
|---|---|---|
| k = | 0.0000E+00 | −1.0000E+00 |
| A4 = | −1.6301E−01 | −4.8074E−01 |
| A6 = | −3.5453E−01 | 2.8726E−01 |
| A8 = | 4.6004E−01 | −1.2401E−01 |
| A10 = | −2.6720E−01 | 4.0767E−02 |
| A12 = | 9.0317E−02 | −1.0119E−02 |
| A14 = | −1.8184E−02 | 1.7731E−03 |
| A16 = | 2.0220E−03 | −2.0080E−04 |
| A18 = | −9.5872E−05 | 1.2982E−05 |
| A20 = | | −3.6149E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.13 | f/f1 | −0.61 |
| Fno | 2.39 | |f/f2| | 0.14 |
| HFOV [deg.] | 63.8 | f/f3 | 0.96 |
| (V1 + V3 + V5)/(V2 + V4 + V6 + V7) | 2.16 | |f/f4| | 0.33 |
| V1/V2 | 2.88 | f/f5 | 0.69 |
| V6 | 19.5 | |f/f6| | 0.08 |
| V6 + V7 | 38.9 | f/f7 | −0.68 |
| ΣCT/ΣAT | 3.15 | f/f67 | −0.60 |
| (CT1 + CT2)/T12 | 1.84 | f/R1 | −0.67 |
| (CT1 + CT3 + CT5)/CT7 | 6.39 | f/R14 | 2.15 |
| CT3/CT7 | 2.21 | f1/f7 | 1.13 |
| (CT6 + CT7)/CT1 | 1.29 | f3/f5 | 0.72 |
| TD/EPD | 6.54 | |f6/f3| | 12.64 |
| TL/f | 3.25 | Y11/Y72 | 0.89 |
| TL/ImgH | 2.14 | Yc11/Y11 | 0.43 |
| (R5 − R6)/(R5 + R6) | 2.10 | Yc72/Y72 | 0.52 |
| R13/R14 | 2.24 | | |

4th Embodiment

Figure 7:
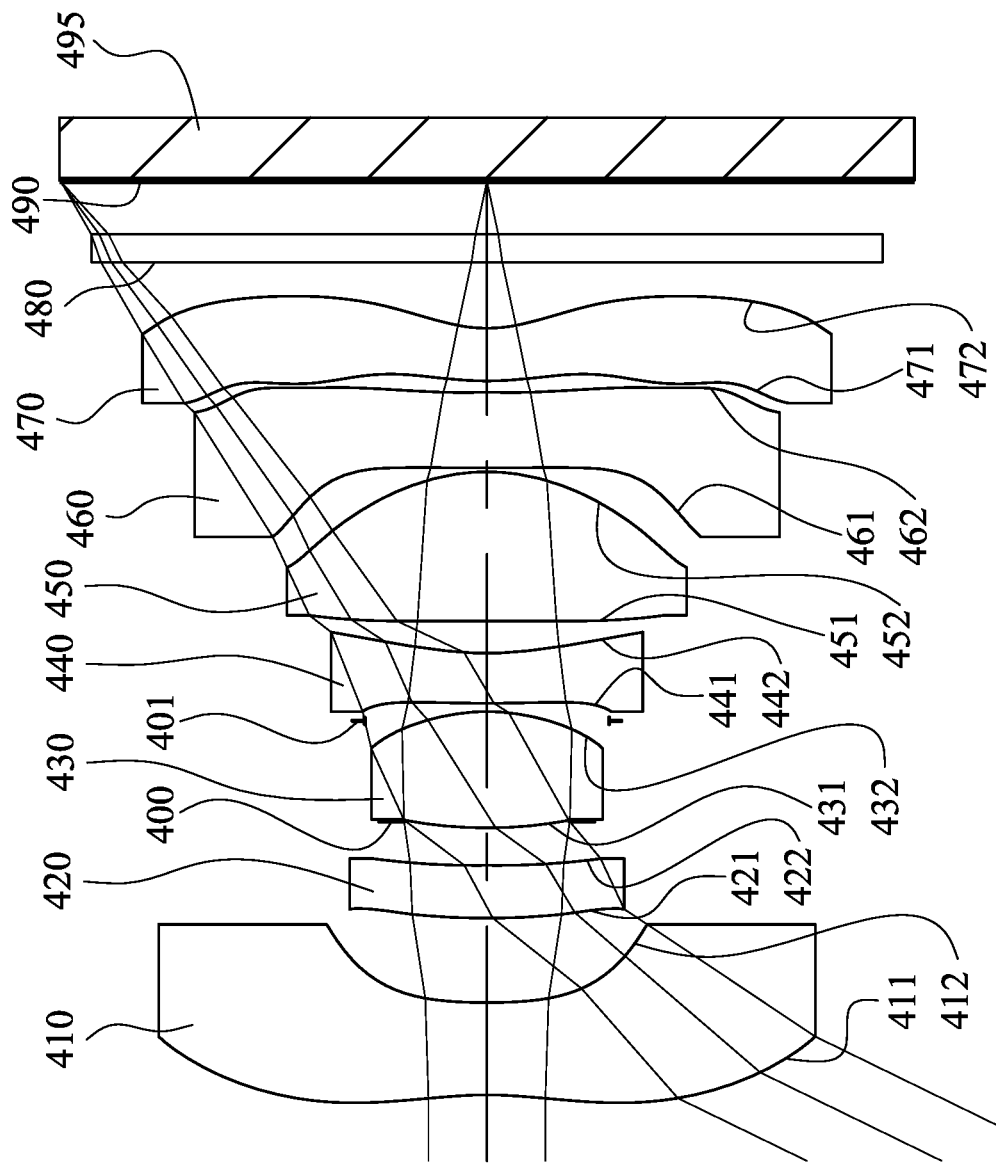
FIG. 7 is a schematic view of an imaging apparatus according to the 4th embodiment of the present disclosure.
Figure 8:
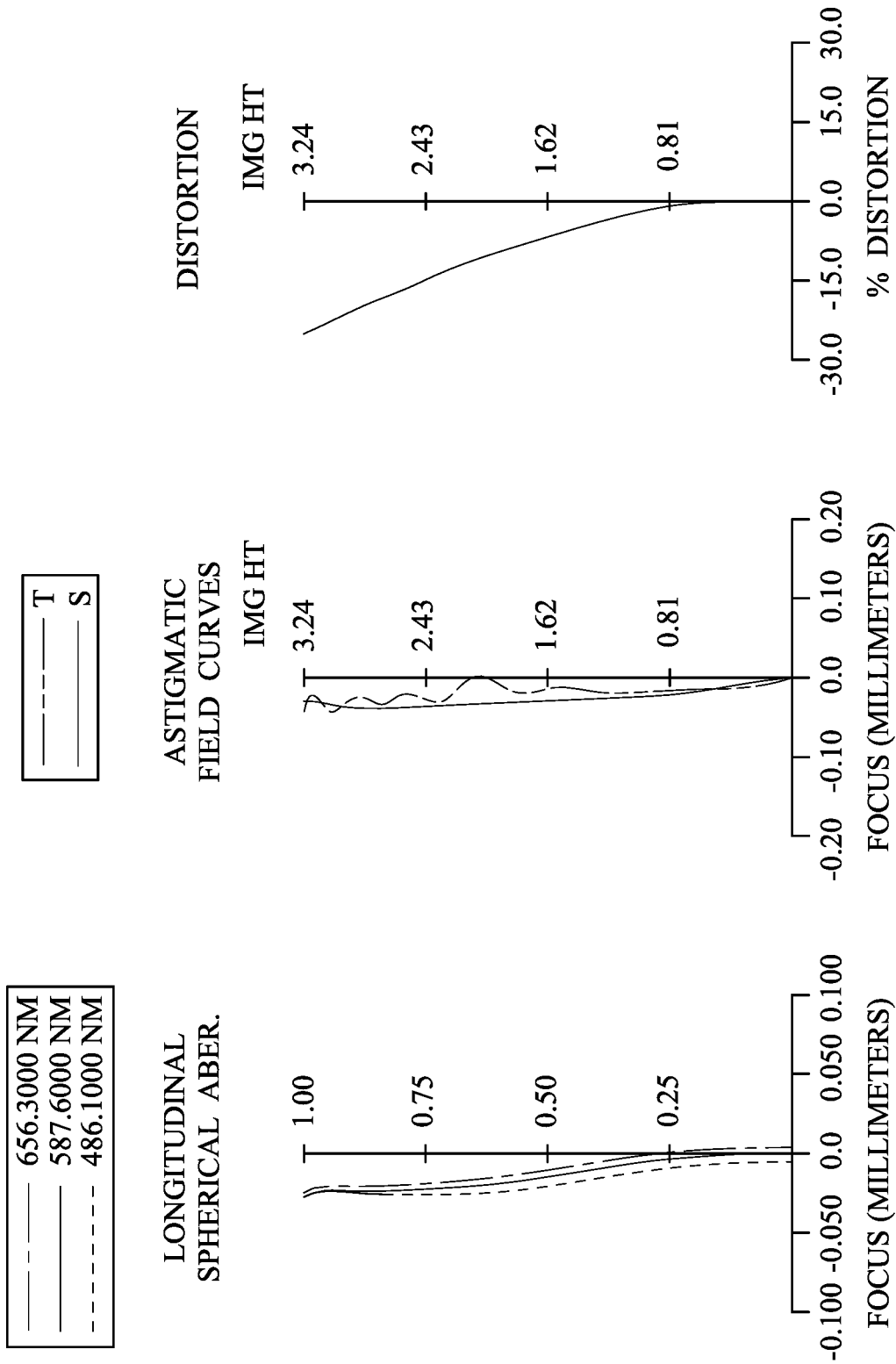
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows spherical aberration curves, astigmatic field curves and a distortion curve of the imaging apparatus according to the 4th embodiment. In FIG. 7, the imaging apparatus includes an image capturing lens assembly (its reference numeral is omitted) and an image sensor 495. The image capturing lens assembly includes, in order from an object side to an image side along an optical path, a first lens element 410, a second lens element 420, an aperture stop 400, a third lens element 430, a stop 401, a fourth lens element 440, a fifth lens element 450, a sixth lens element 460, a seventh lens element 470, a filter 480 and an image surface 490, wherein the image sensor 495 is disposed on the image surface 490 of the image capturing lens assembly. The image capturing lens assembly includes seven lens elements (410, 420, 430, 440, 450, 460, 470) without additional one or more lens elements inserted between the first lens element 410 and the seventh lens element 470.

The first lens element 410 with negative refractive power has an object-side surface 411 being concave in a paraxial region thereof and an image-side surface 412 being concave in a paraxial region thereof. The first lens element 410 is made of a plastic material, and has the object-side surface 411 and the image-side surface 412 being both aspheric. Furthermore, the object-side surface 411 of the first lens element 410 includes one inflection point and one critical point in an off-axis region thereof, and the image-side surface 412 of the first lens element 410 includes one inflection point in an off-axis region thereof.

The second lens element 420 with positive refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric. Furthermore, the object-side surface 421 of the second lens element 420 includes one inflection point and one critical point in an off-axis region thereof, and the image-side surface 422 of the second lens element 420 includes one inflection point in an off-axis region thereof.

The third lens element 430 with positive refractive power has an object-side surface 431 being convex in a paraxial region thereof and an image-side surface 432 being convex in a paraxial region thereof. The third lens element 430 is made of a plastic material, and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of a plastic material, and has the object-side surface 441 and the image-side surface 442 being both aspheric. Furthermore, the object-side surface 441 of the fourth lens element 440 includes one inflection point and one critical point in an off-axis region thereof, and the image-side surface 442 of the fourth lens element 440 includes two inflection points in an off-axis region thereof.

The fifth lens element 450 with positive refractive power has an object-side surface 451 being concave in a paraxial region thereof and an image-side surface 452 being convex in a paraxial region thereof. The fifth lens element 450 is made of a plastic material, and has the object-side surface 451 and the image-side surface 452 being both aspheric. Furthermore, the object-side surface 451 of the fifth lens element 450 includes one inflection point and one critical point in an off-axis region thereof, and the image-side surface 452 of the fifth lens element 450 includes one inflection point in an off-axis region thereof.

The sixth lens element 460 with positive refractive power has an object-side surface 461 being convex in a paraxial region thereof and an image-side surface 462 being convex in a paraxial region thereof. The sixth lens element 460 is made of a plastic material, and has the object-side surface 461 and the image-side surface 462 being both aspheric. Furthermore, the object-side surface 461 of the sixth lens element 460 includes three inflection points and one critical point in an off-axis region thereof, and the image-side surface 462 of the sixth lens element 460 includes six inflection points and four critical points in an off-axis region thereof.

The seventh lens element 470 with negative refractive power has an object-side surface 471 being convex in a paraxial region thereof and an image-side surface 472 being concave in a paraxial region thereof. The seventh lens element 470 is made of a plastic material, and has the object-side surface 471 and the image-side surface 472 being both aspheric. Furthermore, the object-side surface 471 of the seventh lens element 470 includes four inflection points and three critical points in an off-axis region thereof, and the image-side surface 472 of the seventh lens element 470 includes two inflection points and one critical point in an off-axis region thereof.

The filter 480 is made of a glass material, which is located between the seventh lens element 470 and the image surface 490 in order, and will not affect the focal length of the image capturing lens assembly.

The detailed optical data of the 4th embodiment are shown in Table 7 and the aspheric surface data are shown in Table 8 below.

TABLE 7

4th Embodiment
f = 2.12 mm, Fno = 2.39, HFOV = 64.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.108 | ASP | 0.700 | Plastic | 1.545 | 56.1 | −3.39 |
| 2 | | 4.907 | ASP | 0.640 | | | | |
| 3 | Lens 2 | 6.087 | ASP | 0.400 | Plastic | 1.669 | 19.5 | 13.73 |
| 4 | | 17.575 | ASP | 0.333 | | | | |
| 5 | Ape. Stop | Plano | | −0.048 | | | | |
| 6 | Lens 3 | 3.885 | ASP | 0.881 | Plastic | 1.544 | 56.0 | 2.09 |
| 7 | | −1.481 | ASP | −0.070 | | | | |
| 8 | Stop | Plano | | 0.133 | | | | |
| 9 | Lens 4 | 13.300 | ASP | 0.380 | Plastic | 1.660 | 20.4 | −5.11 |
| 10 | | 2.659 | ASP | 0.242 | | | | |
| 11 | Lens 5 | −200.000 | ASP | 1.132 | Plastic | 1.544 | 56.0 | 2.94 |
| 12 | | −1.589 | ASP | 0.031 | | | | |
| 13 | Lens 6 | 56.833 | ASP | 0.571 | Plastic | 1.660 | 20.4 | 67.12 |
| 14 | | −200.000 | ASP | 0.087 | | | | |
| 15 | Lens 7 | 2.506 | ASP | 0.400 | Plastic | 1.639 | 23.5 | −3.30 |
| 16 | | 1.073 | ASP | 0.500 | | | | |
| 19 | Filter | Plano | | 0.210 | Glass | 1.517 | 64.2 | — |
| 20 | | Plano | | 0.409 | | | | |
| 21 | Image | Plano | | — | | | | |

Reference wavelength is 587.6 nm (d-line).
Effective radius of Surface 8 (stop 401) is 0.925 mm.

TABLE 8

Aspheric Coefficients

| Surface # | 1 | 2 | 3 | 4 | 6 | 7 |
|---|---|---|---|---|---|---|
| k = | −3.1327E+01 | 0.0000E+00 | 0.0000E+00 | 0.0000E+00 | 0.0000E+00 | −2.4489E+00 |
| A4 = | 6.2354E−02 | 2.4122E−01 | 4.6498E−02 | 9.8502E−02 | 7.4712E−02 | 1.1945E−01 |
| A6 = | −2.0921E−02 | −1.3764E−01 | −6.7824E−02 | −8.8739E−03 | 1.1143E−01 | −6.2809E−01 |
| A8 = | 5.4374E−03 | 2.1661E−01 | 1.3825E−01 | 1.3934E−02 | −1.0801E+00 | 1.3764E+00 |
| A10 = | −9.4710E−04 | −2.4170E−01 | −2.0759E−01 | −2.3726E−01 | 3.5080E+00 | −2.0385E+00 |
| A12 = | 1.0589E−04 | 1.7227E−01 | 8.0213E−02 | 1.7055E−01 | −6.2186E+00 | 1.5648E+00 |
| A14 = | −7.1233E−06 | −4.9674E−02 | | | 4.2146E+00 | −5.6100E−01 |
| A16 = | 2.4369E−07 | | | | | |

| Surface # | 9 | 10 | 11 | 12 | 13 | 14 |
|---|---|---|---|---|---|---|
| k = | 0.0000E+00 | 0.0000E+00 | 0.0000E+00 | −1.0000E+00 | −1.0000E+00 | 0.0000E+00 |
| A4 = | 3.7766E−02 | −1.2459E−01 | −1.0175E−03 | −4.2465E−02 | −5.6231E−03 | 1.9174E−01 |
| A6 = | −4.6065E−01 | 1.7309E−01 | 4.5283E−02 | 1.0391E−01 | −1.9490E−02 | −3.0588E−01 |
| A8 = | 1.0629E+00 | −3.4770E−01 | −5.3918E−02 | −1.2598E−01 | 1.1276E−02 | 2.4485E−01 |
| A10 = | −1.7302E+00 | 5.2898E−01 | 2.0753E−02 | 6.7628E−02 | −9.0989E−02 | −1.3388E−01 |
| A12 = | 1.6873E+00 | −5.2546E−01 | 2.9202E−03 | −1.2696E−02 | 1.0528E−01 | 5.5128E−02 |
| A14 = | −9.6628E−01 | 3.2200E−01 | 2.2441E−03 | −1.8000E−02 | −5.1661E−02 | −1.6064E−02 |
| A16 = | 2.1503E−01 | −1.1125E−01 | −4.9626E−03 | 8.4500E−03 | 9.8988E−03 | 2.9387E−03 |
| A18 = | | 1.6743E−02 | 1.3737E−03 | −1.2054E−03 | 3.8278E−04 | −2.9424E−04 |
| A20 = | | | | | −2.5807E−04 | 1.2185E−05 |

| Surface # | 15 | 16 |
|---|---|---|
| k = | 0.0000E+00 | −1.0000E+00 |
| A4 = | −1.7163E−01 | −4.3117E−01 |
| A6 = | −1.5624E−01 | 2.6342E−01 |
| A8 = | 2.6661E−01 | −1.1592E−01 |
| A10 = | −1.6299E−01 | 3.7187E−02 |
| A12 = | 5.7529E−02 | −8.6446E−03 |
| A14 = | −1.2846E−02 | 1.4048E−03 |
| A16 = | 1.7783E−03 | −1.4936E−04 |
| A18 = | −1.3764E−04 | 9.2066E−06 |
| A20 = | 4.4982E−06 | −2.4659E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.12 | f/f1 | −0.62 |
| Fno | 2.39 | |f/f2| | 0.15 |
| HFOV [deg.] | 64.0 | f/f3 | 1.01 |
| (V1 + V3 + V5)/(V2 + V4 + V6 + V7) | 2.01 | |f/f4| | 0.41 |
| V1/V2 | 2.88 | f/f5 | 0.72 |
| V6 | 20.4 | |f/f6| | 0.03 |
| V6 + V7 | 43.9 | f/f7 | −0.64 |
| ΣCT/ΣAT | 3.31 | f/f67 | −0.60 |
| (CT1 + CT2)/T12 | 1.72 | f/R1 | −0.68 |
| (CT1 + CT3 + CT5)/CT7 | 6.78 | f/R14 | 1.97 |
| CT3/CT7 | 2.20 | f1/f7 | 1.03 |
| (CT6 + CT7)/CT1 | 1.39 | f3/f5 | 0.71 |
| TD/EPD | 6.57 | |f6/f3| | 32.08 |
| TL/f | 3.28 | Y11/Y72 | 0.95 |
| TL/ImgH | 2.14 | Yc11/Y11 | 0.40 |
| (R5 − R6)/(R5 + R6) | 2.23 | Yc72/Y72 | 0.56 |
| R13/R14 | 2.33 | | |

5th Embodiment

Figure 9:
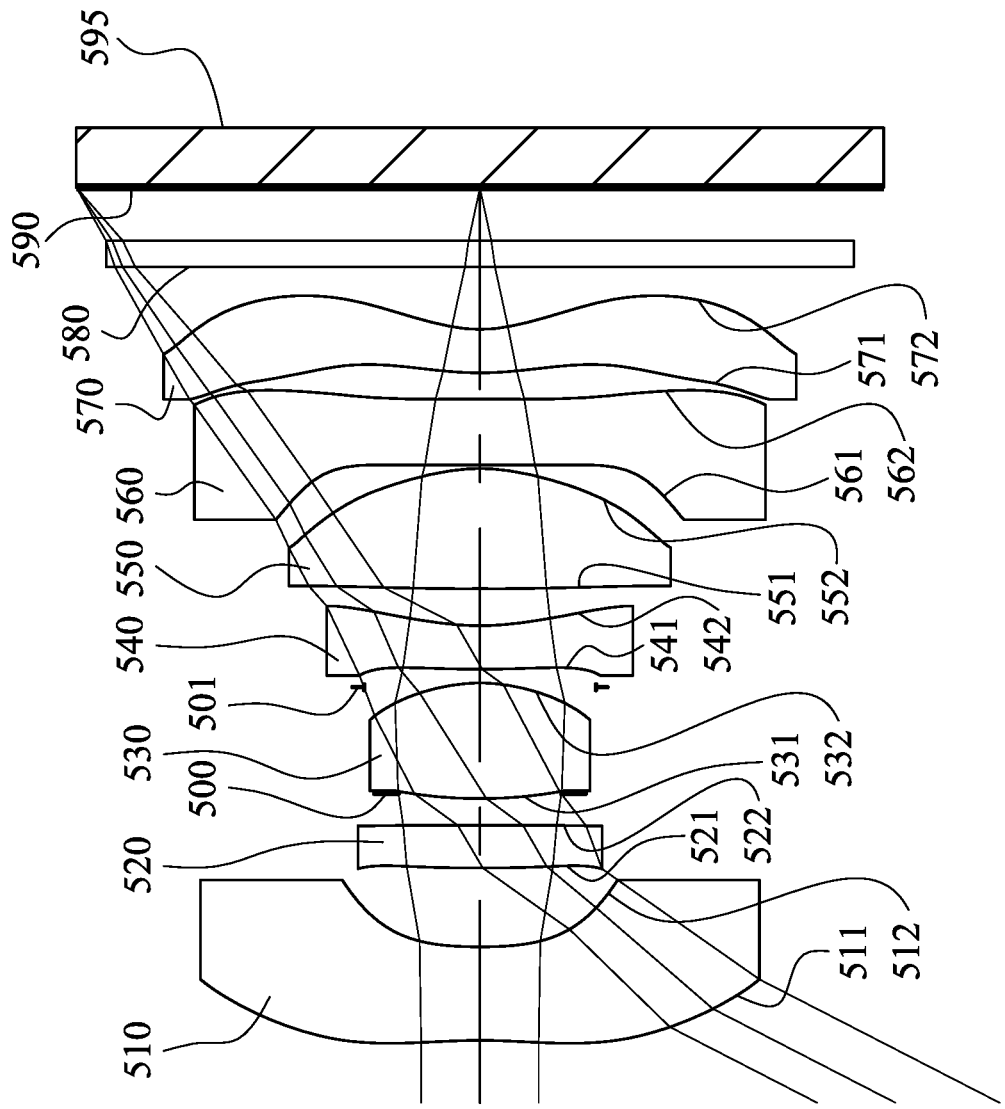
FIG. 9 is a schematic view of an imaging apparatus according to the 5th embodiment of the present disclosure.
Figure 10:
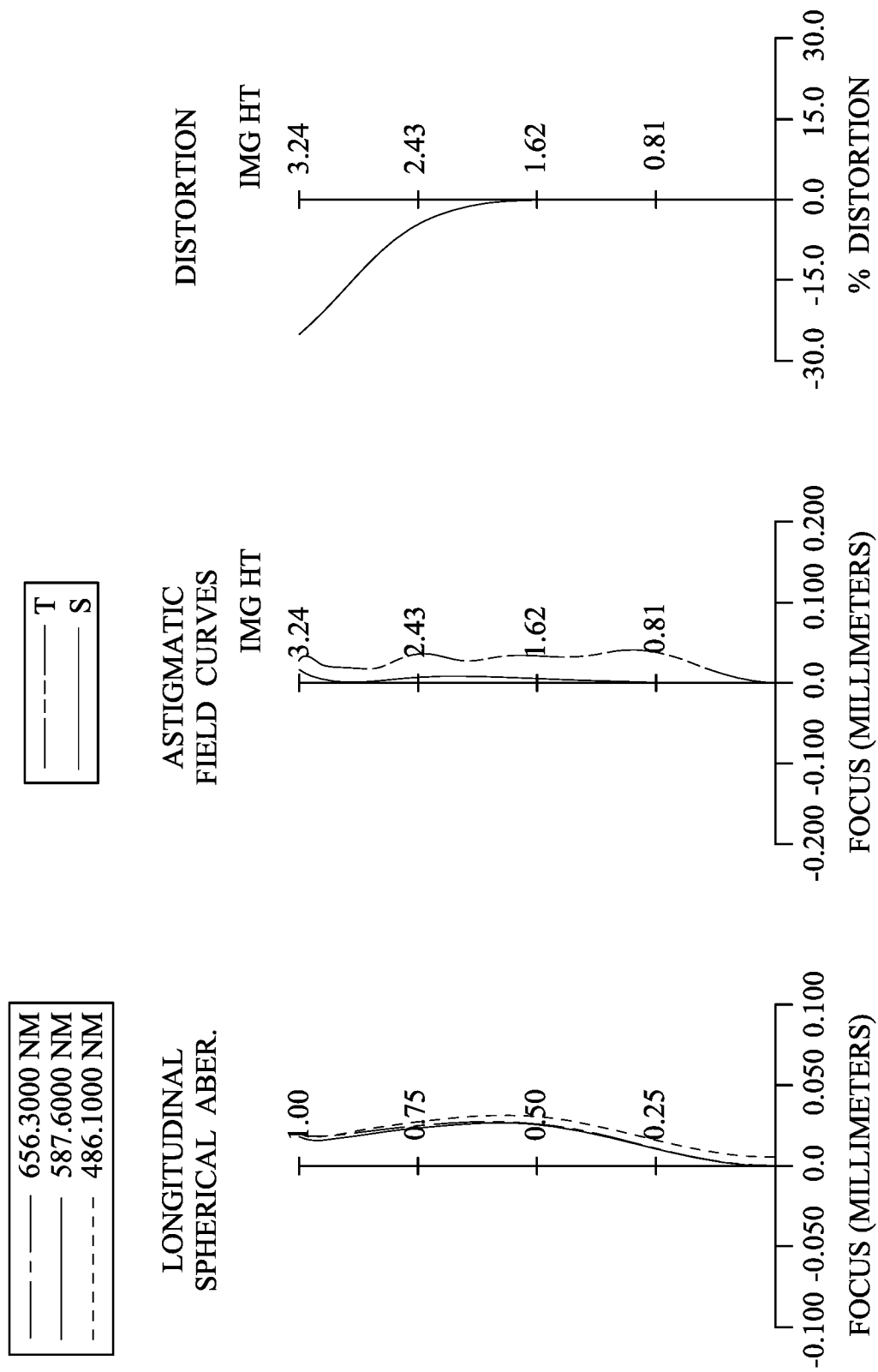
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows spherical aberration curves, astigmatic field curves and a distortion curve of the imaging apparatus according to the 5th embodiment. In FIG. 9, the imaging apparatus includes an image capturing lens assembly (its reference numeral is omitted) and an image sensor 595. The image capturing lens assembly includes, in order from an object side to an image side along an optical path, a first lens element 510, a second lens element 520, an aperture stop 500, a third lens element 530, a stop 501, a fourth lens element 540, a fifth lens element 550, a sixth lens element 560, a seventh lens element 570, a filter 580 and an image surface 590, wherein the image sensor 595 is disposed on the image surface 590 of the image capturing lens assembly. The image capturing lens assembly includes seven lens elements (510, 520, 530, 540, 550, 560, 570) without additional one or more lens elements inserted between the first lens element 510 and the seventh lens element 570.

The first lens element 510 with negative refractive power has an object-side surface 511 being concave in a paraxial region thereof and an image-side surface 512 being concave in a paraxial region thereof. The first lens element 510 is made of a plastic material, and has the object-side surface 511 and the image-side surface 512 being both aspheric. Furthermore, the object-side surface 511 of the first lens element 510 includes one inflection point and one critical point in an off-axis region thereof.

The second lens element 520 with positive refractive power has an object-side surface 521 being convex in a paraxial region thereof and an image-side surface 522 being convex in a paraxial region thereof. The second lens element 520 is made of a plastic material, and has the object-side surface 521 and the image-side surface 522 being both aspheric. Furthermore, the object-side surface 521 of the second lens element 520 includes one inflection point and one critical point in an off-axis region thereof, and the image-side surface 522 of the second lens element 520 includes two inflection points and two critical points in an off-axis region thereof.

The third lens element 530 with positive refractive power has an object-side surface 531 being convex in a paraxial region thereof and an image-side surface 532 being convex in a paraxial region thereof. The third lens element 530 is made of a glass material, and has the object-side surface 531 and the image-side surface 532 being both aspheric. Furthermore, the object-side surface 531 of the third lens element 530 includes one inflection point in an off-axis region thereof.

The fourth lens element 540 with negative refractive power has an object-side surface 541 being convex in a paraxial region thereof and an image-side surface 542 being concave in a paraxial region thereof. The fourth lens element 540 is made of a plastic material, and has the object-side surface 541 and the image-side surface 542 being both aspheric. Furthermore, the object-side surface 541 of the fourth lens element 540 includes one inflection point and one critical point in an off-axis region thereof, and the image-side surface 542 of the fourth lens element 540 includes one inflection point and one critical point in an off-axis region thereof.

The fifth lens element 550 with positive refractive power has an object-side surface 551 being convex in a paraxial region thereof and an image-side surface 552 being convex in a paraxial region thereof. The fifth lens element 550 is made of a plastic material, and has the object-side surface 551 and the image-side surface 552 being both aspheric. Furthermore, the object-side surface 551 of the fifth lens element 550 includes one inflection point and one critical point in an off-axis region thereof, and the image-side surface 552 of the fifth lens element 550 includes one inflection point in an off-axis region thereof.

The sixth lens element 560 with negative refractive power has an object-side surface 561 being concave in a paraxial region thereof and an image-side surface 562 being concave in a paraxial region thereof. The sixth lens element 560 is made of a plastic material, and has the object-side surface 561 and the image-side surface 562 being both aspheric. Furthermore, the object-side surface 561 of the sixth lens element 560 includes three inflection points and two critical points in an off-axis region thereof, and the image-side surface 562 of the sixth lens element 560 includes three inflection points and one critical point in an off-axis region thereof.

The seventh lens element 570 with negative refractive power has an object-side surface 571 being convex in a paraxial region thereof and an image-side surface 572 being concave in a paraxial region thereof. The seventh lens element 570 is made of a plastic material, and has the object-side surface 571 and the image-side surface 572 being both aspheric. Furthermore, the object-side surface 571 of the seventh lens element 570 includes four inflection points and one critical point in an off-axis region thereof, and the image-side surface 572 of the seventh lens element 570 includes two inflection points and one critical point in an off-axis region thereof.

The filter 580 is made of a glass material, which is located between the seventh lens element 570 and the image surface 590 in order, and will not affect the focal length of the image capturing lens assembly.

The detailed optical data of the 5th embodiment are shown in Table 9 and the aspheric surface data are shown in Table 10 below.

TABLE 9

5th Embodiment
f = 2.21 mm, Fno = 2.35, HFOV = 62.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.591 | ASP | 0.750 | Plastic | 1.545 | 56.1 | −3.63 |
| 2 | | 3.684 | ASP | 0.634 | | | | |
| 3 | Lens 2 | 18.510 | ASP | 0.343 | Plastic | 1.614 | 26.0 | 13.16 |
| 4 | | −14.222 | ASP | 0.252 | | | | |
| 5 | Ape. Stop | Plano | | −0.038 | | | | |
| 6 | Lens 3 | 4.502 | ASP | 0.927 | Glass | 1.525 | 70.3 | 2.15 |
| 7 | | −1.403 | ASP | −0.033 | | | | |
| 8 | Stop | Plano | | 0.143 | | | | |
| 9 | Lens 4 | 7.304 | ASP | 0.350 | Plastic | 1.639 | 23.5 | −4.95 |
| 10 | | 2.164 | ASP | 0.298 | | | | |
| 11 | Lens 5 | 186.567 | ASP | 0.963 | Plastic | 1.544 | 56.0 | 2.80 |
| 12 | | −1.531 | ASP | 0.030 | | | | |
| 13 | Lens 6 | −19.501 | ASP | 0.527 | Plastic | 1.639 | 23.5 | −27.88 |
| 14 | | 207.039 | ASP | 0.211 | | | | |
| 15 | Lens 7 | 2.514 | ASP | 0.350 | Plastic | 1.669 | 19.5 | −3.92 |
| 16 | | 1.211 | ASP | 0.500 | | | | |
| 19 | Filter | Plano | | 0.210 | Glass | 1.517 | 64.2 | — |
| 20 | | Plano | | 0.430 | | | | |
| 21 | Image | Plano | | — | | | | |

Reference wavelength is 587.6 nm (d-line).
Effective radius of Surface 8 (stop 501) is 0.930 mm.

TABLE 10

Aspheric Coefficients

| Surface # | 1 | 2 | 3 | 4 | 6 | 7 |
|---|---|---|---|---|---|---|
| k = | −6.1766E+01 | 0.0000E+00 | 0.0000E+00 | 0.0000E+00 | 0.0000E+00 | −2.1550E+00 |
| A4 = | 9.2513E−02 | 3.0862E−01 | 5.7828E−02 | 1.3567E−01 | 1.1529E−01 | 4.3698E−02 |
| A6 = | −4.3148E−02 | −1.8775E−01 | −6.4884E−02 | −1.5447E−01 | −1.5955E−01 | −2.1189E−01 |
| A8 = | 1.8290E−02 | 2.7023E−01 | −3.5217E−02 | 8.8216E−02 | 3.6105E−01 | 2.8292E−01 |
| A10 = | −5.6927E−03 | −1.7046E−01 | −2.0190E−02 | −1.5983E−01 | −1.4335E+00 | −4.9467E−01 |
| A12 = | 1.1061E−03 | 3.6812E−02 | 2.2685E−02 | 1.0437E−01 | 2.5702E+00 | 4.8498E−01 |
| A14 = | −1.1874E−04 | −2.5680E−03 | | | −1.9286E+00 | −2.4123E−01 |
| A16 = | 5.4782E−06 | | | | | |

| Surface # | 9 | 10 | 11 | 12 | 13 | 14 |
|---|---|---|---|---|---|---|
| k = | 0.0000E+00 | 0.0000E+00 | 0.0000E+00 | −1.0000E+00 | −1.0000E+00 | 0.0000E+00 |
| A4 = | −8.9122E−02 | −2.0343E−01 | 3.3198E−02 | 2.0608E−01 | 7.9662E−02 | −2.7643E−02 |
| A6 = | 7.3119E−02 | 2.6269E−01 | −4.5987E−02 | −2.6010E−01 | −8.2834E−02 | 1.5116E−01 |
| A8 = | −2.6715E−01 | −3.5640E−01 | 7.7486E−02 | 2.7297E−01 | 7.8544E−02 | −1.7293E−01 |
| A10 = | 4.3691E−01 | 3.4352E−01 | −1.0879E−01 | −2.6239E−01 | −1.3232E−01 | 1.0007E−01 |
| A12 = | −5.7520E−01 | −2.3059E−01 | 8.8558E−02 | 1.7915E−01 | 1.2901E−01 | −3.4678E−02 |
| A14 = | 4.4094E−01 | 1.0235E−01 | −4.1057E−02 | −7.7252E−02 | −7.5905E−02 | 7.5300E−03 |
| A16 = | −1.6460E−01 | −2.7316E−02 | 1.0702E−02 | 1.8671E−02 | 2.6552E−02 | −1.0113E−03 |
| A18 = | | 3.1940E−03 | −1.2980E−03 | −1.8836E−03 | −4.9745E−03 | 7.7226E−05 |
| A20 = | | | | | 3.8100E−04 | −2.5722E−06 |

| Surface # | 15 | 16 |
|---|---|---|
| k = | 0.0000E+00 | −1.0000E+00 |
| A4 = | −1.9607E−01 | −2.9201E−01 |
| A6 = | 7.5825E−02 | 1.6046E−01 |
| A8 = | −3.8135E−02 | −8.1409E−02 |
| A10 = | 2.1038E−02 | 3.3897E−02 |
| A12 = | −7.3904E−03 | −1.0562E−02 |
| A14 = | 1.5257E−03 | 2.2748E−03 |
| A16 = | −1.9220E−04 | −3.1304E−04 |
| A18 = | 1.4654E−05 | 2.4435E−05 |
| A20 = | −5.4298E−07 | −8.1528E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.21 | f/f1 | −0.61 |
| Fno | 2.35 | \|f/f2\| | 0.17 |
| HFOV [deg.] | 62.8 | f/f3 | 1.03 |
| (V1 + V3 + V5)/(V2 + V4 + V6 + V7) | 1.97 | \|f/f4\| | 0.45 |
| V1/V2 | 2.16 | f/f5 | 0.79 |
| V6 | 23.5 | [f/f6] | 0.08 |
| V6 + V7 | 42.9 | f/f7 | −0.57 |
| ΣCT/ΣAT | 2.81 | f/f67 | −0.66 |
| (CT1 + CT2)/T12 | 1.72 | f/R1 | −0.48 |
| (CT1 + CT3 + CT5)/CT7 | 7.54 | f/R14 | 1.83 |
| CT3/CT7 | 2.65 | f1/f7 | 0.93 |
| (CT6 + CT7)/CT1 | 1.17 | f3/f5 | 0.77 |
| TD/EPD | 6.06 | \|f6/f3\| | 12.95 |
| TL/f | 3.09 | Y11/Y72 | 0.88 |
| TL/ImgH | 2.11 | Yc11/Y11 | 0.32 |
| (R5 − R6)/(R5 + R6) | 1.91 | Yc72/Y72 | 0.56 |
| R13/R14 | 2.08 | | |

6th Embodiment

Figure 11:
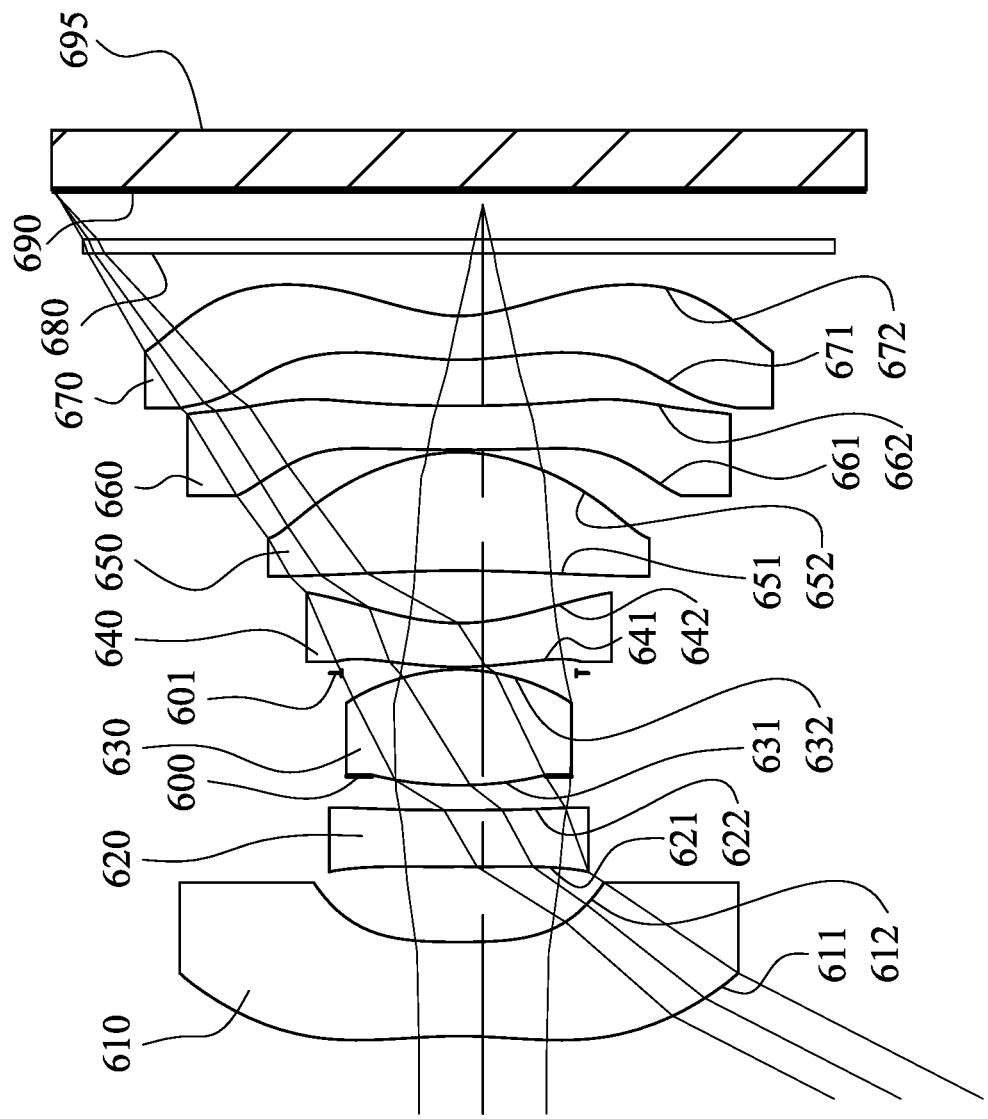
FIG. 11 is a schematic view of an imaging apparatus according to the 6th embodiment of the present disclosure.
Figure 12:
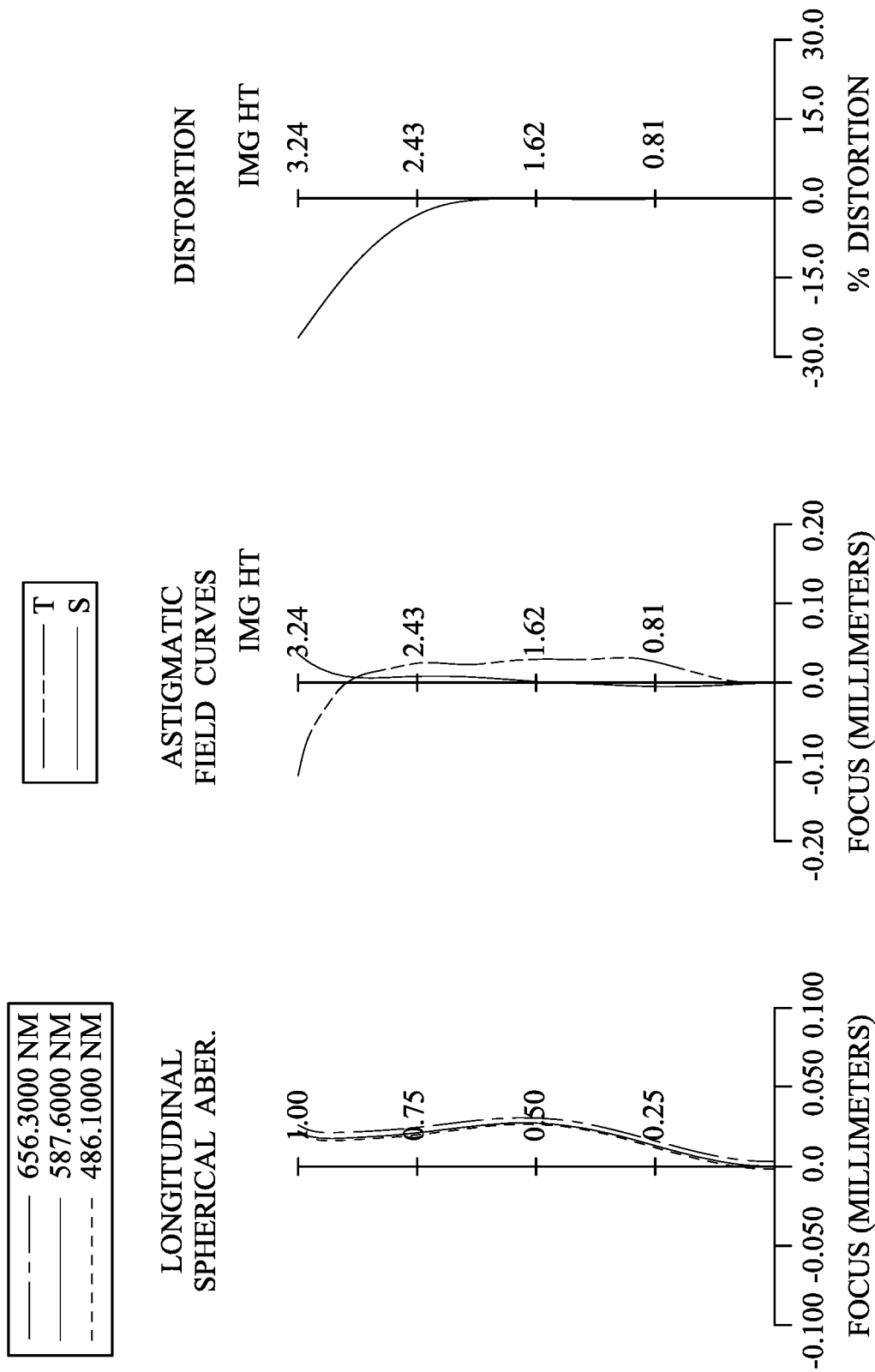
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows spherical aberration curves, astigmatic field curves and a distortion curve of the imaging apparatus according to the 6th embodiment. In FIG. 11, the imaging apparatus includes an image capturing lens assembly (its reference numeral is omitted) and an image sensor 695. The image capturing lens assembly includes, in order from an object side to an image side along an optical path, a first lens element 610, a second lens element 620, an aperture stop 600, a third lens element 630, a stop 601, a fourth lens element 640, a fifth lens element 650, a sixth lens element 660, a seventh lens element 670, a filter 680 and an image surface 690, wherein the image sensor 695 is disposed on the image surface 690 of the image capturing lens assembly. The image capturing lens assembly includes seven lens elements (610, 620, 630, 640, 650, 660, 670) without additional one or more lens elements inserted between the first lens element 610 and the seventh lens element 670.

The first lens element 610 with negative refractive power has an object-side surface 611 being concave in a paraxial region thereof and an image-side surface 612 being concave in a paraxial region thereof. The first lens element 610 is made of a plastic material, and has the object-side surface 611 and the image-side surface 612 being both aspheric. Furthermore, the object-side surface 611 of the first lens element 610 includes one inflection point and one critical point in an off-axis region thereof.

The second lens element 620 with negative refractive power has an object-side surface 621 being concave in a paraxial region thereof and an image-side surface 622 being concave in a paraxial region thereof. The second lens element 620 is made of a plastic material, and has the object-side surface 621 and the image-side surface 622 being both aspheric. Furthermore, the object-side surface 621 of the second lens element 620 includes two inflection points in an off-axis region thereof.

The third lens element 630 with positive refractive power has an object-side surface 631 being convex in a paraxial region thereof and an image-side surface 632 being convex in a paraxial region thereof. The third lens element 630 is made of a plastic material, and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of a plastic material, and has the object-side surface 641 and the image-side surface 642 being both aspheric. Furthermore, the object-side surface 641 of the fourth lens element 640 includes one inflection point and one critical point in an off-axis region thereof, and the image-side surface 642 of the fourth lens element 640 includes one inflection point in an off-axis region thereof.

The fifth lens element 650 with positive refractive power has an object-side surface 651 being concave in a paraxial region thereof and an image-side surface 652 being convex in a paraxial region thereof. The fifth lens element 650 is made of a plastic material, and has the object-side surface 651 and the image-side surface 652 being both aspheric. Furthermore, the object-side surface 651 of the fifth lens element 650 includes four inflection points in an off-axis region thereof, and the image-side surface 652 of the fifth lens element 650 includes one inflection point in an off-axis region thereof.

The sixth lens element 660 with negative refractive power has an object-side surface 661 being convex in a paraxial region thereof and an image-side surface 662 being concave in a paraxial region thereof. The sixth lens element 660 is made of a plastic material, and has the object-side surface 661 and the image-side surface 662 being both aspheric. Furthermore, the object-side surface 661 of the sixth lens element 660 includes two inflection points and one critical point in an off-axis region thereof, and the image-side surface 662 of the sixth lens element 660 includes three inflection points and one critical point in an off-axis region thereof.

The seventh lens element 670 with negative refractive power has an object-side surface 671 being convex in a paraxial region thereof and an image-side surface 672 being concave in a paraxial region thereof. The seventh lens element 670 is made of a plastic material, and has the object-side surface 671 and the image-side surface 672 being both aspheric. Furthermore, the object-side surface 671 of the seventh lens element 670 includes three inflection points and one critical point in an off-axis region thereof, and the image-side surface 672 of the seventh lens element 670 includes two inflection points and one critical point in an off-axis region thereof.

The filter 680 is made of a glass material, which is located between the seventh lens element 670 and the image surface 690 in order, and will not affect the focal length of the image capturing lens assembly.

The detailed optical data of the 6th embodiment are shown in Table 11 and the aspheric surface data are shown in Table 12 below.

TABLE 11

6th Embodiment
f = 2.24 mm, Fno = 2.20, HFOV = 62.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.116 | ASP | 0.750 | Plastic | 1.532 | 57.9 | −4.89 |
| 2 | | 7.523 | ASP | 0.602 | | | | |
| 3 | Lens 2 | −255.102 | ASP | 0.450 | Plastic | 1.686 | 18.4 | −56.41 |
| 4 | | 45.660 | ASP | 0.270 | | | | |
| 5 | Ape. Stop | Plano | | −0.070 | | | | |
| 6 | Lens 3 | 3.494 | ASP | 0.923 | Plastic | 1.532 | 57.9 | 2.09 |
| 7 | | −1.478 | ASP | −0.030 | | | | |
| 8 | Stop | Plano | | 0.050 | | | | |
| 9 | Lens 4 | 2.944 | ASP | 0.350 | Plastic | 1.614 | 26.0 | −6.72 |
| 10 | | 1.640 | ASP | 0.420 | | | | |
| 11 | Lens 5 | −8.374 | ASP | 0.944 | Plastic | 1.532 | 57.9 | 2.94 |
| 12 | | −1.369 | ASP | 0.020 | | | | |
| 13 | Lens 6 | 83.810 | ASP | 0.350 | Plastic | 1.686 | 18.4 | −23.24 |
| 14 | | 13.376 | ASP | 0.367 | | | | |
| 15 | Lens 7 | 2.469 | ASP | 0.350 | Plastic | 1.686 | 18.4 | −3.83 |
| 16 | | 1.200 | ASP | 0.500 | | | | |
| 19 | Filter | Plano | | 0.110 | Glass | 1.517 | 64.2 | — |
| 20 | | Plano | | 0.395 | | | | |
| 21 | Image | Plano | | — | | | | |

Reference wavelength is 587.6 nm (d-line).
Effective radius of Surface 8 (stop 601) is 0.935 mm

TABLE 12

Aspheric Coefficients

| Surface # | 1 | 2 | 3 | 4 | 6 | 7 |
|---|---|---|---|---|---|---|
| k = | −4.0874E+01 | −2.2790E−01 | −9.9000E+01 | 9.0000E+01 | 1.6471E+00 | −2.6706E+00 |
| A4 = | 8.5109E−02 | 2.5348E−01 | 1.8480E−01 | 7.3141E−02 | 8.8668E−02 | 3.0536E−02 |
| A6 = | −3.4970E−02 | −1.1063E−01 | −6.0079E−02 | −1.2972E−01 | −1.2121E−01 | −1.4807E−01 |
| A8 = | 1.3901E−02 | 1.0634E−01 | −2.5423E−03 | 1.2677E−01 | 3.1737E−01 | 1.7308E−01 |
| A10 = | −4.0495E−03 | −3.4829E−02 | 1.9214E−02 | −1.0020E−01 | −1.0451E+00 | −1.8741E−01 |
| A12 = | 7.6823E−04 | −3.2786E−05 | −8.0465E−03 | 5.0854E−02 | 1.7018E+00 | 1.2981E−01 |
| A14 = | −8.6239E−05 | 4.8937E−04 | | | −1.1096E+00 | −7.1491E−02 |
| A16 = | 4.4095E−06 | | | | | |

| Surface # | 9 | 10 | 11 | 12 | 13 | 14 |
|---|---|---|---|---|---|---|
| k = | −1.4646E+01 | −6.6197E−01 | 1.8999E+00 | −1.1217E+00 | 9.0000E+01 | −9.9000E+01 |
| A4 = | −6.3478E−02 | −2.2602E−01 | 5.2207E−02 | 2.0473E−01 | 8.5404E−02 | −2.5004E−02 |
| A6 = | 1.2394E−01 | 3.3247E−01 | −5.8328E−02 | −4.2124E−01 | −1.6807E−01 | 1.6767E−01 |
| A8 = | −5.0817E−01 | −5.4274E−01 | 8.9050E−02 | 5.4713E−01 | 1.8473E−01 | −2.4499E−01 |
| A10 = | 9.8204E−01 | 6.3812E−01 | −1.1326E−01 | −5.0371E−01 | −2.1665E−01 | 1.6546E−01 |
| A12 = | −1.1936E+00 | −5.0941E−01 | 8.7013E−02 | 3.2026E−01 | 1.6521E−01 | −6.5235E−02 |
| A14 = | 8.0286E−01 | 2.5864E−01 | −3.8838E−02 | −1.3213E−01 | −7.3307E−02 | 1.6131E−02 |
| A16 = | −2.4333E−01 | −7.5192E−02 | 1.0222E−02 | 3.1439E−02 | 1.8649E−02 | −2.4826E−03 |
| A18 = | | 9.3927E−03 | −1.3520E−03 | −3.2013E−03 | −2.5231E−03 | 2.1818E−04 |
| A20 = | | | | | 1.4010E−04 | −8.3777E−06 |

| Surface # | 15 | 16 |
|---|---|---|
| k = | −3.6200E−02 | −9.8486E−01 |
| A4 = | −2.3073E−01 | −3.3630E−01 |
| A6 = | 6.6658E−02 | 2.0009E−01 |
| A8 = | 4.2812E−02 | −9.1646E−02 |
| A10 = | −5.9180E−02 | 2.8900E−02 |
| A12 = | 2.7108E−02 | −6.1790E−03 |
| A14 = | −6.1827E−03 | 8.7635E−04 |
| A16 = | 7.2024E−04 | −7.9575E−05 |
| A18 = | −3.6416E−05 | 4.3105E−06 |
| A20 = | 3.1604E−07 | −1.1036E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.24 | f/f1 | −0.46 |
| Fno | 2.20 | |f/f2| | 0.04 |
| HFOV [deg.] | 62.8 | f/f3 | 1.07 |
| (V1 + V3 + V5)/(V2 + V4 + V6 + V7) | 2.14 | |f/f4| | 0.33 |
| V1/V2 | 3.15 | f/f5 | 0.76 |
| V6 | 18.4 | |f/f6| | 0.10 |
| V6 + V7 | 36.8 | f/f7 | −0.58 |
| ΣCT/ΣAT | 2.53 | f/f67 | −0.70 |
| (CT1 + CT2)/T12 | 1.99 | f/R1 | −0.54 |
| (CT1 + CT3 + CT5)/CT7 | 7.48 | f/R14 | 1.86 |
| CT3/CT7 | 2.64 | f1/f7 | 1.28 |
| (CT6 + CT7)/CT1 | 0.93 | f3/f5 | 0.71 |
| TD/EPD | 5.65 | |f6/f3| | 11.14 |
| TL/f | 3.02 | Y11/Y72 | 0.89 |
| TL/ImgH | 2.09 | Yc11/Y11 | 0.36 |
| (R5 − R6)/(R5 + R6) | 2.47 | Yc72/Y72 | 0.55 |
| R13/R14 | 2.06 | | |

7th Embodiment

Figure 13:
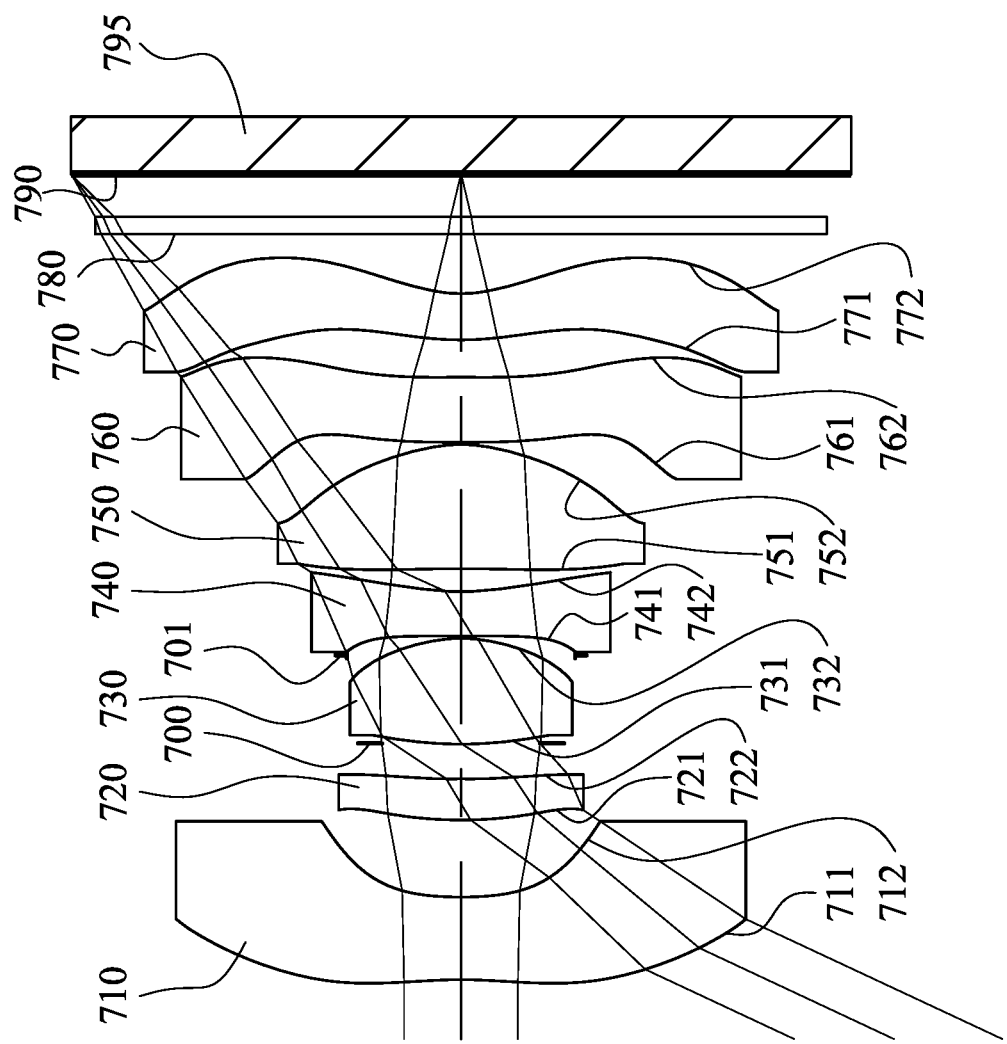
FIG. 13 is a schematic view of an imaging apparatus according to the 7th embodiment of the present disclosure.
Figure 14:
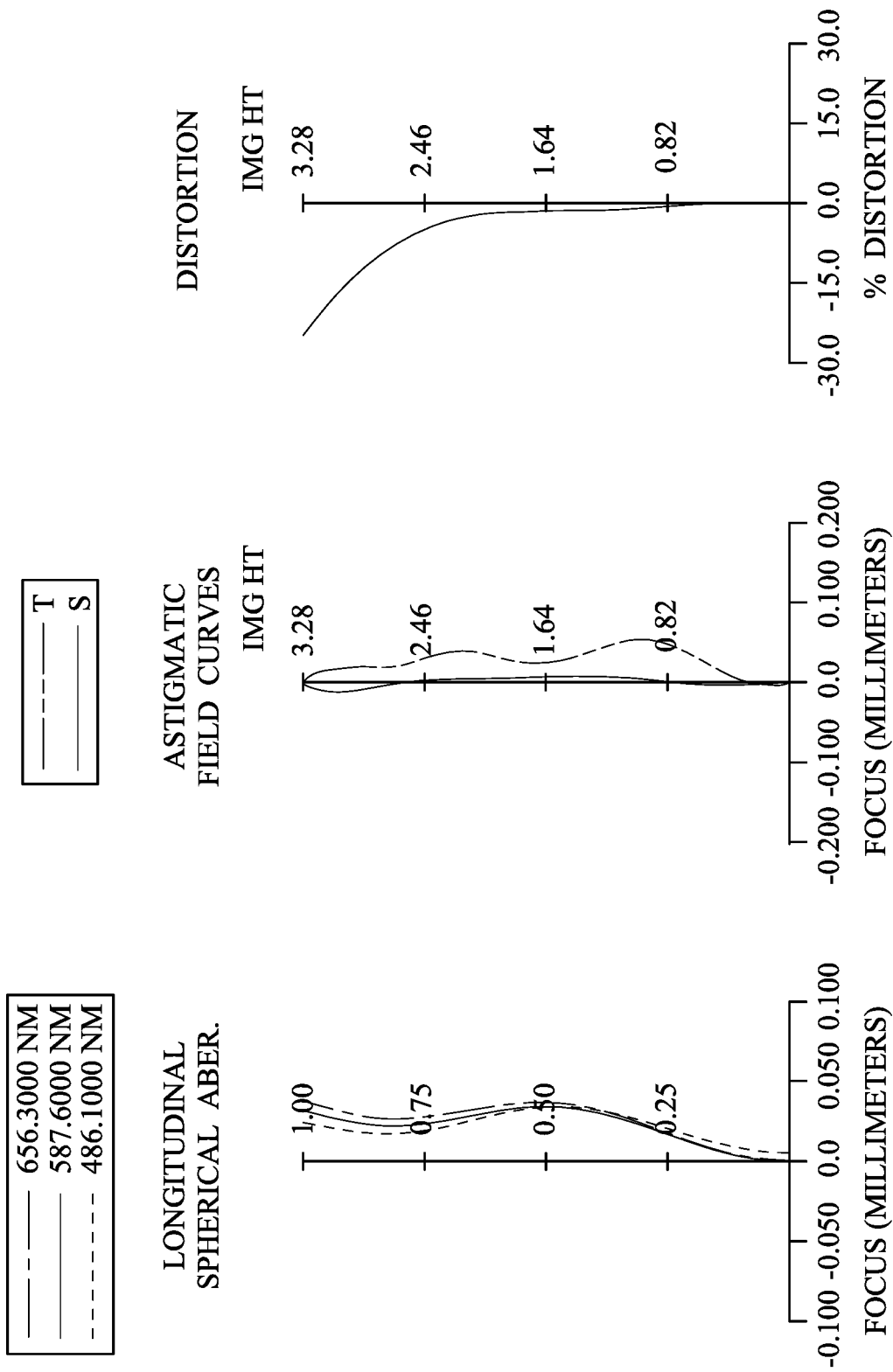
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows spherical aberration curves, astigmatic field curves and a distortion curve of the imaging apparatus according to the 7th embodiment. In FIG. 13, the imaging apparatus includes an image capturing lens assembly (its reference numeral is omitted) and an image sensor 795. The image capturing lens assembly includes, in order from an object side to an image side along an optical path, a first lens element 710, a second lens element 720, an aperture stop 700, a third lens element 730, a stop 701, a fourth lens element 740, a fifth lens element 750, a sixth lens element 760, a seventh lens element 770, a filter 780 and an image surface 790, wherein the image sensor 795 is disposed on the image surface 790 of the image capturing lens assembly. The image capturing lens assembly includes seven lens elements (710, 720, 730, 740, 750, 760, 770) without additional one or more lens elements inserted between the first lens element 710 and the seventh lens element 770.

The first lens element 710 with negative refractive power has an object-side surface 711 being concave in a paraxial region thereof and an image-side surface 712 being concave in a paraxial region thereof. The first lens element 710 is made of a plastic material, and has the object-side surface 711 and the image-side surface 712 being both aspheric. Furthermore, the object-side surface 711 of the first lens element 710 includes one inflection point and one critical point in an off-axis region thereof.

The second lens element 720 with positive refractive power has an object-side surface 721 being convex in a paraxial region thereof and an image-side surface 722 being concave in a paraxial region thereof. The second lens element 720 is made of a plastic material, and has the object-side surface 721 and the image-side surface 722 being both aspheric. Furthermore, the object-side surface 721 of the second lens element 720 includes one inflection point and one critical point in an off-axis region thereof, and the image-side surface 722 of the second lens element 720 includes one inflection point and one critical point in an off-axis region thereof.

The third lens element 730 with positive refractive power has an object-side surface 731 being convex in a paraxial region thereof and an image-side surface 732 being convex in a paraxial region thereof. The third lens element 730 is made of a plastic material, and has the object-side surface 731 and the image-side surface 732 being both aspheric. Furthermore, the object-side surface 731 of the third lens element 730 includes one inflection point in an off-axis region thereof.

The fourth lens element 740 with negative refractive power has an object-side surface 741 being concave in a paraxial region thereof and an image-side surface 742 being concave in a paraxial region thereof. The fourth lens element 740 is made of a plastic material, and has the object-side surface 741 and the image-side surface 742 being both aspheric. Furthermore, the image-side surface 742 of the fourth lens element 740 includes two inflection points in an off-axis region thereof.

The fifth lens element 750 with positive refractive power has an object-side surface 751 being concave in a paraxial region thereof and an image-side surface 752 being convex in a paraxial region thereof. The fifth lens element 750 is made of a plastic material, and has the object-side surface 751 and the image-side surface 752 being both aspheric. Furthermore, the object-side surface 751 of the fifth lens element 750 includes one inflection point and one critical point in an off-axis region thereof, and the image-side surface 752 of the fifth lens element 750 includes one inflection point in an off-axis region thereof.

The sixth lens element 760 has an object-side surface 761 being planar in a paraxial region thereof and an image-side surface 762 being planar in a paraxial region thereof. The sixth lens element 760 is made of a plastic material, and has the object-side surface 761 and the image-side surface 762 being both aspheric. Furthermore, the object-side surface 761 of the sixth lens element 760 includes two inflection points and one critical point in an off-axis region thereof, and the image-side surface 762 of the sixth lens element 760 includes two inflection points and one critical point in an off-axis region thereof.

The seventh lens element 770 with negative refractive power has an object-side surface 771 being convex in a paraxial region thereof and an image-side surface 772 being concave in a paraxial region thereof. The seventh lens element 770 is made of a plastic material, and has the object-side surface 771 and the image-side surface 772 being both aspheric. Furthermore, the object-side surface 771 of the seventh lens element 770 includes two inflection points and one critical point in an off-axis region thereof, and the image-side surface 772 of the seventh lens element 770 includes two inflection points and one critical point in an off-axis region thereof.

The filter 780 is made of a glass material, which is located between the seventh lens element 770 and the image surface 790 in order, and will not affect the focal length of the image capturing lens assembly.

The detailed optical data of the 7th embodiment are shown in Table 13 and the aspheric surface data are shown in Table 14 below.

TABLE 13

7th Embodiment
f = 2.03 mm, Fno = 2.12, HFOV = 64.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.790 | ASP | 0.695 | Plastic | 1.528 | 58.0 | −3.25 |
| 2 | | 3.339 | ASP | 0.649 | | | | |
| 3 | Lens 2 | 3.730 | ASP | 0.347 | Plastic | 1.614 | 26.0 | 9.25 |
| 4 | | 10.489 | ASP | 0.298 | | | | |
| 5 | Ape. Stop | Plano | | −0.005 | | | | |
| 6 | Lens 3 | 3.900 | ASP | 0.890 | Plastic | 1.528 | 58.0 | 1.90 |
| 7 | | −1.246 | ASP | −0.143 | | | | |
| 8 | Stop | Plano | | 0.163 | | | | |
| 9 | Lens 4 | −200.000 | ASP | 0.374 | Plastic | 1.639 | 23.5 | −3.48 |
| 10 | | 2.250 | ASP | 0.193 | | | | |
| 11 | Lens 5 | −11.654 | ASP | 1.045 | Plastic | 1.528 | 58.0 | 2.69 |
| 12 | | −1.307 | ASP | 0.020 | | | | |
| 13 | Lens 6 | ∞ | ASP | 0.547 | Plastic | 1.639 | 23.5 | ∞ |
| 14 | | ∞ | ASP | 0.315 | | | | |
| 15 | Lens 7 | 2.626 | ASP | 0.390 | Plastic | 1.701 | 14.9 | −3.54 |
| 16 | | 1.197 | ASP | 0.500 | | | | |
| 19 | Filter | Plano | | 0.145 | Glass | 1.517 | 64.2 | — |
| 20 | | Plano | | 0.361 | | | | |
| 21 | Image | Plano | | — | | | | |

Reference wavelength is 587.6 nm (d-line).
Effective radius of Surface 8 (stop 701) is 0.960 mm

TABLE 14

Aspheric Coefficients

| Surface # | 1 | 2 | 3 | 4 | 6 | 7 |
|---|---|---|---|---|---|---|
| k = | −5.8479E+01 | 0.0000E+00 | 0.0000E+00 | 0.0000E+00 | 0.0000E+00 | −2.9199E+00 |
| A4 = | 8.5729E−02 | 3.2128E−01 | 5.4359E−02 | 8.6442E−02 | 4.4994E−02 | 1.8929E−01 |
| A6 = | −3.6138E−02 | −1.8344E−01 | −8.7824E−02 | −1.4848E−01 | 5.8807E−02 | −8.5831E−01 |
| A8 = | 1.2413E−02 | 1.9788E−01 | 4.5871E−02 | 1.7730E−01 | −3.8911E−01 | 1.7451E+00 |
| A10 = | −3.1484E−03 | −1.0668E−01 | −1.1694E−01 | −3.0277E−01 | 5.5759E−01 | −2.4071E+00 |
| A12 = | 5.1749E−04 | 1.7919E−02 | 5.7243E−02 | 1.7134E−01 | −4.1118E−01 | 1.7214E+00 |
| A14 = | −4.8135E−05 | −9.0640E−04 | | | −8.5350E−02 | −5.3557E−01 |
| A16 = | 1.9448E−06 | | | | | |

| Surface # | 9 | 10 | 11 | 12 | 13 | 14 |
|---|---|---|---|---|---|---|
| k = | 0.0000E+00 | 0.0000E+00 | 0.0000E+00 | −1.0000E+00 | 0.0000E+00 | 0.0000E+00 |
| A4 = | −1.8626E−02 | −2.7571E−01 | 3.2991E−02 | 2.3989E−01 | 1.7858E−01 | 1.0001E−01 |
| A6 = | −2.7111E−01 | 5.4029E−01 | 1.2468E−01 | −2.4848E−01 | −1.5368E−01 | −5.7604E−03 |
| A8 = | 5.5470E−01 | −1.0069E+00 | −3.1754E−01 | 1.1730E−01 | 2.3792E−02 | −5.6520E−02 |
| A10 = | −1.0330E+00 | 1.3365E+00 | 3.5623E−01 | −2.3528E−02 | 3.4837E−02 | 4.3340E−02 |
| A12 = | 1.3063E+00 | −1.1780E+00 | −2.1287E−01 | 3.8141E−03 | −3.3348E−02 | −1.6735E−02 |
| A14 = | −1.1667E+00 | 6.4761E−01 | 6.6529E−02 | −8.4292E−03 | 1.3124E−02 | 3.9060E−03 |
| A16 = | 4.7074E−01 | −2.0053E−01 | −8.7955E−03 | 5.4213E−03 | −2.5025E−03 | −5.6108E−04 |
| A18 = | | 2.6837E−02 | 9.4681E−05 | −9.6248E−04 | 2.1887E−04 | 4.5879E−05 |
| A20 = | | | | | −6.6483E−06 | −1.6327E−06 |

| Surface# | 15 | 16 |
|---|---|---|
| k = | 0.0000E+00 | −1.0000E+00 |
| A4 = | −9.5986E−02 | −2.7319E−01 |
| A6 = | −6.0324E−02 | 1.3418E−01 |
| A8 = | 8.1868E−02 | −5.5322E−02 |
| A10 = | −4.7767E−02 | 1.7527E−02 |
| A12 = | 1.7257E−02 | −4.0632E−03 |
| A14 = | −3.9567E−03 | 6.5239E−04 |
| A16 = | 5.4863E−04 | −6.7872E−05 |
| A18 = | −4.1425E−05 | 4.0884E−06 |
| A20 = | 1.2951E−06 | −1.0757E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.03 | f/f1 | −0.62 |
| Fno | 2.12 | |f/f2| | 0.22 |
| HFOV [deg.] | 64.9 | f/f3 | 1.07 |
| (V1 + V3 + V5)/(V2 + V4 + V6 + V7) | 1.98 | |f/f4| | 0.58 |
| V1/V2 | 2.23 | f/f5 | 0.75 |
| V6 | 23.5 | |f/f6| | 0.00 |
| V6 + V7 | 38.4 | f/f7 | −0.57 |
| ΣCT/ΣAT | 2.88 | f/f67 | −0.57 |
| (CT1 + CT2)/T12 | 1.61 | f/R1 | −0.54 |
| (CT1 + CT3 + CT5)/CT7 | 6.74 | f/R14 | 1.70 |
| CT3/CT7 | 2.28 | f1/f7 | 0.92 |
| (CT6 + CT7)/CT1 | 1.35 | f3/f5 | 0.71 |
| TD/EPD | 6.03 | |f6/f3| | ∞ |
| TL/f | 3.34 | Y11/Y72 | 0.90 |
| TL/ImgH | 2.07 | Yc11/Y11 | 0.32 |
| (R5 − R6)/(R5 + R6) | 1.94 | Yc72/Y72 | 0.57 |
| R13/R14 | 2.19 | | |

8th Embodiment

Figure 15:
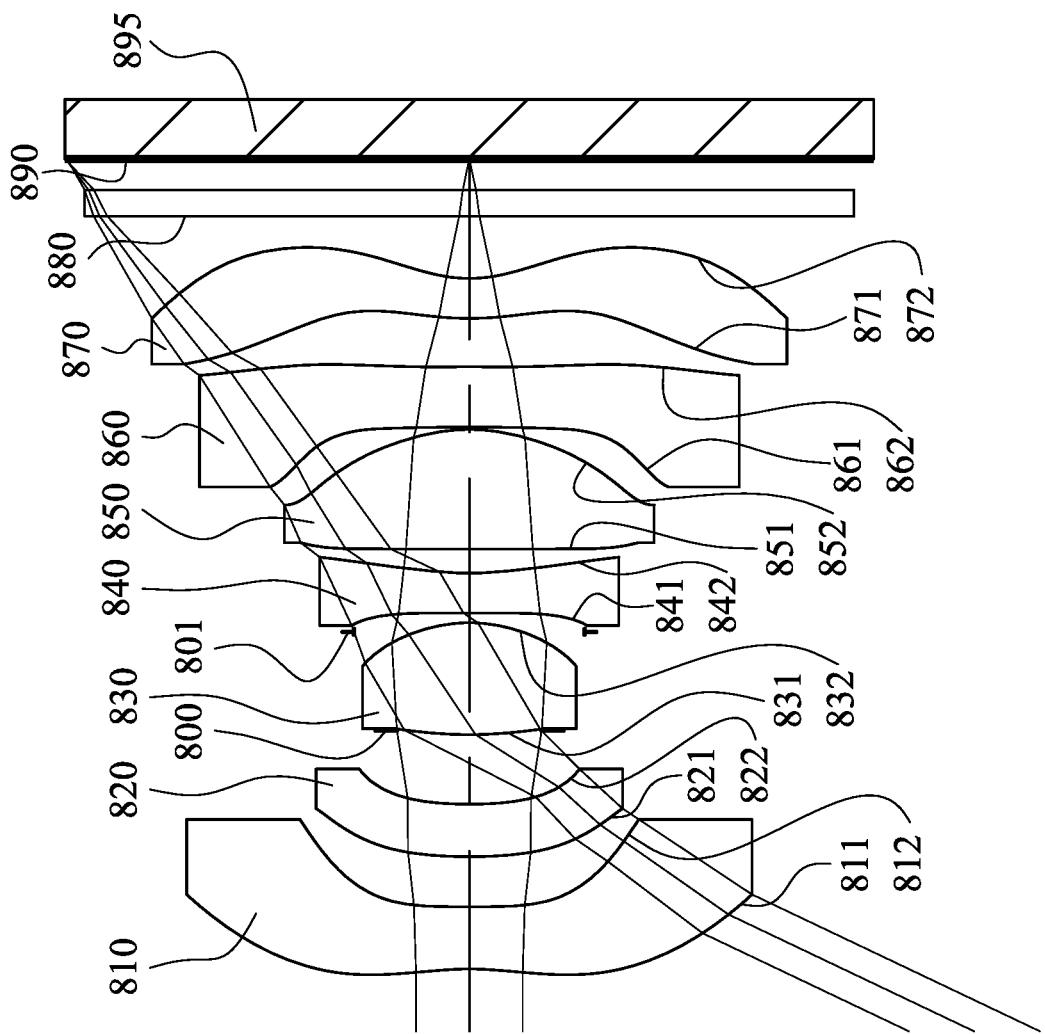
FIG. 15 is a schematic view of an imaging apparatus according to the 8th embodiment of the present disclosure.
Figure 16:
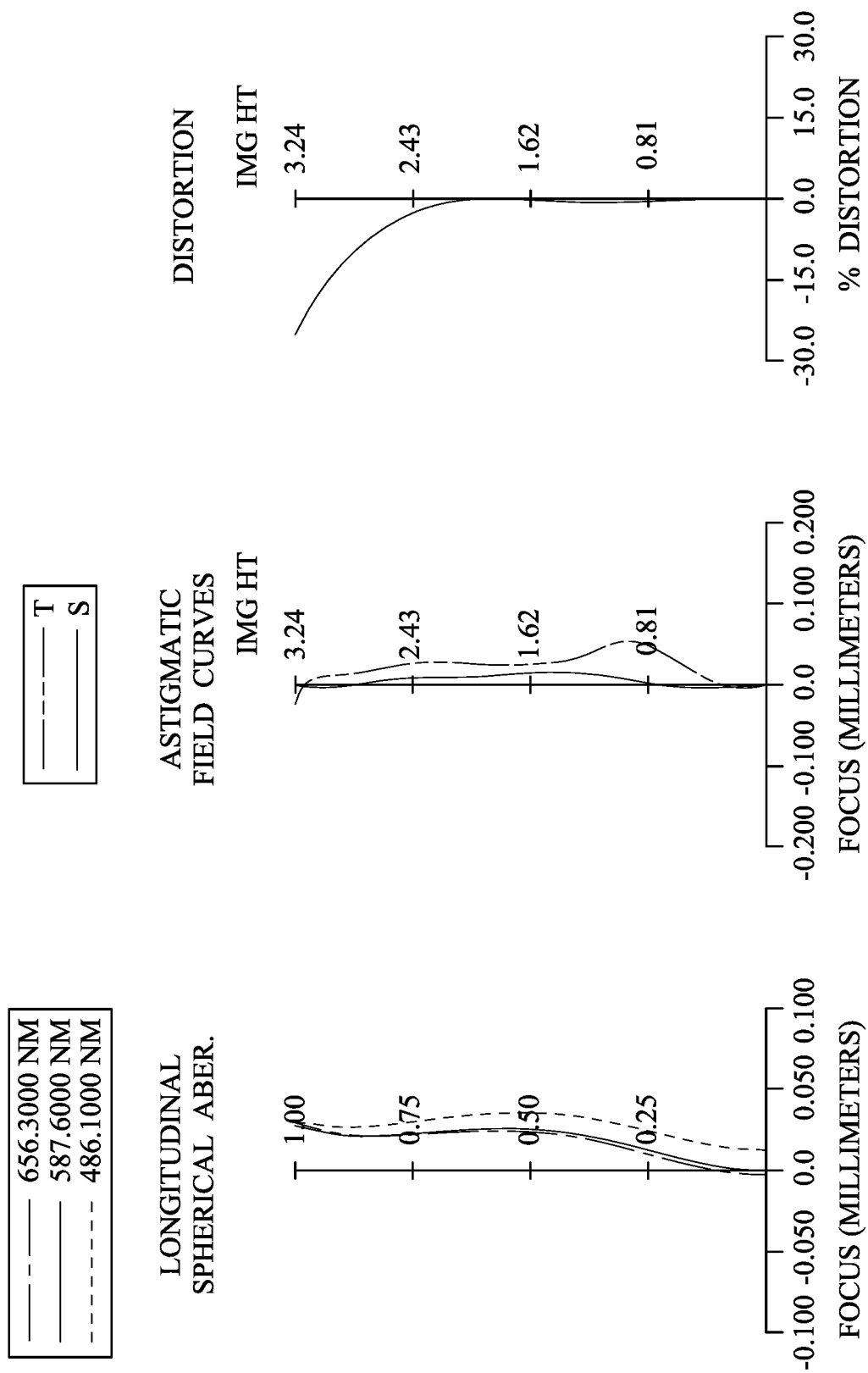
FIG. 16 shows spherical aberration curves, astigmatic field curves and a distortion curve of the imaging apparatus according to the 8th embodiment.

FIG. 15 is a schematic view of an imaging apparatus according to the 8th embodiment of the present disclosure. FIG. 16 shows spherical aberration curves, astigmatic field curves and a distortion curve of the imaging apparatus according to the 8th embodiment. In FIG. 15, the imaging apparatus includes an image capturing lens assembly (its reference numeral is omitted) and an image sensor 895. The image capturing lens assembly includes, in order from an object side to an image side along an optical path, a first lens element 810, a second lens element 820, an aperture stop 800, a third lens element 830, a stop 801, a fourth lens element 840, a fifth lens element 850, a sixth lens element 860, a seventh lens element 870, a filter 880 and an image surface 890, wherein the image sensor 895 is disposed on the image surface 890 of the image capturing lens assembly. The image capturing lens assembly includes seven lens elements (810, 820, 830, 840, 850, 860, 870) without additional one or more lens elements inserted between the first lens element 810 and the seventh lens element 870.

The first lens element 810 with negative refractive power has an object-side surface 811 being concave in a paraxial region thereof and an image-side surface 812 being convex in a paraxial region thereof. The first lens element 810 is made of a plastic material, and has the object-side surface 811 and the image-side surface 812 being both aspheric. Furthermore, the object-side surface 811 of the first lens element 810 includes one inflection point and one critical point in an off-axis region thereof, and the image-side surface 812 of the first lens element 810 includes two inflection points and one critical point in an off-axis region thereof.

The second lens element 820 with negative refractive power has an object-side surface 821 being convex in a paraxial region thereof and an image-side surface 822 being concave in a paraxial region thereof. The second lens element 820 is made of a plastic material, and has the object-side surface 821 and the image-side surface 822 being both aspheric. Furthermore, the object-side surface 821 of the second lens element 820 includes one inflection point in an off-axis region thereof.

The third lens element 830 with positive refractive power has an object-side surface 831 being convex in a paraxial region thereof and an image-side surface 832 being convex in a paraxial region thereof. The third lens element 830 is made of a plastic material, and has the object-side surface 831 and the image-side surface 832 being both aspheric. Furthermore, the object-side surface 831 of the third lens element 830 includes one inflection point in an off-axis region thereof.

The fourth lens element 840 with negative refractive power has an object-side surface 841 being concave in a paraxial region thereof and an image-side surface 842 being concave in a paraxial region thereof. The fourth lens element 840 is made of a plastic material, and has the object-side surface 841 and the image-side surface 842 being both aspheric. Furthermore, the image-side surface 842 of the fourth lens element 840 includes three inflection points in an off-axis region thereof.

The fifth lens element 850 with positive refractive power has an object-side surface 851 being convex in a paraxial region thereof and an image-side surface 852 being convex in a paraxial region thereof. The fifth lens element 850 is made of a plastic material, and has the object-side surface 851 and the image-side surface 852 being both aspheric. Furthermore, the object-side surface 851 of the fifth lens element 850 includes three inflection points in an off-axis region thereof, and the image-side surface 852 of the fifth lens element 850 includes one inflection point and one critical point in an off-axis region thereof.

The sixth lens element 860 with negative refractive power has an object-side surface 861 being concave in a paraxial region thereof and an image-side surface 862 being convex in a paraxial region thereof. The sixth lens element 860 is made of a plastic material, and has the object-side surface 861 and the image-side surface 862 being both aspheric. Furthermore, the object-side surface 861 of the sixth lens element 860 includes one inflection point in an off-axis region thereof, and the image-side surface 862 of the sixth lens element 860 includes four inflection points and two critical points in an off-axis region thereof.

The seventh lens element 870 with negative refractive power has an object-side surface 871 being convex in a paraxial region thereof and an image-side surface 872 being concave in a paraxial region thereof. The seventh lens element 870 is made of a plastic material, and has the object-side surface 871 and the image-side surface 872 being both aspheric. Furthermore, the object-side surface 871 of the seventh lens element 870 includes three inflection points and one critical point in an off-axis region thereof, and the image-side surface 872 of the seventh lens element 870 includes two inflection points and one critical point in an off-axis region thereof.

The filter 880 is made of a glass material, which is located between the seventh lens element 870 and the image surface 890 in order, and will not affect the focal length of the image capturing lens assembly.

The detailed optical data of the 8th embodiment are shown in Table 15 and the aspheric surface data are shown in Table 16 below.

TABLE 15

8th Embodiment
f = 2.05 mm, Fno = 2.40, HFOV = 64.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.558 | ASP | 0.500 | Plastic | 1.545 | 56.1 | −4.78 |
| 2 | | −157.978 | ASP | 0.401 | | | | |
| 3 | Lens 2 | 4.194 | ASP | 0.421 | Plastic | 1.587 | 28.3 | −29.48 |
| 4 | | 3.250 | ASP | 0.591 | | | | |
| 5 | Ape. Stop | Plano | | −0.032 | | | | |
| 6 | Lens 3 | 3.471 | ASP | 0.898 | Plastic | 1.544 | 56.0 | 1.75 |
| 7 | | −1.192 | ASP | −0.074 | | | | |
| 8 | Stop | Plano | | 0.152 | | | | |
| 9 | Lens 4 | −102.041 | ASP | 0.320 | Plastic | 1.639 | 23.3 | −4.00 |
| 10 | | 2.625 | ASP | 0.193 | | | | |
| 11 | Lens 5 | 136.986 | ASP | 0.960 | Plastic | 1.544 | 56.0 | 2.75 |
| 12 | | −1.511 | ASP | 0.020 | | | | |
| 13 | Lens 6 | −13.676 | ASP | 0.483 | Plastic | 1.660 | 20.4 | −73.91 |
| 14 | | −19.272 | ASP | 0.389 | | | | |
| 15 | Lens 7 | 2.536 | ASP | 0.320 | Plastic | 1.679 | 18.4 | −3.13 |
| 16 | | 1.097 | ASP | 0.500 | | | | |
| 19 | Filter | Plano | | 0.210 | Glass | 1.517 | 64.2 | — |
| 20 | | Plano | | 0.250 | | | | |
| 21 | Image | Plano | | — | | | | |

Reference wavelength is 587.6 nm (d-line).
Effective radius of Surface 8 (stop 801) is 0.925 mm.

TABLE 16

Aspheric Coefficients

| Surface # | 1 | 2 | 3 | 4 | 6 | 7 |
|---|---|---|---|---|---|---|
| k = | −2.5821E+01 | 0.0000E+00 | 0.0000E+00 | 0.0000E+00 | 0.0000E+00 | −1.6366E+00 |
| A4 = | 1.3467E−01 | 3.7895E−01 | 1.2503E−01 | 1.6948E−01 | −1.3706E−02 | 1.3286E−01 |
| A6 = | −6.9500E−02 | −2.3625E−01 | −4.8670E−02 | 1.5869E−02 | 1.0450E−01 | −8.7074E−01 |
| A8 = | 2.8795E−02 | 1.6499E−01 | 4.0064E−02 | 1.1829E−01 | −1.3129E−01 | 2.2138E+00 |
| A10 = | −8.2194E−03 | −6.3642E−02 | −5.9184E−03 | −3.2232E−02 | 5.2829E+00 | −3.9870E+00 |
| A12 = | 1.4729E−03 | 9.7808E−03 | −6.4773E−03 | 6.8141E−02 | −1.1334E+01 | 3.8755E+00 |
| A14 = | −1.4734E−04 | −5.0666E−04 | | | 8.8395E+00 | −1.6572E+00 |
| A16 = | 6.2301E−06 | | | | | |

| Surface # | 9 | 10 | 11 | 12 | 13 | 14 |
|---|---|---|---|---|---|---|
| k = | 0.0000E+00 | 0.0000E+00 | 0.0000E+00 | −1.0000E+00 | −1.0000E+00 | 0.0000E+00 |
| A4 = | −9.9212E−03 | −2.0833E−01 | −1.7360E−02 | 2.8952E−03 | 2.6287E−02 | 1.7650E−01 |
| A6 = | −3.1947E−01 | 3.0540E−01 | 7.8557E−02 | 3.0485E−01 | 1.3023E−01 | −2.7040E−01 |
| A8 = | 6.9181E−01 | −5.3960E−01 | −1.0760E−01 | −7.8013E−01 | −5.1795E−01 | 2.2015E−01 |
| A10 = | −8.5417E−01 | 7.7462E−01 | −4.4453E−02 | 9.6553E−01 | 6.7448E−01 | −1.1343E−01 |
| A12 = | 3.4813E−01 | −7.3838E−01 | 2.2346E−01 | −7.0886E−01 | −4.9241E−01 | 3.8180E−02 |
| A14 = | 1.1639E−01 | 4.3125E−01 | −1.9541E−01 | 3.0311E−01 | 2.0742E−01 | −8.3538E−03 |
| A16 = | −1.1314E−01 | −1.3920E−01 | 7.2643E−02 | −6.7398E−02 | −4.8387E−02 | 1.1468E−03 |
| A18 = | | 1.8870E−02 | −1.0249E−02 | 5.9031E−03 | 5.6949E−03 | −8.9889E−05 |
| A20 = | | | | | −2.6072E−04 | 3.0737E−06 |

| Surface# | 15 | 16 |
|---|---|---|
| k = | 0.0000E+00 | −1.0000E+00 |
| A4 = | −1.3581E−01 | −3.5532E−01 |
| A6 = | −1.2100E−01 | 1.7717E−01 |
| A8 = | 1.4674E−01 | −6.8821E−02 |
| A10 = | −7.0350E−02 | 2.0490E−02 |
| A12 = | 1.9153E−02 | −4.5167E−03 |
| A14 = | −3.1175E−03 | 6.8205E−04 |
| A16 = | 2.8955E−04 | −6.4426E−05 |
| A18 = | −1.2964E−05 | 3.3450E−06 |
| A20 = | 1.4857E−07 | −7.0761E−08 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.05 | f/f1 | −0.43 |
| Fno | 2.40 | \|f/f2\| | 0.07 |
| HFOV [deg.] | 64.5 | f/f3 | 1.17 |
| (V1 + V3 + V5)/(V2 + V4 + V6 + V7) | 1.86 | \|f/f4\| | 0.51 |
| V1/V2 | 1.98 | f/f5 | 0.74 |
| V6 | 20.4 | \|f/f6\| | 0.03 |
| V6 + V7 | 38.8 | f/f7 | −0.66 |
| ΣCT/ΣAT | 2.38 | f/f67 | −0.70 |
| (CT1 + CT2)/T12 | 2.30 | f/R1 | −0.80 |
| (CT1 + CT3 + CT5)/CT7 | 7.37 | f/R14 | 1.87 |
| CT3/CT7 | 2.81 | f1/f7 | 1.53 |
| (CT6 + CT7)/CT1 | 1.61 | f3/f5 | 0.64 |
| TD/EPD | 6.48 | \|f6/f3\| | 42.24 |
| TL/f | 3.17 | Y11/Y72 | 0.89 |
| TL/ImgH | 2.01 | Yc11/Y11 | 0.34 |
| (R5 − R6)/(R5 + R6) | 2.05 | Yc72/Y72 | 0.51 |
| R13/R14 | 2.31 | | |

9th Embodiment

Figure 17:
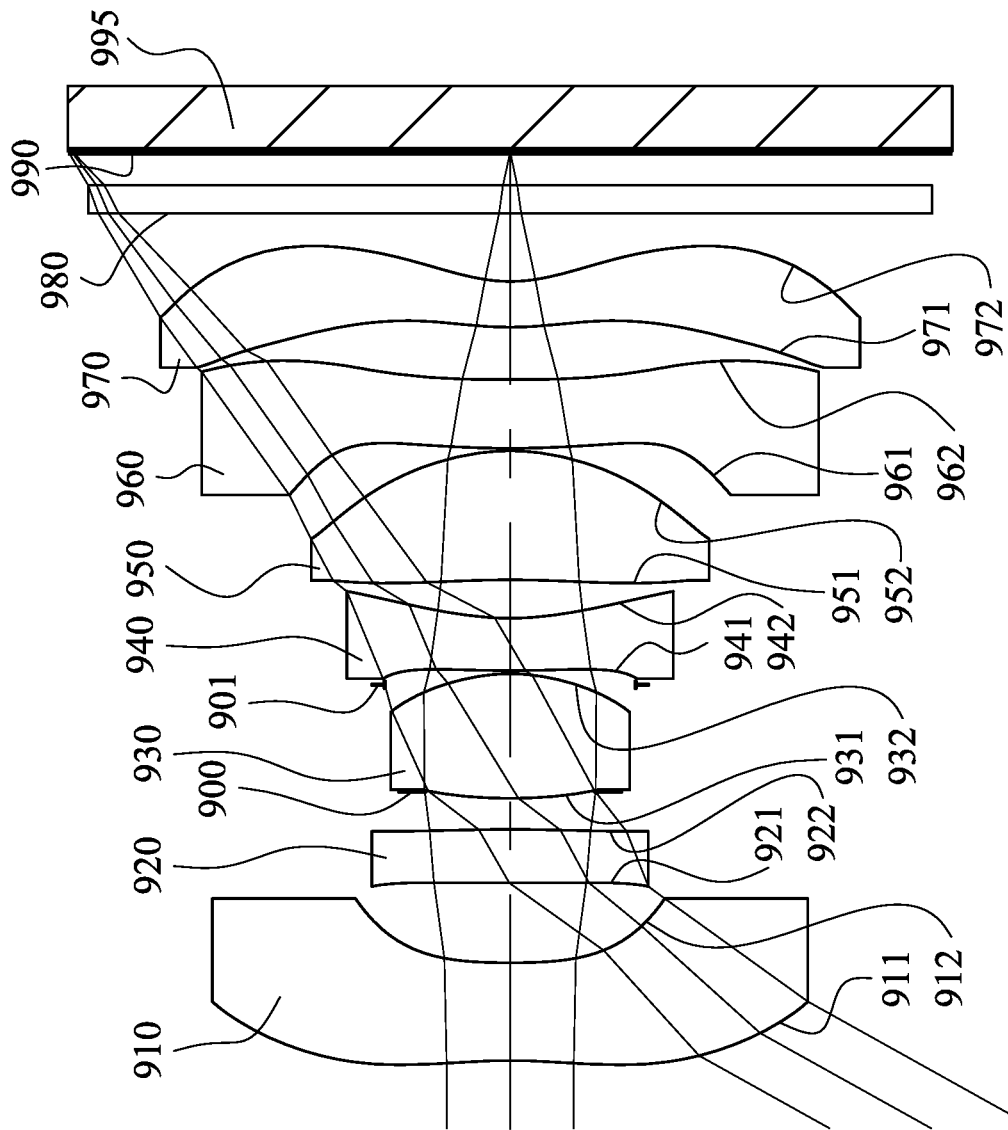
FIG. 17 is a schematic view of an imaging apparatus according to the 9th embodiment of the present disclosure.
Figure 18:
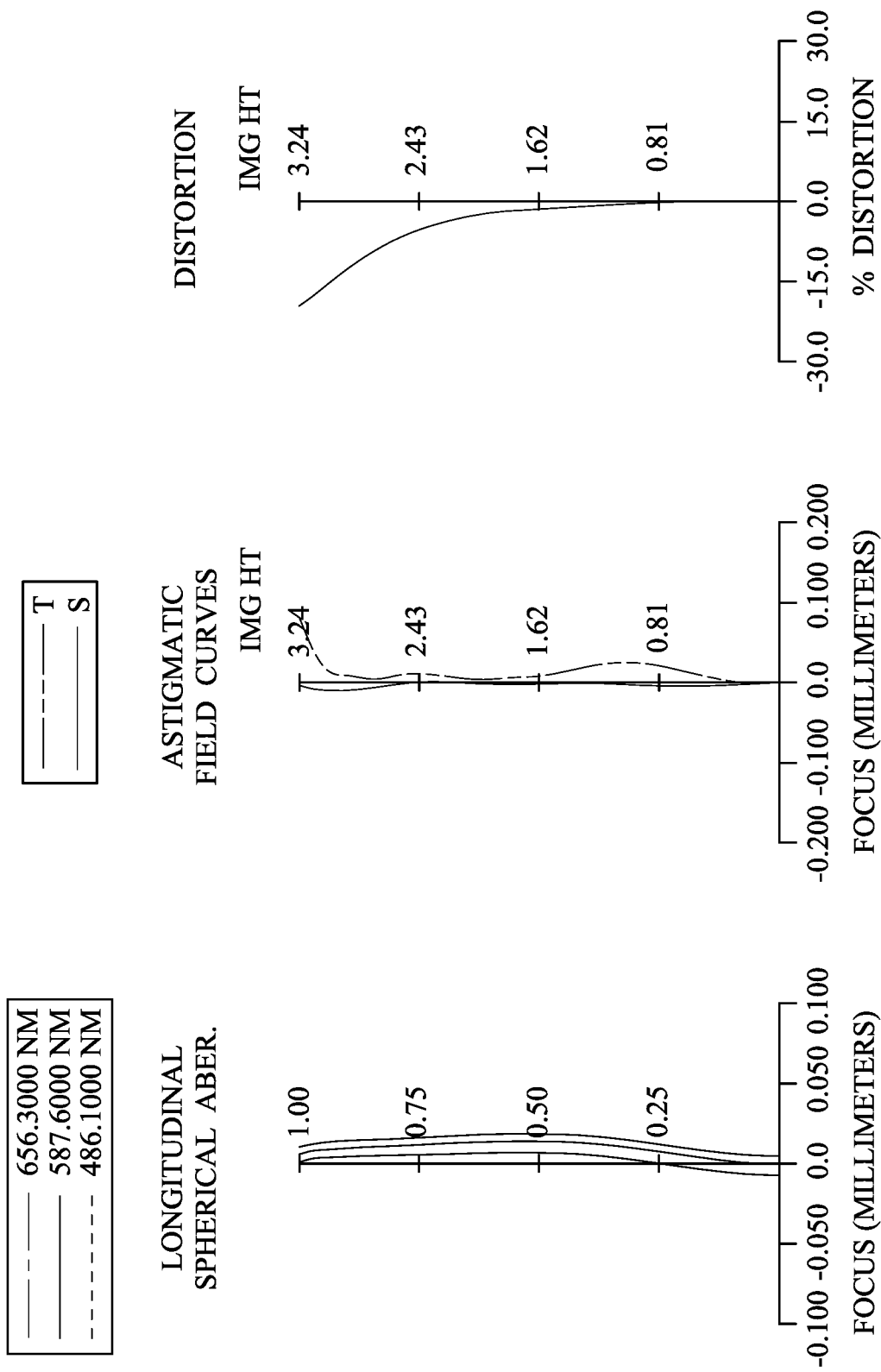
FIG. 18 shows spherical aberration curves, astigmatic field curves and a distortion curve of the imaging apparatus according to the 9th embodiment.

FIG. 17 is a schematic view of an imaging apparatus according to the 9th embodiment of the present disclosure. FIG. 18 shows spherical aberration curves, astigmatic field curves and a distortion curve of the imaging apparatus according to the 9th embodiment. In FIG. 17, the imaging apparatus includes an image capturing lens assembly (its reference numeral is omitted) and an image sensor 995. The image capturing lens assembly includes, in order from an object side to an image side along an optical path, a first lens element 910, a second lens element 920, an aperture stop 900, a third lens element 930, a stop 901, a fourth lens element 940, a fifth lens element 950, a sixth lens element 960, a seventh lens element 970, a filter 980 and an image surface 990, wherein the image sensor 995 is disposed on the image surface 990 of the image capturing lens assembly. The image capturing lens assembly includes seven lens elements (910, 920, 930, 940, 950, 960, 970) without additional one or more lens elements inserted between the first lens element 910 and the seventh lens element 970.

The first lens element 910 with negative refractive power has an object-side surface 911 being concave in a paraxial region thereof and an image-side surface 912 being concave in a paraxial region thereof. The first lens element 910 is made of a plastic material, and has the object-side surface 911 and the image-side surface 912 being both aspheric. Furthermore, the object-side surface 911 of the first lens element 910 includes one inflection point and one critical point in an off-axis region thereof.

The second lens element 920 with positive refractive power has an object-side surface 921 being concave in a paraxial region thereof and an image-side surface 922 being convex in a paraxial region thereof. The second lens element 920 is made of a plastic material, and has the object-side surface 921 and the image-side surface 922 being both aspheric. Furthermore, the object-side surface 921 of the second lens element 920 includes two inflection points and two critical points in an off-axis region thereof, and the image-side surface 922 of the second lens element 920 includes three inflection points in an off-axis region thereof.

The third lens element 930 with positive refractive power has an object-side surface 931 being convex in a paraxial region thereof and an image-side surface 932 being convex in a paraxial region thereof. The third lens element 930 is made of a plastic material, and has the object-side surface 931 and the image-side surface 932 being both aspheric.

The fourth lens element 940 with negative refractive power has an object-side surface 941 being convex in a paraxial region thereof and an image-side surface 942 being concave in a paraxial region thereof. The fourth lens element 940 is made of a plastic material, and has the object-side surface 941 and the image-side surface 942 being both aspheric. Furthermore, the object-side surface 941 of the fourth lens element 940 includes one inflection point and one critical point in an off-axis region thereof, and the image-side surface 942 of the fourth lens element 940 includes one inflection point in an off-axis region thereof.

The fifth lens element 950 with positive refractive power has an object-side surface 951 being concave in a paraxial region thereof and an image-side surface 952 being convex in a paraxial region thereof. The fifth lens element 950 is made of a plastic material, and has the object-side surface 951 and the image-side surface 952 being both aspheric. Furthermore, the object-side surface 951 of the fifth lens element 950 includes two inflection points and one critical point in an off-axis region thereof, and the image-side surface 952 of the fifth lens element 950 includes one inflection point in an off-axis region thereof.

The sixth lens element 960 with positive refractive power has an object-side surface 961 being convex in a paraxial region thereof and an image-side surface 962 being concave in a paraxial region thereof. The sixth lens element 960 is made of a plastic material, and has the object-side surface 961 and the image-side surface 962 being both aspheric. Furthermore, the object-side surface 961 of the sixth lens element 960 includes one inflection point and one critical point in an off-axis region thereof, and the image-side surface 962 of the sixth lens element 960 includes one inflection point and one critical point in an off-axis region thereof.

The seventh lens element 970 with negative refractive power has an object-side surface 971 being convex in a paraxial region thereof and an image-side surface 972 being concave in a paraxial region thereof. The seventh lens element 970 is made of a plastic material, and has the object-side surface 971 and the image-side surface 972 being both aspheric. Furthermore, the object-side surface 971 of the seventh lens element 970 includes four inflection points and one critical point in an off-axis region thereof, and the image-side surface 972 of the seventh lens element 970 includes two inflection points and one critical point in an off-axis region thereof.

The filter 980 is made of a glass material, which is located between the seventh lens element 970 and the image surface 990 in order, and will not affect the focal length of the image capturing lens assembly.

The detailed optical data of the 9th embodiment are shown in Table 17 and the aspheric surface data are shown in Table 18 below.

TABLE 17

9th Embodiment
f = 2.24 mm, Fno = 2.39, HFOV = 60.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.268 | ASP | 0.722 | Plastic | 1.545 | 56.1 | −4.29 |
| 2 | | 5.466 | ASP | 0.590 | | | | |
| 3 | Lens 2 | −202.840 | ASP | 0.396 | Plastic | 1.639 | 23.5 | 14.02 |
| 4 | | −8.581 | ASP | 0.276 | | | | |
| 5 | Ape. Stop | Plano | | −0.047 | | | | |
| 6 | Lens 3 | 4.239 | ASP | 0.919 | Plastic | 1.544 | 56.0 | 2.06 |
| 7 | | −1.409 | ASP | −0.082 | | | | |
| 8 | Stop | Plano | | 0.105 | | | | |
| 9 | Lens 4 | 7.661 | ASP | 0.387 | Plastic | 1.650 | 21.8 | −4.61 |
| 10 | | 2.110 | ASP | 0.284 | | | | |
| 11 | Lens 5 | −6.947 | ASP | 0.952 | Plastic | 1.544 | 56.0 | 3.66 |
| 12 | | −1.624 | ASP | 0.020 | | | | |
| 13 | Lens 6 | 10.379 | ASP | 0.506 | Plastic | 1.639 | 23.5 | 33.78 |
| 14 | | 19.626 | ASP | 0.387 | | | | |
| 15 | Lens 7 | 2.554 | ASP | 0.338 | Plastic | 1.679 | 18.4 | −3.47 |
| 16 | | 1.160 | ASP | 0.500 | | | | |
| 19 | Filter | Plano | | 0.210 | Glass | 1.517 | 64.2 | — |
| 20 | | Plano | | 0.251 | | | | |
| 21 | Image | Plano | | — | | | | |

Reference wavelength is 587.6 nm (d-line).
Effective radius of Surface 8 (stop 901) is 0.925 mm

TABLE 18

Aspheric Coefficients

| Surface # | 1 | 2 | 3 | 4 | 6 | 7 |
|---|---|---|---|---|---|---|
| k = | −4.7472E+01 | 0.0000E+00 | 0.0000E+00 | 0.0000E+00 | 0.0000E+00 | −2.4007E+00 |
| A4 = | 7.9608E−02 | 2.4903E−01 | 2.8198E−02 | 9.7950E−02 | 1.0484E−01 | 5.1560E−02 |
| A6 = | −3.2984E−02 | −1.1975E−01 | −4.3799E−02 | −9.1645E−02 | −1.9270E−02 | −2.3836E−01 |
| A8 = | 1.2664E−02 | 1.2759E−01 | 1.6892E−02 | 1.0085E−01 | −3.7308E−01 | 3.4172E−01 |
| A10 = | −3.6017E−03 | −5.5963E−02 | −4.1908E−02 | −1.6569E−01 | 1.2199E+00 | −4.7288E−01 |
| A12 = | 6.6566E−04 | 8.7349E−03 | 2.0741E−02 | 1.0653E−01 | −2.1570E+00 | 3.7306E−01 |
| A14 = | −7.0945E−05 | −4.2727E−04 | | | 1.4435E+00 | −1.7755E−01 |
| A16 = | 3.4222E−06 | | | | | |

| Surface # | 9 | 10 | 11 | 12 | 13 | 14 |
|---|---|---|---|---|---|---|
| k = | 0.0000E+00 | 0.0000E+00 | 0.0000E+00 | −1.0000E+00 | −1.0000E+00 | 0.0000E+00 |
| A4 = | −1.0649E−01 | −1.9702E−01 | 6.8003E−02 | 9.4249E−02 | 7.0526E−02 | 5.5877E−02 |
| A6 = | 7.8469E−02 | 3.0742E−01 | −5.8659E−02 | −2.0175E−01 | −1.5336E−01 | 7.5656E−03 |
| A8 = | −4.2223E−01 | −5.2559E−01 | 1.6943E−01 | 2.0739E−01 | 1.3636E−01 | −4.0349E−02 |
| A10 = | 9.3510E−01 | 6.4256E−01 | −3.2554E−01 | −1.0999E−01 | −1.1439E−01 | 2.3291E−02 |
| A12 = | −1.3167E+00 | −5.1605E−01 | 3.3451E−01 | 1.9769E−02 | 7.5994E−02 | −6.4679E−03 |
| A14 = | 9.9451E−01 | 2.5684E−01 | −1.8789E−01 | 4.0574E−03 | −3.8652E−02 | 9.8070E−04 |
| A16 = | −3.4499E−01 | −7.2054E−02 | 5.5151E−02 | −1.4230E−03 | 1.2901E−02 | −8.0467E−05 |
| A18 = | | 8.6807E−03 | −6.7028E−03 | 3.9560E−05 | −2.3052E−03 | 3.3997E−06 |
| A20 = | | | | | 1.6074E−04 | −7.4814E−08 |

| Surface # | 15 | 16 |
|---|---|---|
| k = | 0.0000E+00 | −1.0000E+00 |
| A4 = | −2.5342E−01 | −3.6685E−01 |
| A6 = | 6.4947E−02 | 2.3446E−01 |
| A8 = | 7.3758E−02 | −1.1626E−01 |
| A10 = | −8.4368E−02 | 4.2921E−02 |
| A12 = | 3.9819E−02 | −1.1629E−02 |
| A14 = | −1.0432E−02 | 2.1937E−03 |
| A16 = | 1.5685E−03 | −2.6634E−04 |
| A18 = | −1.2649E−04 | 1.8415E−05 |
| A20 = | 4.2366E−06 | −5.4589E−07 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 2.24 | f/f1 | −0.52 |
| Fno | 2.39 | \|f/f2\| | 0.16 |
| HFOV [deg.] | 60.9 | f/f3 | 1.09 |
| (V1 + V3 + V5)/(V2 + V4 + V6 + V7) | 1.93 | \|f/f4\| | 0.49 |
| V1/V2 | 2.39 | f/f5 | 0.61 |
| V6 | 23.5 | \|f/f6\| | 0.07 |
| V6 + V7 | 41.9 | f/f7 | −0.65 |
| ΣCT/ΣAT | 2.75 | f/f67 | −0.55 |
| (CT1 + CT2)/T12 | 1.89 | f/R1 | −0.53 |
| (CT1 + CT3 + CT5)/CT7 | 7.67 | f/R14 | 1.93 |
| CT3/CT7 | 2.72 | f1/f7 | 1.24 |
| (CT6 + CT7)/CT1 | 1.17 | f3/f5 | 0.56 |
| TD/EPD | 6.13 | \|f6/f3\| | 16.38 |
| TL/f | 2.99 | Y11/Y72 | 0.85 |
| TL/ImgH | 2.07 | Yc11/Y11 | 0.36 |
| (R5 − R6)/(R5 + R6) | 2.00 | Yc72/Y72 | 0.56 |
| R13/R14 | 2.20 | | |

10th Embodiment

Figure 19:
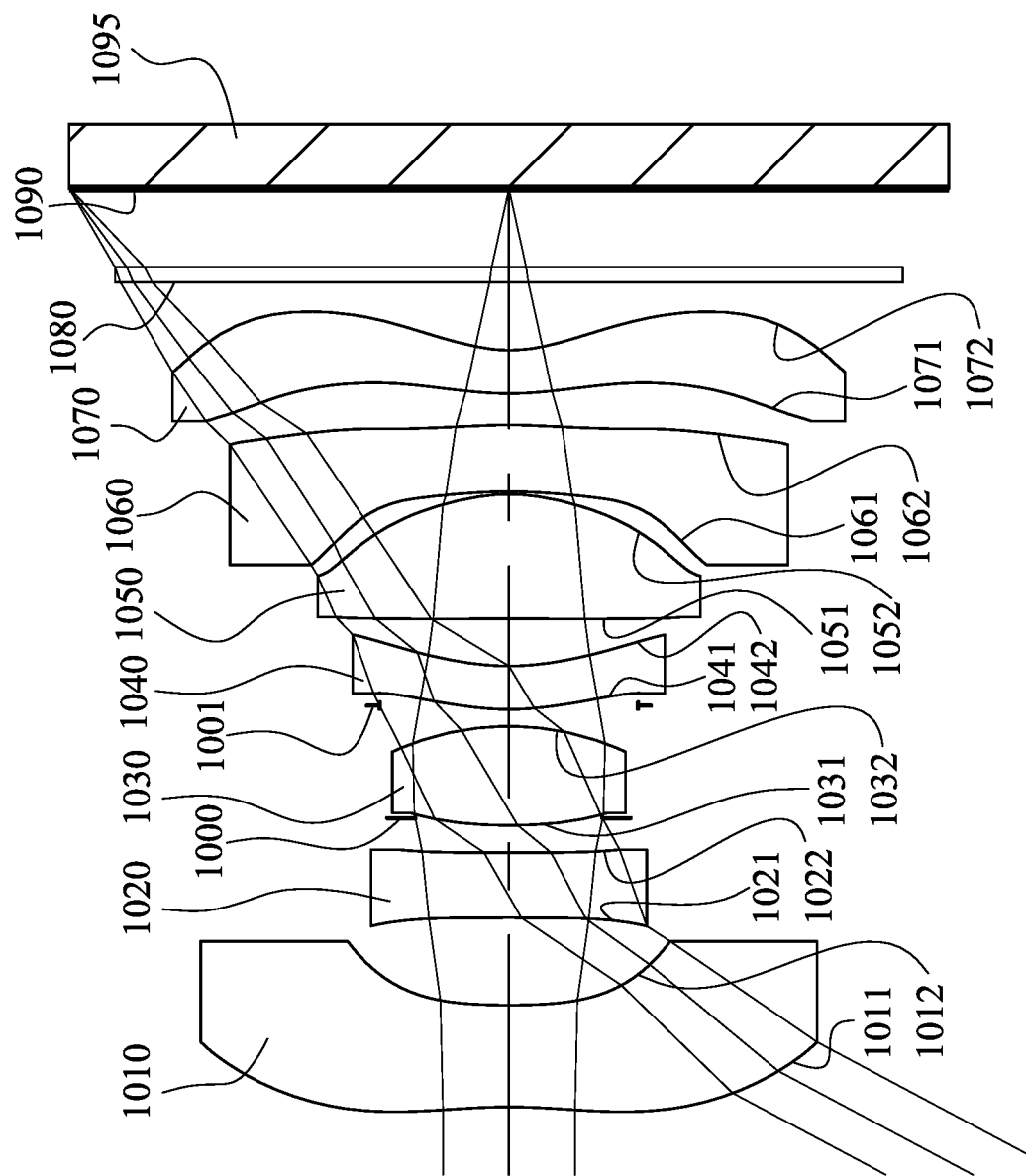
FIG. 19 is a schematic view of an imaging apparatus according to the 10th embodiment of the present disclosure.
Figure 20:
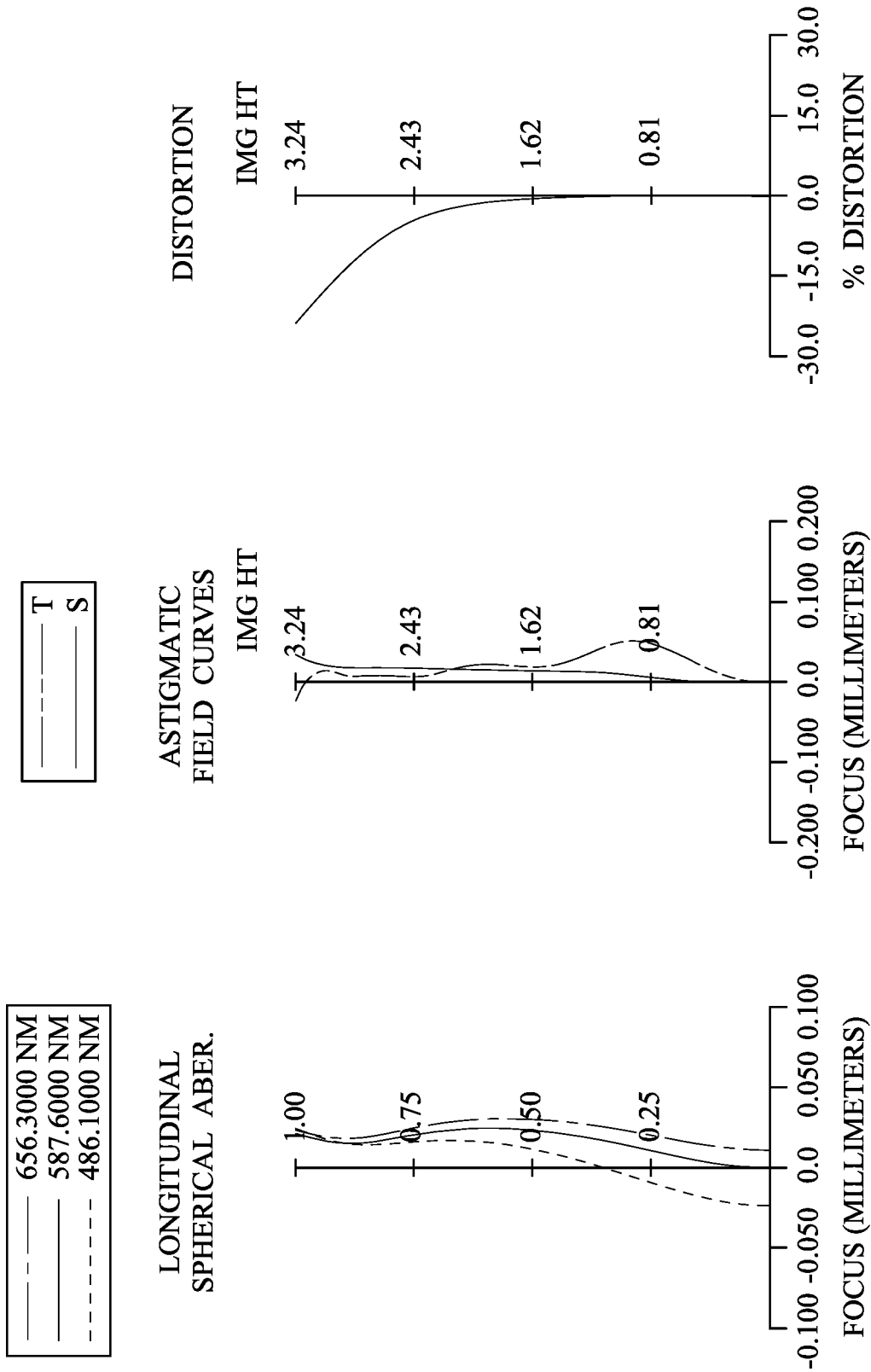
FIG. 20 shows spherical aberration curves, astigmatic field curves and a distortion curve of the imaging apparatus according to the 10th embodiment.

FIG. 19 is a schematic view of an imaging apparatus according to the 10th embodiment of the present disclosure. FIG. 20 shows spherical aberration curves, astigmatic field curves and a distortion curve of the imaging apparatus according to the 10th embodiment. In FIG. 19, the imaging apparatus includes an image capturing lens assembly (its reference numeral is omitted) and an image sensor 1095. The image capturing lens assembly includes, in order from an object side to an image side along an optical path, a first lens element 1010, a second lens element 1020, an aperture stop 1000, a third lens element 1030, a stop 1001, a fourth lens element 1040, a fifth lens element 1050, a sixth lens element 1060, a seventh lens element 1070, a filter 1080 and an image surface 1090, wherein the image sensor 1095 is disposed on the image surface 1090 of the image capturing lens assembly. The image capturing lens assembly includes seven lens elements (1010, 1020, 1030, 1040, 1050, 1060, 1070) without additional one or more lens elements inserted between the first lens element 1010 and the seventh lens element 1070.

The first lens element 1010 with negative refractive power has an object-side surface 1011 being concave in a paraxial region thereof and an image-side surface 1012 being concave in a paraxial region thereof. The first lens element 1010 is made of a plastic material, and has the object-side surface 1011 and the image-side surface 1012 being both aspheric. Furthermore, the object-side surface 1011 of the first lens element 1010 includes one inflection point and one critical point in an off-axis region thereof.

The second lens element 1020 with negative refractive power has an object-side surface 1021 being concave in a paraxial region thereof and an image-side surface 1022 being convex in a paraxial region thereof. The second lens element 1020 is made of a plastic material, and has the object-side surface 1021 and the image-side surface 1022 being both aspheric. Furthermore, the image-side surface 1022 of the second lens element 1020 includes one inflection point and one critical point in an off-axis region thereof.

The third lens element 1030 with positive refractive power has an object-side surface 1031 being convex in a paraxial region thereof and an image-side surface 1032 being convex in a paraxial region thereof. The third lens element 1030 is made of a plastic material, and has the object-side surface 1031 and the image-side surface 1032 being both aspheric.

The fourth lens element 1040 with positive refractive power has an object-side surface 1041 being convex in a paraxial region thereof and an image-side surface 1042 being concave in a paraxial region thereof. The fourth lens element 1040 is made of a plastic material, and has the object-side surface 1041 and the image-side surface 1042 being both aspheric. Furthermore, the object-side surface 1041 of the fourth lens element 1040 includes one inflection point and one critical point in an off-axis region thereof, and the image-side surface 1042 of the fourth lens element 1040 includes one inflection point in an off-axis region thereof.

The fifth lens element 1050 with positive refractive power has an object-side surface 1051 being concave in a paraxial region thereof and an image-side surface 1052 being convex in a paraxial region thereof. The fifth lens element 1050 is made of a plastic material, and has the object-side surface 1051 and the image-side surface 1052 being both aspheric. Furthermore, the object-side surface 1051 of the fifth lens element 1050 includes three inflection points and one critical point in an off-axis region thereof, and the image-side surface 1052 of the fifth lens element 1050 includes one inflection point in an off-axis region thereof.

The sixth lens element 1060 with negative refractive power has an object-side surface 1061 being concave in a paraxial region thereof and an image-side surface 1062 being convex in a paraxial region thereof. The sixth lens element 1060 is made of a plastic material, and has the object-side surface 1061 and the image-side surface 1062 being both aspheric. Furthermore, the object-side surface 1061 of the sixth lens element 1060 includes one inflection point in an off-axis region thereof, and the image-side surface 1062 of the sixth lens element 1060 includes four inflection points and two critical points in an off-axis region thereof.

The seventh lens element 1070 with negative refractive power has an object-side surface 1071 being convex in a paraxial region thereof and an image-side surface 1072 being concave in a paraxial region thereof. The seventh lens element 1070 is made of a plastic material, and has the object-side surface 1071 and the image-side surface 1072 being both aspheric. Furthermore, the object-side surface 1071 of the seventh lens element 1070 includes three inflection points and one critical point in an off-axis region thereof, and the image-side surface 1072 of the seventh lens element 1070 includes two inflection points and one critical point in an off-axis region thereof.

The filter 1080 is made of a glass material, which is located between the seventh lens element 1070 and the image surface 1090 in order, and will not affect the focal length of the image capturing lens assembly.

The detailed optical data of the 10th embodiment are shown in Table 19 and the aspheric surface data are shown in Table 20 below.

TABLE 19

10th Embodiment
f = 2.26 mm, Fno = 2.32, HFOV = 61.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.067 | ASP | 0.750 | Plastic | 1.545 | 56.1 | −4.34 |
| 2 | | 6.022 | ASP | 0.643 | | | | |
| 3 | Lens 2 | −41.754 | ASP | 0.480 | Plastic | 1.669 | 19.5 | −133.56 |
| 4 | | −78.740 | ASP | 0.253 | | | | |
| 5 | Ape. Stop | Plano | | −0.053 | | | | |
| 6 | Lens 3 | 3.901 | ASP | 0.728 | Plastic | 1.544 | 56.0 | 2.86 |
| 7 | | −2.412 | ASP | 0.153 | | | | |
| 8 | Stop | Plano | | −0.027 | | | | |
| 9 | Lens 4 | 1.929 | ASP | 0.320 | Plastic | 1.660 | 20.4 | 45.64 |
| 10 | | 1.925 | ASP | 0.349 | | | | |
| 11 | Lens 5 | −20.182 | ASP | 0.915 | Plastic | 1.544 | 56.0 | 2.70 |
| 12 | | −1.389 | ASP | 0.020 | | | | |
| 13 | Lens 6 | −3.486 | ASP | 0.491 | Plastic | 1.660 | 20.4 | −33.30 |
| 14 | | −4.375 | ASP | 0.231 | | | | |
| 15 | Lens 7 | 2.584 | ASP | 0.320 | Plastic | 1.669 | 19.5 | −3.23 |
| 16 | | 1.118 | ASP | 0.500 | | | | |
| 19 | Filter | Plano | | 0.110 | Glass | 1.517 | 64.2 | — |
| 20 | | Plano | | 0.578 | | | | |
| 21 | Image | Plano | | — | | | | |

Reference wavelength is 587.6 nm (d-line).
Effective radius of Surface 8 (stop 1001) is 0.950 mm

TABLE 20

Aspheric Coefficients

| Surface # | 1 | 2 | 3 | 4 | 6 | 7 |
|---|---|---|---|---|---|---|
| k = | −3.8442E+01 | 0.0000E+00 | 0.0000E+00 | 0.0000E+00 | 0.0000E+00 | −7.5320E−01 |
| A4 = | 8.0384E−02 | 2.3470E−01 | −2.0657E−02 | 6.6822E−02 | 1.0367E−01 | −2.4272E−01 |
| A6 = | −3.4212E−02 | −1.2474E−01 | −2.7681E−02 | −4.7037E−02 | −4.4431E−02 | 7.4806E−01 |
| A8 = | 1.3058E−02 | 1.1355E−01 | −6.0006E−03 | 8.5985E−02 | 4.1370E−02 | −1.5906E+00 |
| A10 = | −3.5537E−03 | −4.8638E−02 | 1.4283E−02 | −7.6963E−02 | 2.0506E−02 | 2.1637E+00 |
| A12 = | 6.2692E−04 | 7.6263E−03 | −6.8026E−03 | 3.4036E−02 | −1.6987E−01 | −1.6385E+00 |
| A14 = | −6.4259E−05 | −3.8094E−04 | | | 1.5440E−01 | 5.1512E−01 |
| A16 = | 2.9578E−06 | | | | | |

| Surface # | 9 | 10 | 11 | 12 | 13 | 14 |
|---|---|---|---|---|---|---|
| k = | 0.0000E+00 | 0.0000E+00 | 0.0000E+00 | −1.0000E+00 | −1.0000E+00 | 0.0000E+00 |
| A4 = | −3.2660E−01 | −1.2301E−01 | 3.9658E−02 | 2.2370E−01 | 1.6517E−01 | 1.6094E−01 |
| A6 = | 6.4586E−01 | 1.4647E−02 | 6.8320E−02 | −3.0429E−01 | −2.0703E−01 | −6.8722E−02 |
| A8 = | −1.3355E+00 | 1.9586E−01 | −3.1722E−01 | 2.8644E−01 | 5.5360E−02 | −3.1753E−02 |
| A10 = | 2.0274E+00 | −5.0569E−01 | 6.0554E−01 | −3.8909E−01 | −4.0693E−02 | 4.0470E−02 |
| A12 = | −2.0865E+00 | 6.5176E−01 | −7.0262E−01 | 4.5320E−01 | 2.4454E−02 | −1.6110E−02 |
| A14 = | 1.2578E+00 | −4.6743E−01 | 4.7730E−01 | −3.0899E−01 | 6.9141E−03 | 3.0926E−03 |
| A16 = | −3.4435E−01 | 1.7191E−01 | −1.7003E−01 | 1.0846E−01 | −8.5196E−03 | −2.3765E−04 |
| A18 = | | −2.5284E−02 | 2.4394E−02 | −1.5027E−02 | 2.1536E−03 | −7.2772E−06 |
| A20 = | | | | | −1.7356E−04 | 1.5885E−06 |

| Surface # | 15 | 16 |
|---|---|---|
| k = | 0.0000E+00 | −1.0000E+00 |
| A4 = | −1.3213E−01 | −3.5639E−01 |
| A6 = | −5.7316E−02 | 2.1739E−01 |
| A8 = | 1.3235E−01 | −1.0731E−01 |
| A10 = | −9.6754E−02 | 4.0193E−02 |
| A12 = | 3.9538E−02 | −1.1029E−02 |
| A14 = | −9.9120E−03 | 2.1057E−03 |
| A16 = | 1.5206E−03 | −2.6169E−04 |
| A18 = | −1.3134E−04 | 1.8874E−05 |
| A20 = | 4.8904E−06 | −5.9473E−07 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

10th Embodiment

| | | | |
|---|---|---|---|
| f [mm] | 2.26 | f/f1 | −0.52 |
| Fno | 2.32 | \|f/f2\| | 0.02 |
| HFOV [deg.] | 61.9 | f/f3 | 0.79 |
| (V1 + V3 + V5)/(V2 + V4 + V6 + V7) | 2.11 | \|f/f4\| | 0.05 |
| V1/V2 | 2.88 | f/f5 | 0.84 |
| V6 | 20.4 | \|f/f6\| | 0.07 |
| V6 + V7 | 39.9 | f/f7 | −0.70 |
| ΣCT/ΣAT | 2.55 | f/f67 | −0.82 |
| (CT1 + CT2)/T12 | 1.91 | f/R1 | −0.55 |
| (CT1 + CT3 + CT5)/CT7 | 7.48 | f/R14 | 2.02 |
| CT3/CT7 | 2.28 | f1/f7 | 1.34 |
| (CT6 + CT7)/CT1 | 1.08 | f3/f5 | 1.06 |
| TD/EPD | 5.73 | \|f6/f3\| | 11.66 |
| TL/f | 3.00 | Y11/Y72 | 0.92 |
| TL/ImgH | 2.09 | Yc11/Y11 | 0.37 |
| (R5 − R6)/(R5 + R6) | 4.24 | Yc72/Y72 | 0.59 |
| R13/R14 | 2.31 | | |

11th Embodiment

Figure 22:
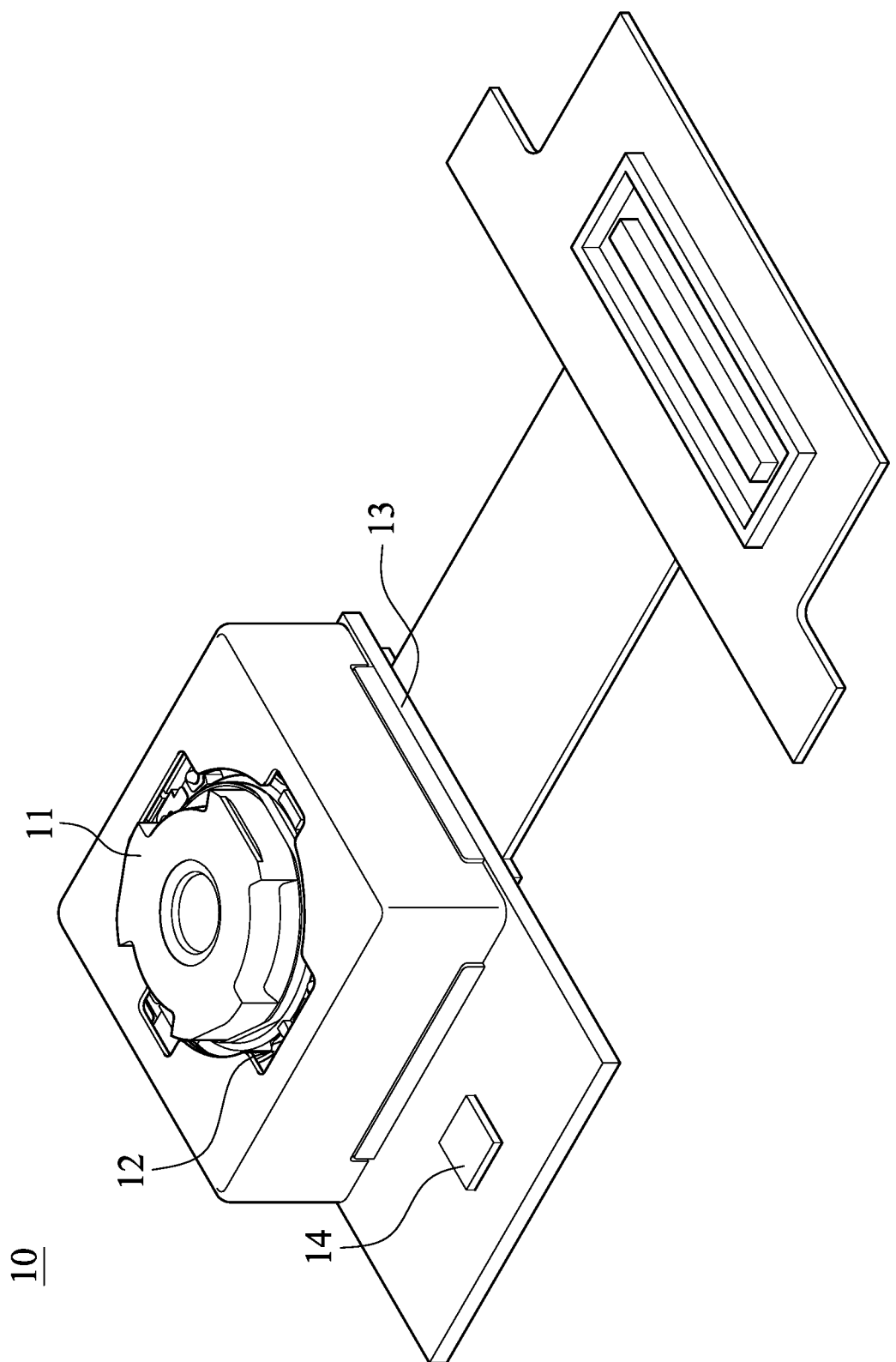
FIG. 22 is a schematic view of an imaging apparatus according to the 11th embodiment of the present disclosure.

FIG. 22 is a schematic view of an imaging apparatus 10 according to the 11th embodiment of the present disclosure. In FIG. 22, the imaging apparatus 10 of the 11th embodiment is a camera module, the imaging apparatus 10 includes an imaging lens assembly 11, a driving apparatus 12 and an image sensor 13, wherein the imaging lens assembly 11 includes the image capturing lens assembly of the present disclosure and a lens barrel (not shown in drawings) for carrying the image capturing lens assembly. The imaging apparatus 10 can focus light from an imaged object via the imaging lens assembly 11, perform image focusing by the driving apparatus 12, and generate an image on the image sensor 13, and the imaging information can be transmitted.

The driving apparatus 12 can be an auto-focus module, which can be driven by driving systems, such as voice coil motors (VCM), micro electro-mechanical systems (MEMS), piezoelectric systems, and shape memory alloys etc. The image capturing lens assembly can obtain a favorable imaging position by the driving apparatus 12 so as to capture clear images when the imaged object is disposed at different object distances.

The imaging apparatus 10 can include the image sensor 13 located on the image surface of the image capturing lens assembly, such as CMOS and CCD, with superior photo-sensitivity and low noise. Thus, it is favorable for providing realistic images with high definition image quality thereof.

Moreover, the imaging apparatus 10 can further include an image stabilization module 14, which can be a kinetic energy sensor, such as an accelerometer, a gyro sensor, and a Hall Effect sensor. In the 11th embodiment, the image stabilization module 14 is a gyro sensor, but is not limited thereto. Therefore, the variation of different axial directions of the image capturing lens assembly can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

12th Embodiment

Figure 23A:
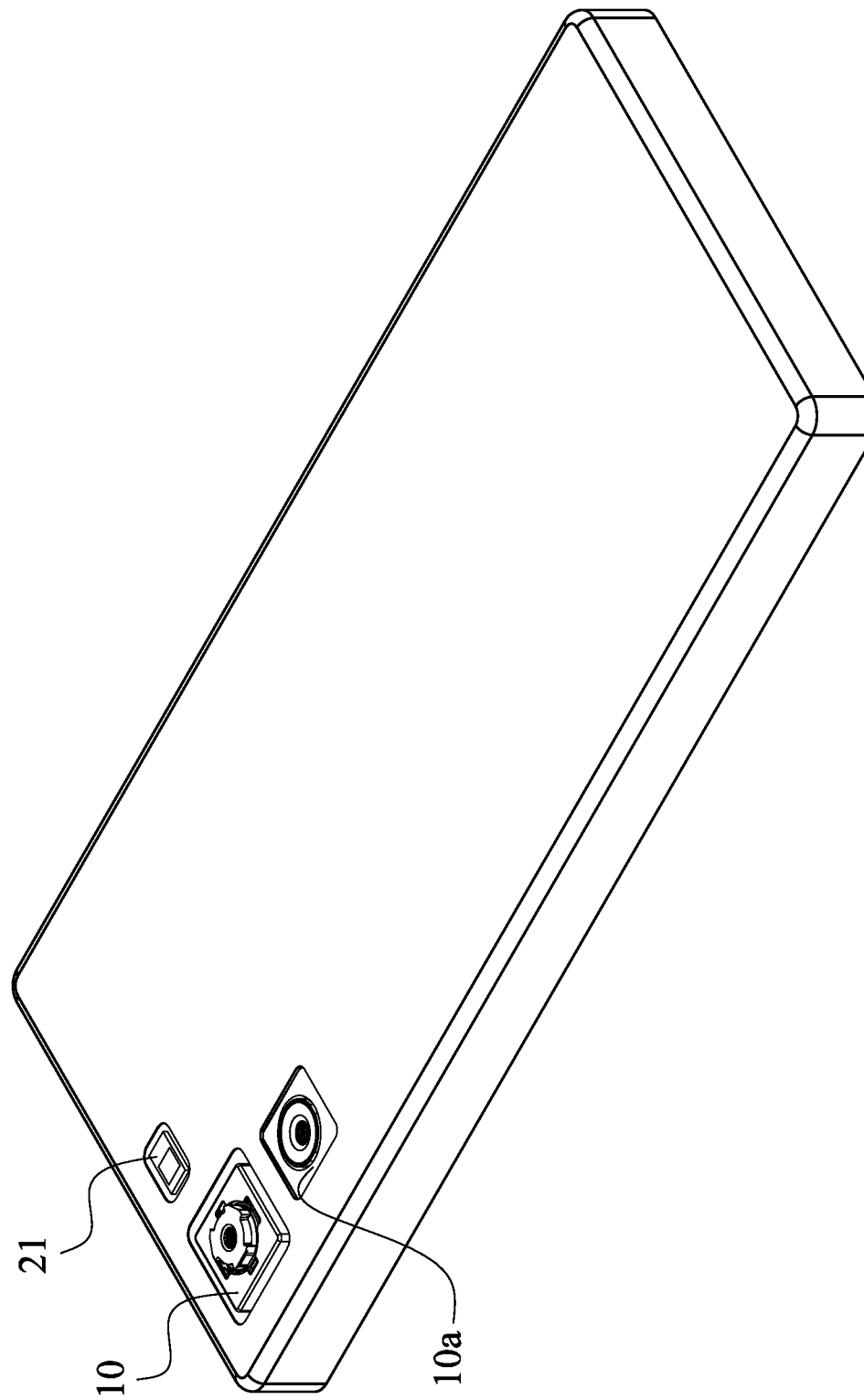
FIG. 23A is a schematic view of one side of an electronic device according to the 12th embodiment of the present disclosure.
Figure 23B:
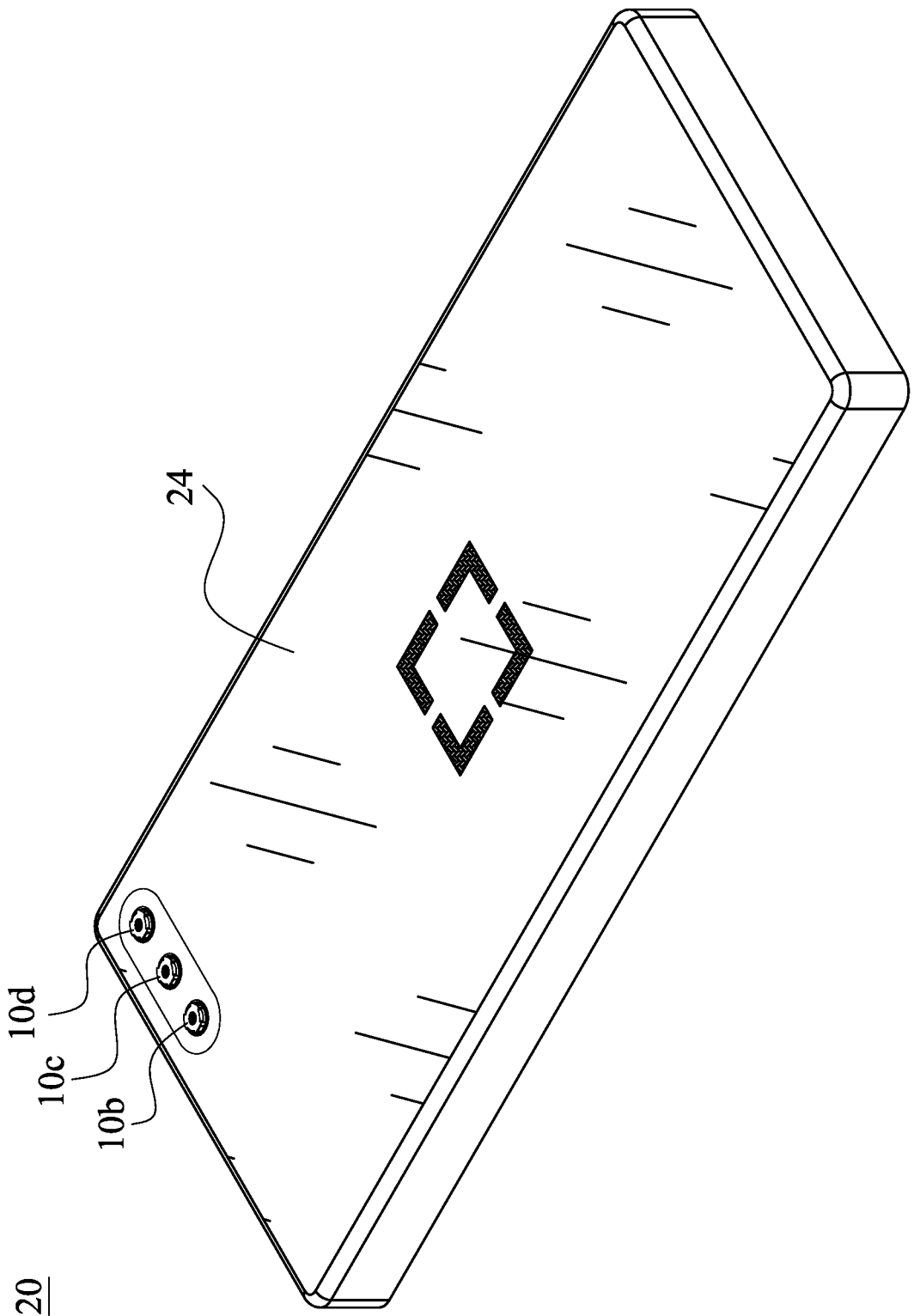
FIG. 23B is a schematic view of another side of the electronic device of FIG. 23A.
Figure 23C:
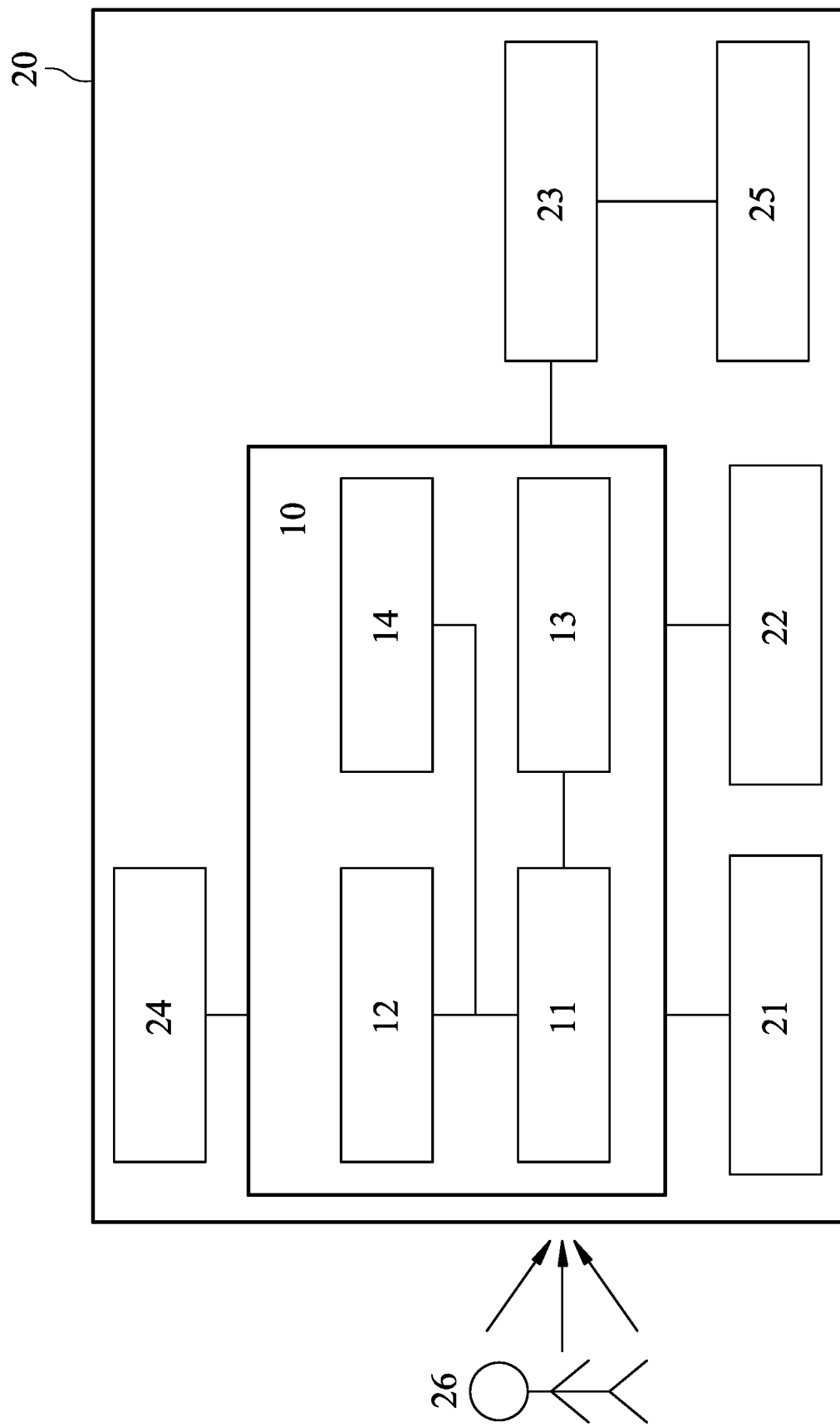
FIG. 23C is a system schematic view of the electronic device of FIG. 23A.

FIG. 23A is a schematic view of one side of an electronic device 20 according to the 12th embodiment of the present disclosure. FIG. 23B is a schematic view of another side of the electronic device 20 of FIG. 23A. FIG. 23C is a system schematic view of the electronic device 20 of FIG. 23A. In FIGS. 23A, 23B and 23C, the electronic device 20 according to the 12th embodiment is a smartphone, which include imaging apparatuses 10, 10a, 10b, 10c, 10d, a flash module 21, a focusing assisting module 22, an image signal processor (ISP) 23, a user interface 24 and an image software processor 25, wherein each of the imaging apparatuses 10b, 10c, 10d is a front camera. When the user captures images of an imaged object 26 via the user interface 24, the electronic device 20 focuses and generates an image via at least one of the imaging apparatuses 10, 10a, 10b, 10c, 10d while compensating for low illumination via the flash module 21 when necessary. Then, the electronic device 20 quickly focuses on the imaged object 26 according to its object distance information provided by the focusing assisting module 22, and optimizes the image via the image signal processor 23 and the image software processor 25. Thus, the image quality can be further enhanced. The focusing assisting module 22 can adopt conventional infrared or laser for obtaining quick focusing, and the user interface 24 can utilize a touch screen or a physical button for capturing and processing the image with various functions of the image processing software.

Each of the imaging apparatuses 10, 10a, 10b, 10c, 10d according to the 12th embodiment can include the image capturing lens assembly of the present disclosure, and can be the same or similar to the imaging apparatus 10 according to the aforementioned 11th embodiment, and will not be described again herein. In detail, according to the 12th embodiment, the imaging apparatuses 10, 10a can be wide angle imaging apparatus and ultra-wide angle imaging apparatus, respectively. The imaging apparatuses 10b, 10c, 10d can be TOF (Time-Of-Flight) module, ultra-wide angle imaging apparatus and wide angle imaging apparatus, respectively, or can be others imaging apparatuses, which will not be limited thereto. Further, the connecting relationships between each of the imaging apparatuses 10a, 10b, 10c, 10d and other elements can be the same as the imaging apparatus 10 in FIG. 23C, or can be adaptively adjusted according to the type of the imaging apparatuses, which will not be shown and detailed descripted again.

13th Embodiment

FIG. 24 is a schematic view of one side of an electronic device 30 according to the 13th embodiment of the present disclosure. According to the 13th embodiment, the electronic device 30 is a smartphone, which include imaging apparatuses 30a, 30b, 30c and a flash module 31.

The electronic device 30 according to the 13th embodiment can include the same or similar elements to that according to the 12th embodiment, and each of the imaging apparatuses 30a, 30b, 30c and the flash module 31 according to the 13th embodiment can have a configuration which is the same or similar to that according to the 12th embodiment, and will not be described again herein. In detail, according to the 13th embodiment, each of the imaging apparatuses 30a, 30b, 30c can include the image capturing lens assembly of the present disclosure, and can be the same or similar to the imaging apparatus 10 according to the aforementioned 11th embodiment, and will not be described again herein. In detail, the imaging apparatuses 30a, 30b, 30c can be ultra-wide angle imaging apparatus, wide angle imaging apparatus and telephoto imaging apparatus (which can include light path folding element), respectively, or can be adaptively adjusted according to the type of the imaging apparatuses, which will not be limited to the arrangement.

14th Embodiment

Figure 25:
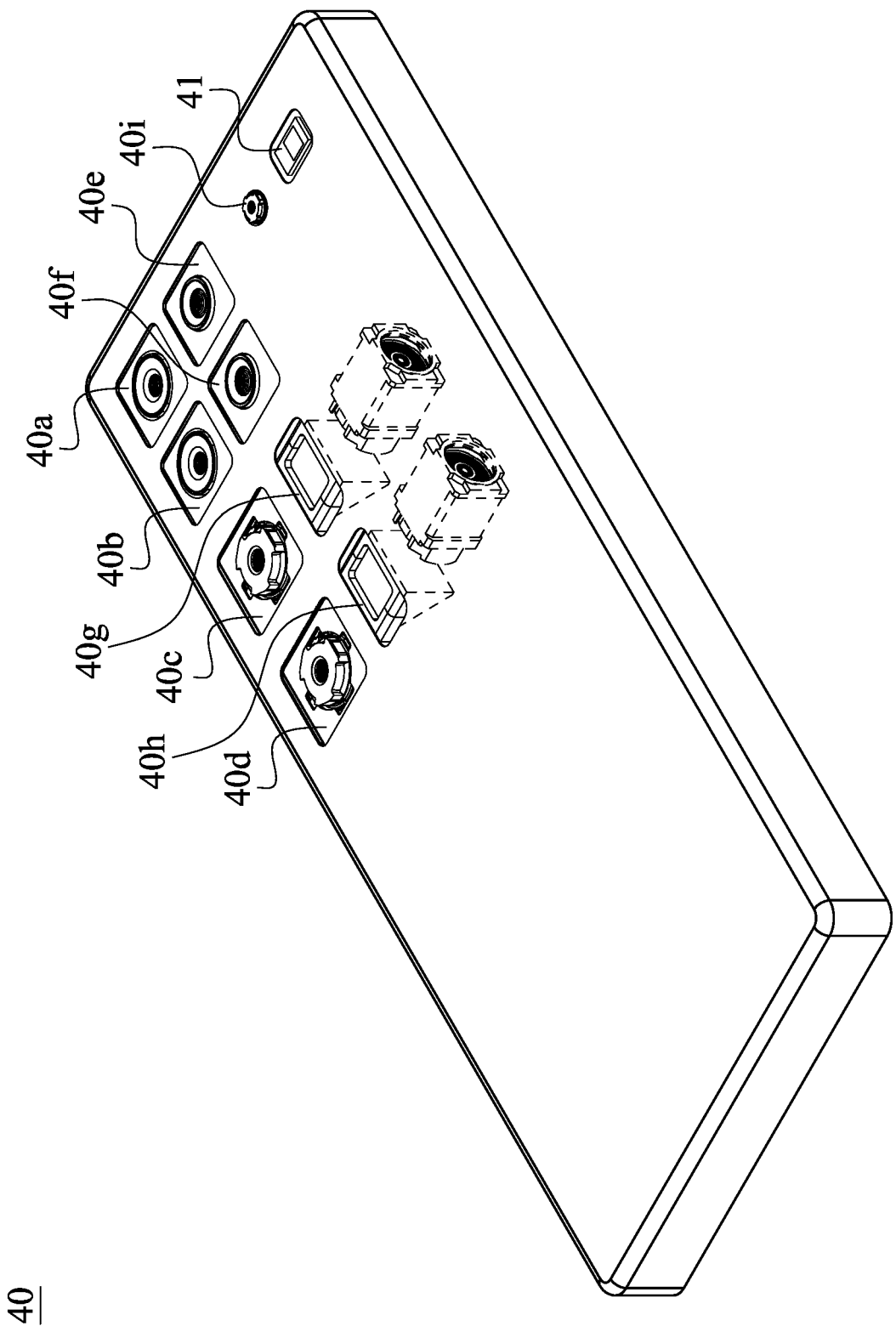
FIG. 25 is a schematic view of one side of an electronic device according to the 14th embodiment of the present disclosure.

FIG. 25 is a schematic view of one side of an electronic device 40 according to the 14th embodiment of the present disclosure. According to the 14th embodiment, the electronic device 40 is a smartphone, which include imaging apparatuses 40a, 40b, 40c, 40d, 40e, 40f, 40g, 40h, 40i and a flash module 41.

The electronic device 40 according to the 14th embodiment can include the same or similar elements to that according to the 11th embodiment, and each of the imaging apparatuses 40a, 40b, 40c, 40d, 40e, 40f, 40g, 40h, 40i and the flash module 41 can have a configuration which is the same or similar to that according to the 12th embodiment, and will not be described again herein. In detail, according to the 14th embodiment, each of the imaging apparatuses 40a, 40b, 40c, 40d, 40e, 40f, 40g, 40h, 40i can include the image capturing lens assembly of the present disclosure, and can be the same or similar to the imaging apparatus 10 according to the aforementioned 11th embodiment, and will not be described again herein. In detail, each of the imaging apparatuses 40a, 40b can be ultra-wide angle imaging apparatus, each of the imaging apparatuses 40c, 40d can be wide angle imaging apparatus, each of the imaging apparatuses 40e, 40f can be telephoto imaging apparatus, each of the imaging apparatuses 40g, 40h can be telephoto imaging apparatus (which can include light path folding element), the imaging apparatus 40i can be TOF module, or can be adaptively adjusted according to the type of the imaging apparatuses, which will not be limited to the arrangement.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing lens assembly comprising seven lens elements, the seven lens elements being, in order from an object side to an image side along an optical path:
    a first lens element, a second lens element, a third lens element, a fourth lens element, a fifth lens element, a sixth lens element and a seventh lens element, each of the seven lens elements has an object-side surface towards the object side and an image-side surface towards the image side;
    wherein the first lens element has negative refractive power; the third lens element has positive refractive power; the fourth lens element has the image-side surface being concave in a paraxial region thereof, the fifth lens element has positive refractive power; the seventh lens element with negative refractive power has the object-side surface being convex in a paraxial region thereof and the image-side surface being concave in a paraxial region thereof; at least one of the object-side surface and the image-side surface of at least one of the seven lens elements is aspheric and comprises at least one inflection point;
    wherein a half of a maximum field of view of the image capturing lens assembly is HFOV, a focal length of the third lens element is f3, a focal length of the sixth lens element is f6, a central thickness of the third lens element is CT3, a central thickness of the seventh lens element is CT7, an Abbe number of the first lens element is V1, an Abbe number of the second lens element is V2, and the following conditions are satisfied:

52.5 degrees<HFOV<80.0 degrees;

2.30<|f6/f3|;

1.50<CT3/CT7<5.00; and 1.98≤V1/V2<4.0.

2. The image capturing lens assembly of claim 1, wherein the central thickness of the third lens element is CT3, the central thickness of the seventh lens element is CT7, and the following condition is satisfied:

1.75<CT3/CT7<4.00.

3. The image capturing lens assembly of claim 1, wherein the focal length of the third lens element is f3, the focal length of the sixth lens element is f6, and the following condition is satisfied:

4.50<|f6/f3|.

4. The image capturing lens assembly of claim 1, wherein the Abbe number of the first lens element is V1, the Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, a maximum distance between an optical effective region of the object-side surface of the first lens element and an optical axis is Y11, a maximum distance between an optical effective region of the image-side surface of the seventh lens element and the optical axis is Y72, and the following conditions are satisfied:

1.40<(V1+V3+V5)/(V2+V4+V6+V7)<3.00; and 0.50<Y11/Y72<1.35.

5. The image capturing lens assembly of claim 1, wherein a central thickness of the first lens element is CT1, a central thickness of the second lens element is CT2, an axial distance between the first lens element and the second lens element is T12, and the following condition is satisfied:

1.2<(CT1+CT2)/T12<2.7.

6. The image capturing lens assembly of claim 1, wherein the first lens element has the object-side surface being concave in a paraxial region thereof and the image-side surface being concave in a paraxial region thereof, a focal length of the image capturing lens assembly is f, a curvature radius of the object-side surface of the first lens element is R1, and the following condition is satisfied:

−1.2<f/R1<−0.30.

7. The image capturing lens assembly of claim 1, wherein the first lens element has the object-side surface being concave in a paraxial region thereof; the third lens element has the object-side surface being convex in a paraxial region thereof; a curvature radius of the object-side surface of the third lens element is R5, a curvature radius of the image-side surface of the third lens element is R6, and the following condition is satisfied:

$$1.65 < (R5-R6)/(R5+R6) < 5.20.$$

8. The image capturing lens assembly of claim 1, wherein the object-side surface of the seventh lens element comprises at least one critical point in an off-axis region thereof, a focal length of the image capturing lens assembly is f, a composite focal length of the sixth lens element and the seventh lens element is f67, and the following condition is satisfied:

$$-0.90 < f/f67 < -0.23.$$

9. The image capturing lens assembly of claim 1, wherein at least one of the object-side surface and the image-side surface of at least one of the seven lens elements comprises at least one critical point in an off-axis region thereof, an axial distance between the object-side surface of the first lens element and the image-side surface of the seventh lens element is TD, an entrance pupil diameter of the image capturing lens assembly is EPD, a sum of central thicknesses of all lens elements of the image capturing lens assembly is ΣCT, a sum of all axial distances between adjacent lens elements of the image capturing lens assembly is ΣAT, and the following conditions are satisfied:

$$3.0 < TD/EPD < 9.0; \text{ and}$$

$$2.2 < \Sigma CT/\Sigma AT < 3.6.$$

10. An imaging apparatus, comprising:
the image capturing lens assembly of claim 1; and
an image sensor disposed on an image surface of the image capturing lens assembly.

11. An electronic device, comprising:
the imaging apparatus of claim 10.

12. An image capturing lens assembly comprising seven lens elements, the seven lens elements being, in order from an object side to an image side along an optical path:
a first lens element, a second lens element, a third lens element, a fourth lens element, a fifth lens element, a sixth lens element and a seventh lens element, each of the seven lens elements has an object-side surface towards the object side and an image-side surface towards the image side;
wherein the first lens element with negative refractive power has the object-side surface being concave in a paraxial region thereof; the third lens element with positive refractive power has the object-side surface being convex in a paraxial region thereof, the fourth lens element has the image-side surface being concave in a paraxial region thereof, the fifth lens element with positive refractive power has the image-side surface being convex in a paraxial region thereof, the seventh lens element with negative refractive power has the object-side surface being convex in a paraxial region thereof and the image-side surface being concave in a paraxial region thereof, the image-side surface of the seventh lens element comprises at least one critical point in an off-axis region thereof; at least one of the object-side surface and the image-side surface of at least one of the seven lens elements is aspheric and comprises at least one inflection point;
wherein a half of a maximum field of view of the image capturing lens assembly is HFOV, a central thickness of the first lens element is CT1, a central thickness of the third lens element is CT3, a central thickness of the fifth lens element is CT5, a central thickness of the seventh lens element is CT7, a focal length of the image capturing lens assembly is f, a curvature radius of the object-side surface of the first lens element is R1, a distance between the at least one critical point of the image-side surface of the seventh lens element and an optical axis is Yc72, a maximum distance between an optical effective region of the image-side surface of the seventh lens element and the optical axis is Y72, and the following conditions are satisfied:

$$42.5 \text{ degrees} < HFOV;$$

$$5.0 < (CT1+CT3+CT5)/CT7;$$

$$-1.2 < f/R1 < -0.30; \text{ and}$$

$$0.40 < Yc72/Y72 < 0.70.$$

13. The image capturing lens assembly of claim 12, wherein the half of the maximum field of view of the image capturing lens assembly is HFOV, the central thickness of the first lens element is CT1, the central thickness of the third lens element is CT3, the central thickness of the fifth lens element is CT5, the central thickness of the seventh lens element is CT7, and the following conditions are satisfied:

$$52.5 \text{ degrees} < HFOV < 80.0 \text{ degrees; and}$$

$$5.6 < (CT1+CT3+CT5)/CT7 < 20.0.$$

14. The image capturing lens assembly of claim 12, wherein an Abbe number of the sixth lens element is V6, and the following condition is satisfied:

$$10.0 < V6 < 33.0.$$

15. The image capturing lens assembly of claim 12, wherein the central thickness of the first lens element is CT1, a central thickness of the second lens element is CT2, an axial distance between the first lens element and the second lens element is T12, and the following condition is satisfied:

$$1.2 < (CT1+CT2)/T12 < 2.7.$$

16. The image capturing lens assembly of claim 12, wherein at least one of the object-side surface and the image-side surface of each of at least two of the seven lens elements is aspheric and comprises at least one inflection point; a curvature radius of the object-side surface of the seventh lens element is R13, a curvature radius of the image-side surface of the seventh lens element is R14, a focal length of the first lens element is f1, a focal length of the seventh lens element is f7, and the following conditions are satisfied:

$$1.90 < R13/R14 < 2.60; \text{ and}$$

$$0.80 < f1/f7 < 1.7.$$

17. An image capturing lens assembly comprising seven lens elements, the seven lens elements being, in order from an object side to an image side along an optical path:
a first lens element, a second lens element, a third lens element, a fourth lens element, a fifth lens element, a sixth lens element and a seventh lens element, each of the seven lens elements has an object-side surface towards the object side and an image-side surface towards the image side;
wherein the first lens element with negative refractive power has the object-side surface being concave in a paraxial region thereof, the object-side surface of the first lens element is aspheric and comprises at least one critical point in an off-axis region thereof and at least one inflection point; the third lens element has positive refractive power; the seventh lens element has negative refractive power;

wherein an Abbe number of the sixth lens element is V6, an Abbe number of the seventh lens element is V7, an axial distance between the object-side surface of the first lens element and an image surface is TL, a focal length of the image capturing lens assembly is f, a maximum image height of the image capturing lens assembly is ImgH, a distance between the at least one critical point of the object-side surface of the first lens element and an optical axis is Yc11, a maximum distance between an optical effective region of the object-side surface of the first lens element and the optical axis is Y11, and the following conditions are satisfied:

15.0<$V6+V7$<70.0;

13.0<$V6$<28.0;

1.7<$TL/f$<4.5:

1.0<$TL$/ImgH<4.0; and 0.20<$Yc11/Y11$<0.55.

18. The image capturing lens assembly of claim 17, wherein the Abbe number of the sixth lens element is V6, the Abbe number of the seventh lens element is V7, an f-number of the image capturing lens assembly is Fno, and the following conditions are satisfied:

20.0<$V6+V7$<60.0; and 1.4<$Fno$<2.8.

19. The image capturing lens assembly of claim 17, wherein an Abbe number of the first lens element is V1, an Abbe number of the second lens element is V2, a central thickness of the first lens element is CT1, a central thickness of the second lens element is CT2, an axial distance between the first lens element and the second lens element is T12, and the following conditions are satisfied:

1.2<$V1/V2$<4.0; and 1.2<(CT1+CT2)/$T12$<2.7.

20. The image capturing lens assembly of claim 17, wherein a central thickness of the first lens element is CT1, a central thickness of the sixth lens element is CT6, a central thickness of the seventh lens element is CT7, and the following condition is satisfied:

0.85<(CT6+CT7)/CT1<2.0.

21. The image capturing lens assembly of claim 17, wherein the axial distance between the object-side surface of the first lens element and the image surface is TL, the focal length of the image capturing lens assembly is f, the maximum image height of the image capturing lens assembly is ImgH, and the following conditions are satisfied:

2.2<$TL/f$<4.0; and 1.5<$TL$/ImgH<3.0.

22. The image capturing lens assembly of claim 17, wherein the focal length of the image capturing lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, and the following conditions are satisfied:

−0.75<$f/f1$<−0.30;

|$f/f2$|<0.80;

0.65<$f/f3$<1.3;

|$f/f4$|<1.0;

0.40<$f/f5$<0.90;

|$f/f6$|<0.60; and

−1.0<$f/f7$<−0.20.

23. The image capturing lens assembly of claim 17, wherein a focal length of the third lens element is f3, a focal length of the fifth lens element is f5, and the following condition is satisfied:

0.50<$f3/f5$<1.2.

24. The image capturing lens assembly of claim 17, wherein the seventh lens element has the image-side surface being concave in a paraxial region thereof; the focal length of the image capturing lens assembly is f, a curvature radius of the image-side surface of the seventh lens element is R14, and the following condition is satisfied:

1.4<$f/R14$<2.4.

25. The image capturing lens assembly of claim 17, wherein the first lens element has the image-side surface being concave in a paraxial region thereof, the third lens element has the image-side surface being convex in a paraxial region thereof; the fifth lens element has positive refractive power; the seventh lens element has the object-side surface being convex in a paraxial region thereof and the image-side surface being concave in a paraxial region thereof.

26. An imaging apparatus, comprising:
the image capturing lens assembly of claim 17; and
an image sensor disposed on the image surface of the image capturing lens assembly.

27. An electronic device, comprising:
the imaging apparatus of claim 26.

* * * * *